United States Patent
Aoki et al.

(10) Patent No.: US 10,223,194 B2
(45) Date of Patent: Mar. 5, 2019

(54) STORAGE DEVICE, SEMICONDUCTOR DEVICE, ELECTRONIC DEVICE, AND SERVER SYSTEM

(71) Applicant: Semiconductor Energy Laboratory Co., Ltd., Atsugi-shi, Kanagawa-ken (JP)

(72) Inventors: Takeshi Aoki, Kanagawa (JP); Yoshiyuki Kurokawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/784,669

(22) Filed: Oct. 16, 2017

(65) Prior Publication Data

US 2018/0129556 A1    May 10, 2018

(51) Int. Cl.
*G11C 11/00* (2006.01)
*G06F 11/10* (2006.01)

(52) U.S. Cl.
CPC .................. *G06F 11/1004* (2013.01)

(58) Field of Classification Search
CPC .............. G11C 11/161; G11C 11/1659; G11C 11/1673; G11C 11/1693; G11C 11/404; G11C 2211/4016; G11C 5/025; G11C 7/06; G11C 7/14
See application file for complete search history.

(56) References Cited

U.S. PATENT DOCUMENTS

| | | | |
|---|---|---|---|
| 5,510,748 A * | 4/1996 | Erhart | G09G 3/3688 327/108 |
| 8,378,403 B2 | 2/2013 | Kato | |
| 8,395,931 B2 | 3/2013 | Yamazaki et al. | |
| 8,541,846 B2 | 9/2013 | Saito | |
| 8,637,865 B2 | 1/2014 | Kato | |
| 8,811,066 B2 | 8/2014 | Yamazaki et al. | |
| 8,896,042 B2 | 11/2014 | Yamazaki et al. | |
| 9,042,161 B2 | 5/2015 | Koyama et al. | |
| 9,105,511 B2 | 8/2015 | Yamazaki et al. | |
| 9,263,116 B2 | 2/2016 | Koyama et al. | |
| 9,287,258 B2 | 3/2016 | Saito | |
| 9,336,858 B2 | 5/2016 | Yamazaki et al. | |

(Continued)

FOREIGN PATENT DOCUMENTS

| | | |
|---|---|---|
| JP | 2011-119675 A | 6/2011 |
| JP | 2015-038799 A | 2/2015 |

*Primary Examiner* — Hien Nguyen
(74) *Attorney, Agent, or Firm* — Fish & Richardson P.C.

(57) ABSTRACT

Data corrupted by a soft error is recovered. A storage device includes a first memory cell, a second memory cell, a sense circuit electrically connected to the first memory cell through a first sense line and to the second memory cell through a second sense line, a digital-analog converter circuit electrically connected to the first memory cell and the second memory cell through a bit line, and an analog-digital converter circuit. The digital-analog converter circuit has a function of applying voltages as first signals to the first memory cell and the second memory cell. Even when a soft error occurs in the first memory cell or the second memory cell, the storage device has a function of recovering data corrupted by the soft error because the sense circuit selects and outputs a higher one of the voltages applied to the first memory cell and the second memory cell.

19 Claims, 23 Drawing Sheets

(56) References Cited

U.S. PATENT DOCUMENTS

| | | |
|---|---|---|
| 9,373,640 B2 | 6/2016 | Yamazaki et al. |
| 9,685,447 B2 | 6/2017 | Yamazaki et al. |
| 9,780,093 B2 | 10/2017 | Kato |
| 9,799,666 B2 | 10/2017 | Saito |
| 10,002,656 B2 * | 6/2018 | Ikeda ................. G11C 16/0441 |
| 2005/0229075 A1 | 10/2005 | Berkmann et al. |
| 2006/0098420 A1 * | 5/2006 | Kaplan .................... F21K 2/06 362/34 |
| 2008/0219072 A1 * | 9/2008 | Breen ................. G11C 11/4091 365/205 |
| 2014/0110705 A1 * | 4/2014 | Koezuka ............... H01L 21/022 257/43 |
| 2016/0163374 A1 | 6/2016 | Koyama et al. |
| 2016/0240239 A1 * | 8/2016 | Ikeda ................. G11C 16/0441 |
| 2016/0253236 A1 | 9/2016 | Tsutsui |
| 2016/0350182 A1 | 12/2016 | Tsutsui |
| 2017/0110459 A1 | 4/2017 | Saito |
| 2017/0271338 A1 | 9/2017 | Yamazaki et al. |
| 2018/0061307 A1 * | 3/2018 | Inoue ................... G09G 3/2096 |

* cited by examiner

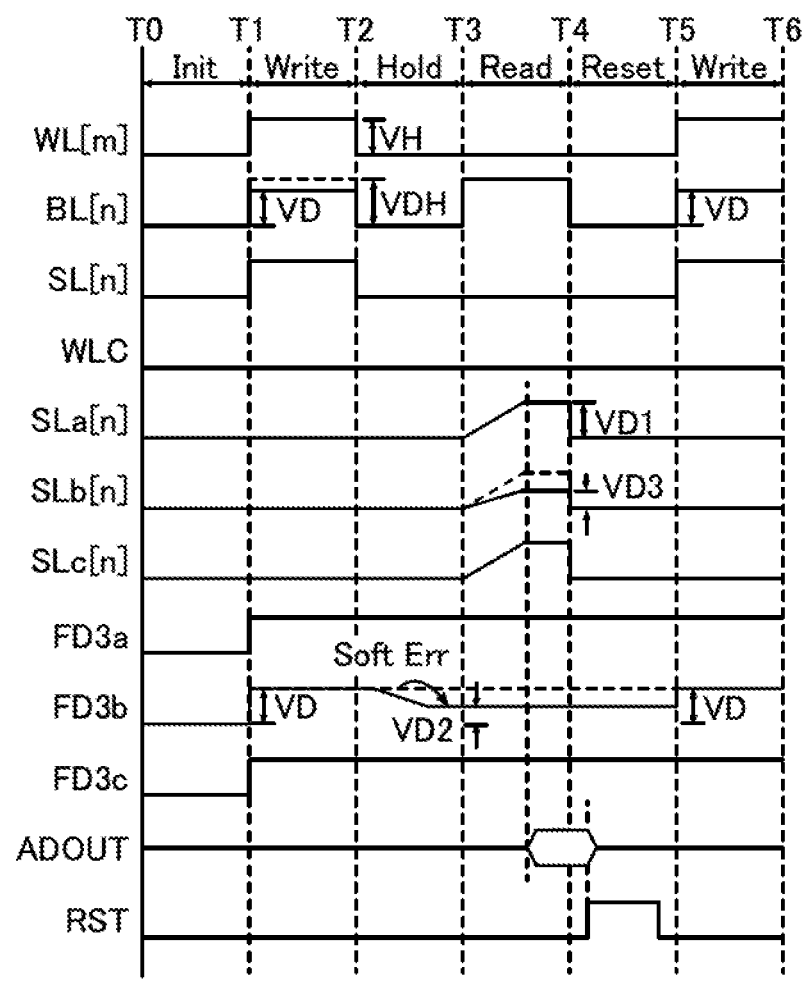

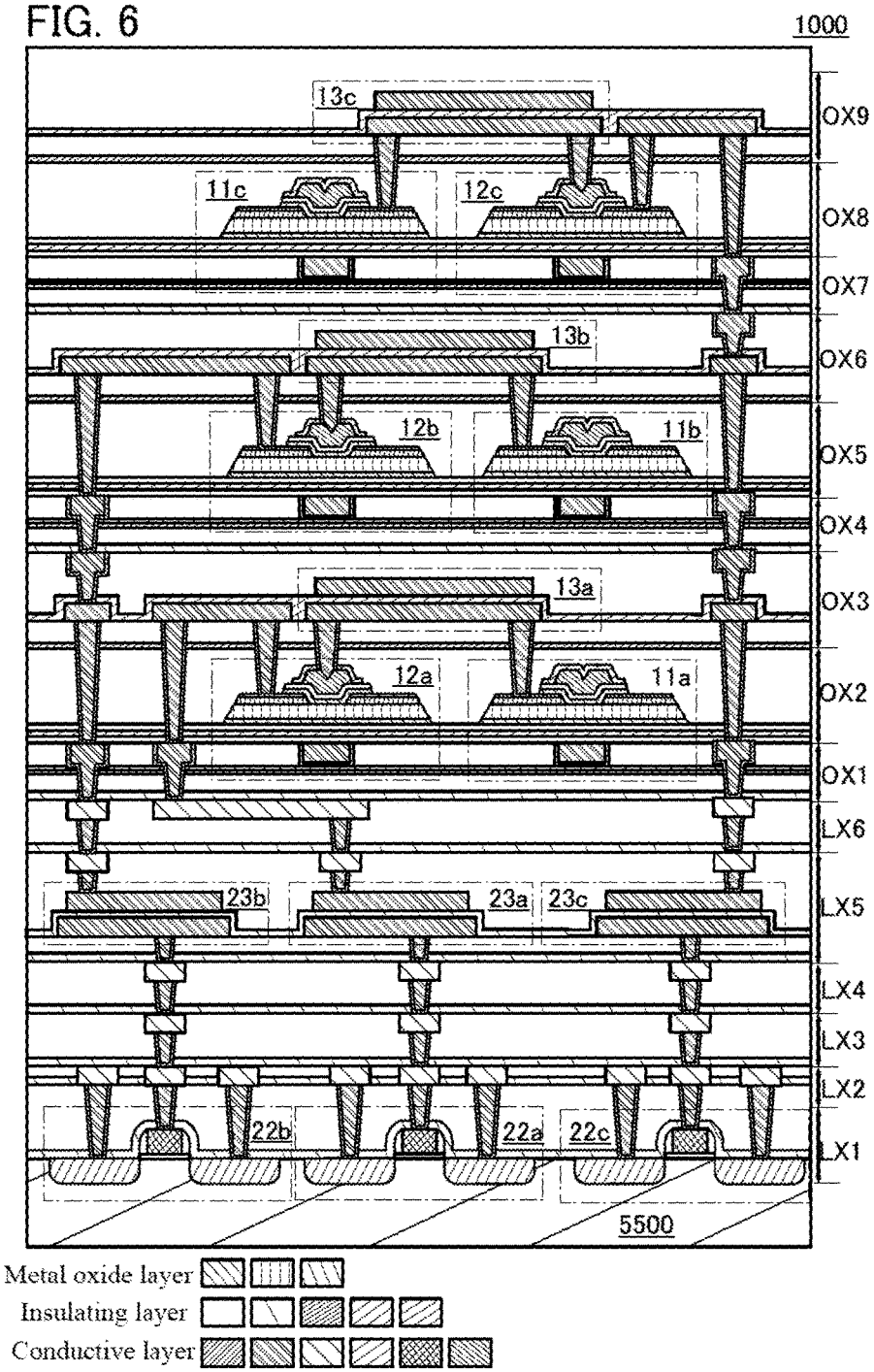

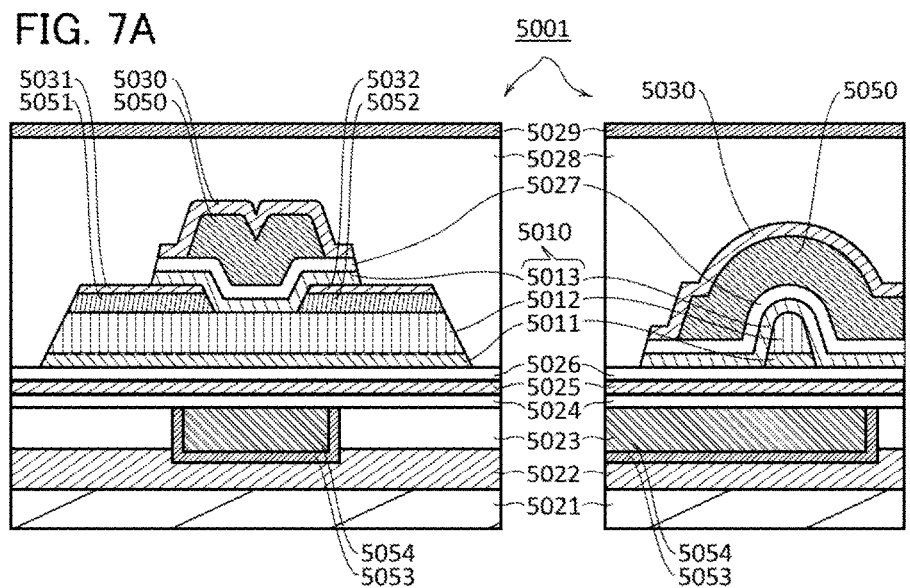
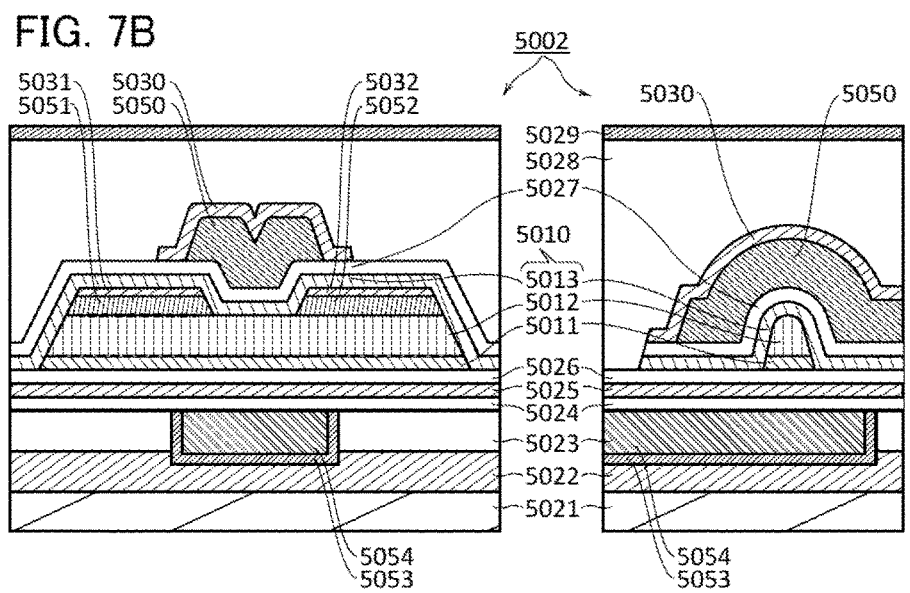

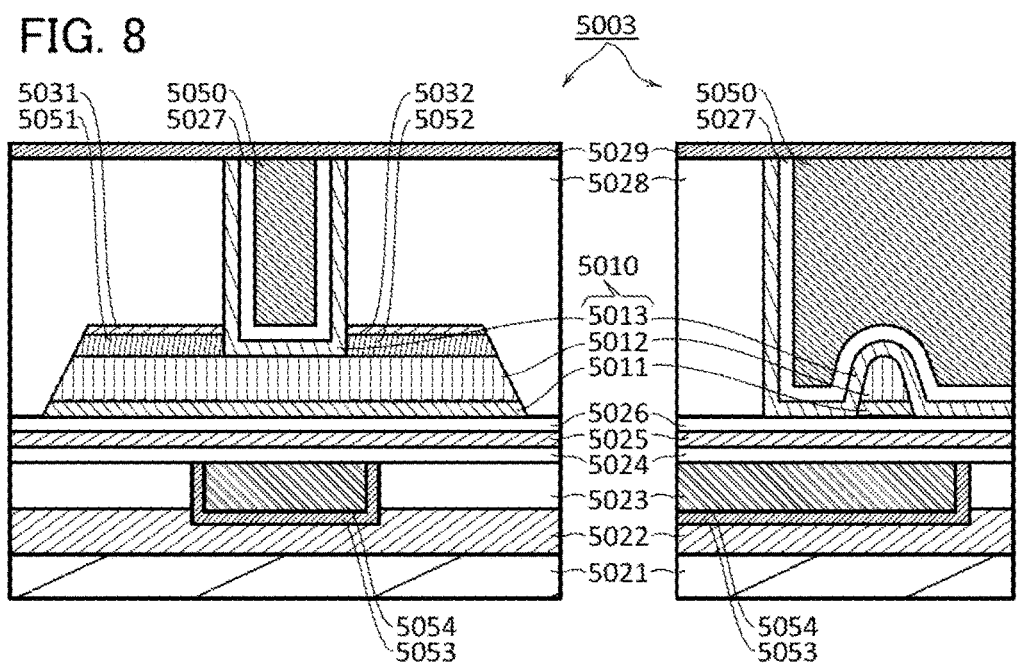

FIG. 13A
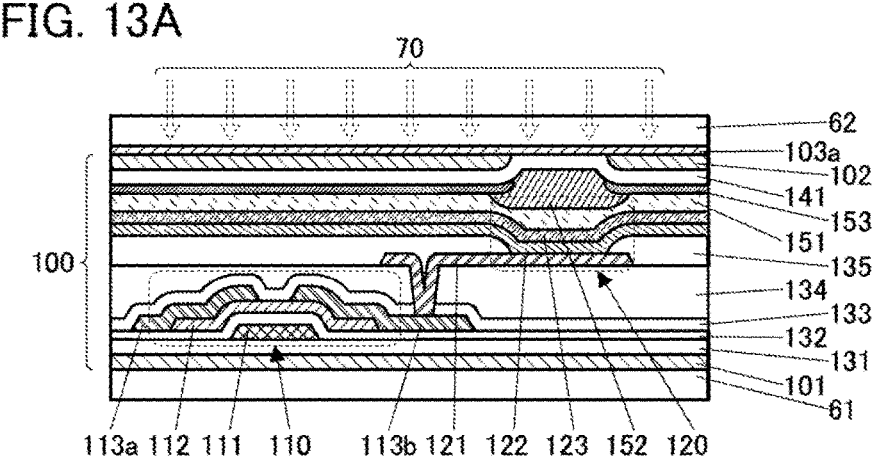
FIG. 13B1
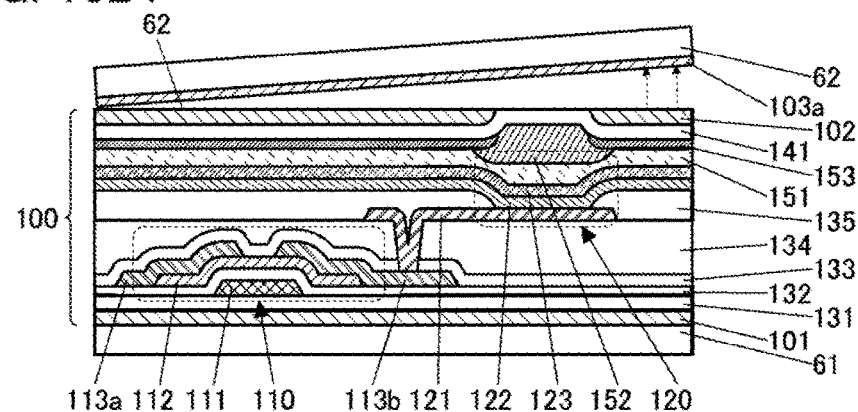
FIG. 13B2
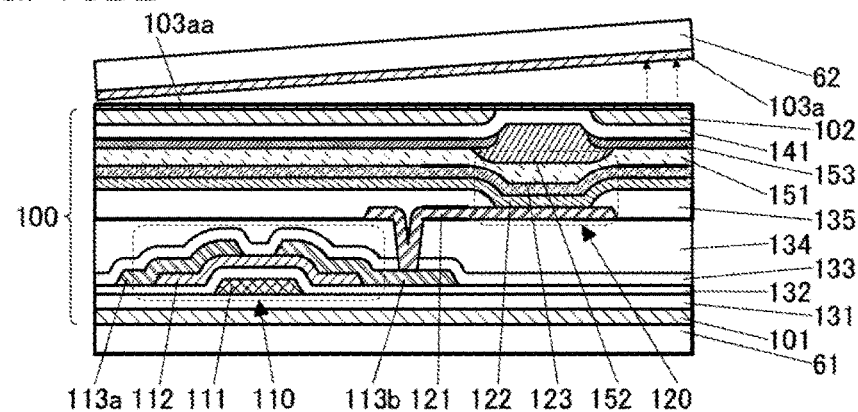

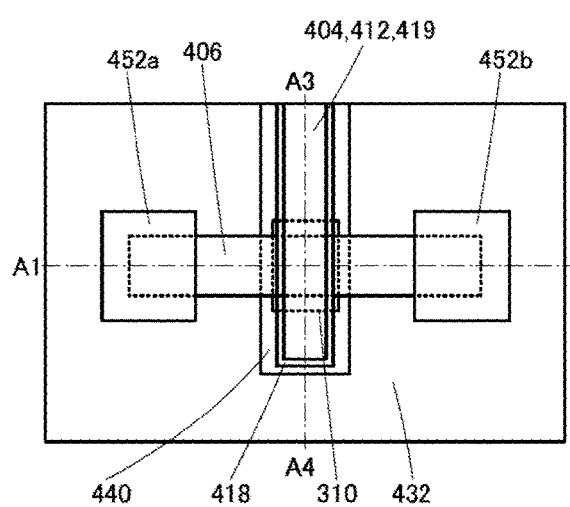
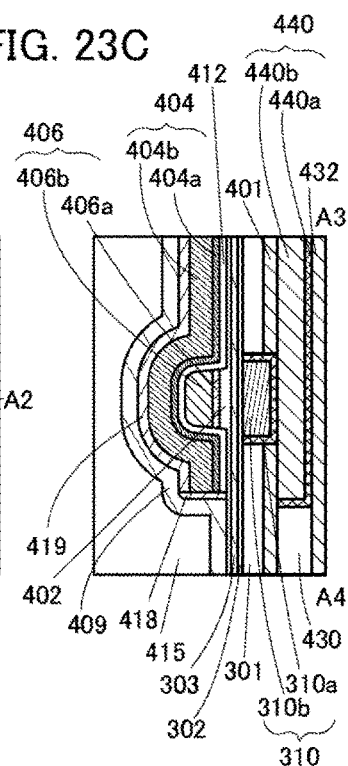
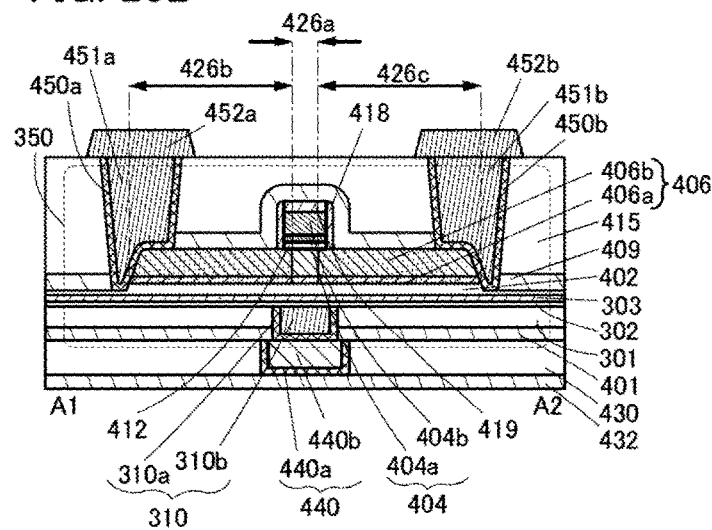

STORAGE DEVICE, SEMICONDUCTOR DEVICE, ELECTRONIC DEVICE, AND SERVER SYSTEM

BACKGROUND OF THE INVENTION

1. Field of the Invention

One embodiment of the present invention relates to a storage device, a semiconductor device, an electronic device, and a server system.

Note that one embodiment of the present invention is not limited to the above technical field. The technical field of one embodiment of the invention disclosed in this specification and the like relates to an object, a method, or a manufacturing method. The present invention relates to a process, a machine, manufacture, or a composition of matter. One embodiment of the present invention particularly relates to a semiconductor device, a display device, a light-emitting device, a power storage device, a storage device, a driving method thereof, or a manufacturing method thereof.

In this specification and the like, a semiconductor device refers to an element, a circuit, a device, or the like that can function by utilizing semiconductor characteristics. An example of the semiconductor device is a semiconductor element such as a transistor or a diode. Another example of the semiconductor device is a circuit including a semiconductor element. Another example of the semiconductor device is a device provided with a circuit including a semiconductor element.

2. Description of the Related Art

As miniaturization of a semiconductor device progresses, a problem of a soft error due to radiation or the like becomes more apparent. Unlike a hard error, it is difficult in many cases to determine a cause of a soft error because data is updated and restored to a correct state by a restart or the like even after the occurrence of the soft error. As described above, a soft error that occurs in a logic circuit or a storage device may cause malfunction of a processor, a control digital circuit, or the like of a computer; therefore, a system that does not malfunction is needed.

A method using a cyclic redundancy check is generally known as a method for detecting an error in the transfer of digital data (see Patent Document 1). However, an error cannot be sufficiently prevented even though an error can be detected. Furthermore, a neutron ray, which is a main cause of a soft error, is difficult to block, and a countermeasure against this is difficult to take.

As portable electronic devices become widely used, the probability of occurrence of soft errors drastically varies. For example, the travel time from a basement of a tall building that is shielded by concrete (where the amount of neutron rays or α rays is small) to an airplane that flies at an ultrahigh altitude or a space station (where the amount of neutron rays or α rays is large) while the electronic devices are in operation becomes short. Therefore, a countermeasure against a soft error which is independent of use environment needs to be taken.

In addition, a countermeasure against system instability due to a soft error needs to be taken for not only devices that need to be highly reliable, such as an aircraft, a medical device, a database server, a high-capacity router, and a supercomputer, but also devices that handle a high density of information, such as an advanced electronic vehicle and a digital home appliance.

A DRAM or an SRAM, which is a conventional semiconductor memory device, is not preferable because data is lost when power supply is turned off. An EEPROM or a flash memory maintains data by storing electric charge in a so-called floating gate provided between a channel and a gate.

However, in a conventional EEPROM or flash memory, high voltage is needed at the time of injection of charge to a floating gate or removal of the charge. Because of this, deterioration of a gate insulating film cannot be avoided and it is not possible to limitlessly repeat write and erase operations. In view of this, Patent Document 2 discloses a memory configuration capable of retaining data even when power supply is stopped, in which a transistor whose semiconductor layer contains a metal oxide that is known to enable a transistor to have low off-state current.

A transistor including a metal oxide in a channel formation region (hereinafter, such a transistor may be referred to as a metal oxide semiconductor transistor or an OS transistor) is known. For example, a storage device in which a write transistor of a gain cell is an OS transistor is disclosed in Patent Document 3. In the gain cell, the amount of accumulated electric charge can be amplified by a read transistor and the electric charge can be supplied to a bit line; therefore, it is possible to reduce the capacitance of the capacitor.

REFERENCES

[Patent Document 1] United States Patent Application Publication No. 2005/0229075

[Patent Document 2] Japanese Published Patent Application No. 2015-038799

[Patent Document 3] Japanese Published Patent Application No. 2011-119675

SUMMARY OF THE INVENTION

A semiconductor integrated circuit with high density and large capacitance has been developed; meanwhile, miniaturization of the semiconductor integrated circuit is required. Thus, two-dimensional integration has been shifted to three-dimensional integration. However, a memory cell with a decreased size owing to increases in density and capacitance is easily affected by the amount of neutron rays or α rays and has a problem with frequent occurrence of a soft error.

As a countermeasure against a soft error, an error correcting code (ECC) circuit incorporated in a memory circuit can be used to recover data that is corrupted by the occurrence of a soft error. However, there is still a problem in that even the error correcting code circuit cannot recover corrupted data completely under some conditions.

In view of the above problems, an object of one embodiment of the present invention is to provide a semiconductor device with a novel structure. Another object is to provide an error correcting code circuit with a novel structure. Another object is to provide a highly reliable system that operates stably.

Note that the descriptions of these objects do not disturb the existence of other objects. In one embodiment of the present invention, there is no need to achieve all the objects. Other objects will be apparent from and can be derived from the description of the specification, the drawings, the claims, and the like.

Note that the objects of one embodiment of the present invention are not limited to the above objects. The objects described above do not disturb the existence of other objects. The other objects are ones that are not described above and will be described below. The other objects will be apparent from and can be derived from the description of the specification, the drawings, and the like by those skilled in the art. One embodiment of the present invention solves at least one of the above objects and the other objects.

One embodiment of the present invention is a storage device which includes a first memory cell, a second memory cell, a bit line, a digital-analog converter circuit, a sense circuit, a first sense line, a second sense line, and an analog-digital converter circuit. The digital-analog converter circuit is electrically connected to the first memory cell and the second memory cell through the bit line. The sense circuit is electrically connected to the first memory cell through the first sense line and to the second memory cell through the second sense line. The digital-analog converter circuit has a function of applying voltages as first signals to the first memory cell and the second memory cell. The sense circuit has a function of selecting as a second signal a higher one of the voltages applied as the first signals to the first memory cell and the second memory cell. The analog-digital converter circuit has a function of converting the second signal from the voltage into a digital signal.

In the storage device of the above embodiment, the first memory cell and the second memory cell have a function of retaining a multilevel data voltage.

In the storage device of the above embodiment, it is preferable that the first memory cell include a first transistor, a second transistor, a capacitor, a word line, the bit line, the first sense line, and a capacitor line; a gate of the first transistor be electrically connected to the word line; one of a source and a drain of the first transistor be electrically connected to the bit line; the other of the source and the drain of the first transistor be electrically connected to a gate of the second transistor and one electrode of the capacitor; one of a source and a drain of the second transistor be electrically connected to the bit line; the other of the source and the drain of the second transistor be electrically connected to the first sense line; and the other electrode of the capacitor be electrically connected to the capacitor line.

In the storage device of the above embodiment, it is preferable that a semiconductor layer of a transistor included in the second memory cell be provided over an insulating layer provided over semiconductor layers of the first transistor and the second transistor included in the first memory cell; and the semiconductor layers be positioned so as to partly overlap with each other.

In the storage device of the above embodiment, it is preferable that semiconductor layers of the first transistor and the second transistor included in the first memory cell and a semiconductor layer of a transistor included in the second memory cell be provided over the same insulating layer.

In the storage device of the above embodiment, it is preferable that the sense circuit include a third transistor, a fourth transistor, a fifth transistor, a first voltage converter element, a second voltage converter element, a third voltage converter element, a floating node, a first power supply line, and a second power supply line; a gate of the third transistor be electrically connected to the first sense line through the first voltage converter element; a gate of the fourth transistor be electrically connected to the second sense line through the second voltage converter element; the first power supply line be electrically connected to one of a source and a drain of the third transistor and one of a source and a drain of the fourth transistor; an input terminal of the analog-digital converter circuit be electrically connected to the other of the source and the drain of the third transistor, the other of the source and the drain of the fourth transistor, one of a source and a drain of the fifth transistor, and one electrode of the third voltage converter element; the second power supply line be electrically connected to the other of the source and the drain of the fifth transistor and the other electrode of the third voltage converter element; and the floating node be electrically connected to an input terminal of the analog-digital converter circuit.

In the storage device of the above embodiment, the first voltage converter element, the second voltage converter element, and the third voltage converter element each preferably have a function of converting a current into a voltage.

In the storage device of the above embodiment, the transistors each preferably include a metal oxide in the semiconductor layer.

In the storage device of the above embodiment, the transistor including the metal oxide in the semiconductor layer preferably includes a back gate.

According to one embodiment of the present invention, a semiconductor device with a novel structure can be provided. An error correcting code circuit with a novel structure can be provided. A highly reliable system that operates stably can be provided.

Note that the effects of one embodiment of the present invention are not limited to the above effects. The effects described above do not disturb the existence of other effects. The other effects are ones that are not described above and will be described below. The other effects will be apparent from and can be derived from the description of the specification, the drawings, and the like by those skilled in the art. One embodiment of the present invention has at least one of the above effects and the other effects. Accordingly, one embodiment of the present invention does not have the aforementioned effects in some cases.

BRIEF DESCRIPTION OF THE DRAWINGS

FIG. 2 is a timing chart illustrating operation of a storage device.

FIG. 6 is a cross-sectional view illustrating an example of a stacked-layer structure of a storage device.

FIGS. 7A and 7B are cross-sectional views illustrating transistors.

FIG. 8 is cross-sectional views illustrating a structural example of a transistor.

FIGS. 13A, 13B1, and 13B2 are cross-sectional views illustrating an example of a method for manufacturing a display device.

FIGS. 23A to 23C illustrate a structural example of an OS transistor.

DETAILED DESCRIPTION OF THE INVENTION

Figure 1A:
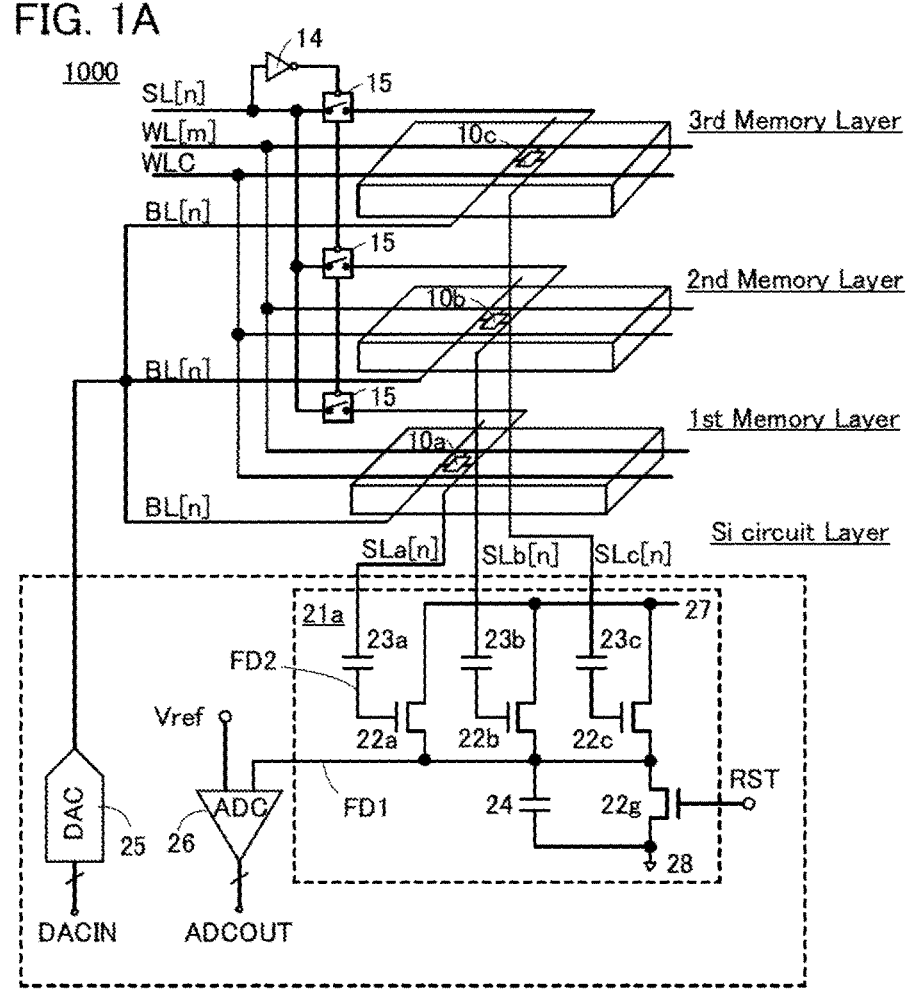
FIG. 1A is a block diagram illustrating a storage device.

Embodiments will be hereinafter described with reference to drawings. Note that the embodiments can be implemented in many different modes. It will be readily appreciated by those skilled in the art that modes and details can be changed in various ways without departing from the spirit and scope of the present invention. Therefore, the present invention should not be interpreted as being limited to the description in the following embodiments.

In the drawings, the size, the layer thickness, or the region is exaggerated for clarity in some cases. Therefore, embodiments of the present invention are not limited to such a scale. Note that the drawings are schematic views showing ideal examples, and embodiments of the present invention are not limited to shapes or values shown in the drawings.

Ordinal numbers such as "first," "second," and "third" in this specification are used in order to avoid confusion among components, and the terms do not limit the components numerically.

In this specification, terms for describing arrangement, such as "over" and "under," are used for convenience for describing the positional relation between components with reference to drawings. The positional relation between components is changed as appropriate in accordance with a direction in which each component is described. Thus, there is no limitation on terms used in this specification, and description can be made appropriately depending on the situation.

In this specification and the like, a transistor is an element having at least three terminals of a gate, a drain, and a source. The transistor includes a channel region between the drain (a drain terminal, a drain region, or a drain electrode) and the source (a source terminal, a source region, or a source electrode) and current can flow between the source and the drain through the channel region. Note that in this specification and the like, a channel region refers to a region through which current mainly flows.

Functions of a "source" and a "drain" are sometimes interchanged with each other when a transistor of opposite polarity is used or when the direction of current flow is changed in circuit operation, for example. Therefore, the terms "source" and "drain" can be interchanged with each other in this specification and the like.

In this specification and the like, the term "electrically connected" includes the case where components are connected through an "object having any electric function." There is no particular limitation on an "object having any electric function" as long as electric signals can be transmitted and received between components that are connected through the object. Examples of an "object having any electric function" include a switching element such as a transistor, a resistor, an inductor, a capacitor, and an element with a variety of functions, as well as an electrode and a wiring.

In this specification and the like, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly also includes the case where the angle is greater than or equal to 85° and less than or equal to 95°.

In this specification and the like, the terms "film" and "layer" can be interchanged with each other. For example, the term "conductive layer" can be changed into the term "conductive film" in some cases. Also, the term "insulating film" can be changed into the term "insulating layer" in some cases.

Unless otherwise specified, the off-state current in this specification and the like refers to a drain current of a transistor in the off state (also referred to as non-conduction state and cutoff state). Unless otherwise specified, the off state of an n-channel transistor means that the voltage between its gate and source ($V_{gs}$: gate-source voltage) is lower than the threshold voltage $V_{th}$, and the off state of a p-channel transistor means that the gate-source voltage $V_{gs}$ is higher than the threshold voltage $V_{th}$. For example, the off-state current of an n-channel transistor sometimes refers to a drain current that flows when the gate-source voltage $V_{gs}$ is lower than the threshold voltage $V_{th}$.

The off-state current of a transistor depends on $V_{gs}$ in some cases. Thus, "the off-state current of a transistor is lower than or equal to I" may mean there is $V_{gs}$ at which the off-state current of the transistor is lower than or equal to I. The off-state current of a transistor may refer to off-state current at a given $V_{gs}$, at $V_{gs}$ in a given range, or at $V_{gs}$ at which sufficiently low off-state current is obtained, for example.

As an example, the assumption is made of an n-channel transistor where the threshold voltage $V_{th}$ is 0.5 V and the drain current is $1 \times 10^{-9}$ A at $V_{gs}$ of 0.5 V, $1 \times 10^{-13}$ A at $V_{gs}$ of 0.1 V, $1 \times 10^{-19}$ A at $V_{gs}$ of −0.5 V, and $1 \times 10^{-22}$ A at $V_{gs}$ of −0.8 V. The drain current of the transistor is $1 \times 10^{-19}$ A or lower at $V_{gs}$ of −0.5 V or at $V_{gs}$ in the range of −0.8 V to −0.5 V; therefore, it can be said that the off-state current of the transistor is $1 \times 10^{-19}$ A or lower. Since there is $V_{gs}$ at which the drain current of the transistor is $1 \times 10^{-22}$ A or lower, it may be said that the off-state current of the transistor is $1 \times 10^{-22}$ A or lower.

In this specification and the like, the off-state current of a transistor with a channel width W is sometimes represented by a current value per channel width W or by a current value per given channel width (e.g., 1 μm). In the latter case, the off-state current may be represented by current per length (e.g., A/μm).

The off-state current of a transistor depends on temperature in some cases. Unless otherwise specified, the off-state current in this specification may be an off-state current at room temperature, 60° C., 85° C., 95° C., or 125° C. Alternatively, the off-state current may be an off-state current at a temperature at which the reliability of a semiconductor device or the like including the transistor is ensured or a temperature at which the semiconductor device or the like is used (e.g., temperature in the range of 5 ° C. to 35° C.). The state in which the off-state current of a transistor is I or lower may indicate that the off-state current of the transistor at room temperature, 60° C., 85° C., 95° C., 125° C., a temperature at which the reliability of a semiconductor device or the like including the transistor is ensured, or a temperature at which the semiconductor device or the like is used (e.g., a temperature in the range of 5° C. to 35° C.) is I or lower at a certain $V_{gs}$.

The off-state current of a transistor depends on voltage $V_{ds}$ between its drain and source in some cases. Unless otherwise specified, the off-state current in this specification may be an off-state current at $V_{ds}$ of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at $V_{ds}$ at which the reliability of a semiconductor device or the like including the transistor is ensured or $V_{ds}$ used in the semiconductor device or the like. The state in which the off-state current of a transistor is lower than or equal to I may indicate that the off-state current of the transistor at $V_{ds}$ of 0.1 V, 0.8 V, 1 V, 1.2 V, 1.8 V, 2.5 V, 3 V, 3.3 V, 10 V, 12 V, 16 V, or 20 V, at $V_{ds}$ at which the reliability of a semiconductor device or the like including the transistor is ensured, or at $V_{ds}$ used in the semiconductor device or the like is lower than or equal to I at a certain $V_{gs}$.

In the above description of off-state current, a drain may be replaced with a source. That is, the off-state current sometimes refers to a current that flows through a source of a transistor in the off state.

In this specification and the like, the term "leakage current" sometimes expresses the same meaning as off-state current. In this specification and the like, the off-state current sometimes refers to a current that flows between a source and a drain when a transistor is off, for example.

A voltage refers to a difference between potentials of two points, and a potential refers to electrostatic energy (electric potential energy) of a unit charge at a given point in an electrostatic field. Note that in general, a difference between a potential of one point and a reference potential (e.g., a ground potential) is simply called a potential or a voltage, and a potential and a voltage are used as synonymous words in many cases. Thus, in this specification, a potential may be rephrased as a voltage and a voltage may be rephrased as a potential unless otherwise specified.

(Embodiment 1)

In this embodiment, a multilevel memory including a novel error correcting code circuit is described with reference to FIGS. 1A and 1B and FIGS. 2 to 5.

FIG. 1A illustrates a block diagram of a storage device 1000 which has a multilevel memory including a novel error correcting code circuit. In the block diagram in FIG. 1A, a plurality of memory layers are provided. The memory layers in FIG. 1A include a plurality of memory cells, and the memory layers include different semiconductor layers. A circuit layer includes a circuit capable of writing and reading data to and from a memory, and includes a semiconductor layer different from those of the memory layers.

Although FIG. 1A illustrates an example in which a first memory layer, a second memory layer, and a third memory layer, i.e., three memory layers are provided, it is preferable that two or more memory layers be provided. Alternatively, only the first memory layer may be provided. The example in which only the first memory layer is provided will be described in detail with reference to FIG. 4.

Unlike in FIG. 1A, the circuit layer and the first memory layer may be formed using the same semiconductor layer. Accordingly, the circuit layer and the first memory layer may be formed using the same semiconductor layer, and the second memory layer and the third memory layer may be sequentially provided thereover.

It is preferable that the circuit layer include a transistor in which silicon is used for a semiconductor layer and that a metal oxide be used for the semiconductor layers in the memory layers. A metal oxide can be deposited by a sputtering method, so that the memory layers can be easily provided over the circuit layer. A transistor in which a metal oxide is used for a semiconductor layer is known to achieve low off-state current, and is suitable for use in the memory layers. The transistor in which a metal oxide is used for a semiconductor layer will be described in further detail in Embodiment 2.

Figure 1B:
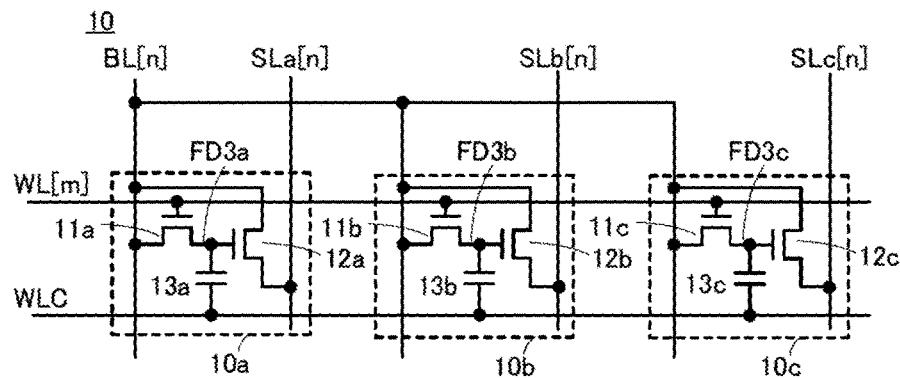
FIG. 1B is a circuit diagram illustrating a memory cell.

Before a detailed description of FIG. 1A, a memory cell 10 is described with reference to FIG. 1B. The memory cell 10 includes a plurality of memory cells. In the example illustrated in FIGS. 1A and 1B, the memory cell 10 includes a memory cell 10a, a memory cell 10b, and a memory cell 10c, i.e., three memory cells.

The memory cell 10a is described as one example. The memory cell 10a includes a transistor 11a, a transistor 12a, and a capacitor 13a. The memory cell 10a is electrically connected to a word line WL, a bit line BL, a sense line SL, and a capacitor line WLC.

One of a source and a drain of the transistor 11a is electrically connected to the bit line BL. The other of the source and the drain of the transistor 11a is electrically connected to a gate of the transistor 12a and one electrode of the capacitor 13a. One of a source and a drain of the transistor 12a is electrically connected to the bit line BL. The other of the source and the drain of the transistor 12a is electrically connected to the sense line SL. The other electrode of the capacitor 13a is electrically connected to the capacitor line WLC.

The memory cell 10a includes a floating node FD3a electrically connected to the other of the source and the drain of the transistor 11a, the gate of the transistor 12a, and the one electrode of the capacitor 13a. The use of a transistor in which a metal oxide is used for a semiconductor layer as the transistor 11a or the transistor 12a, or as the transistor 11a and the transistor 12a, enables off-state current to be reduced. Accordingly, data written to the floating node FD3a can be retained even when the storage device 1000 is powered off.

The memory cell 10a, the memory cell 10b, and the memory cell 10c are electrically connected to a word line WL[m], a bit line BL[n], a sense line SL[n], and the capacitor line WLC. Accordingly, when data is written to the memory cell 10, the same data can be written to the memory cells 10a, 10b, and 10c. When data is read from the memory cell 10, the same data can be obtained from each of the memory cells 10a, 10b, and 10c.

Thus, the transistor 11 functions as a write transistor for the memory cell 10, and the transistor 12 functions as a read transistor.

The description of FIG. 1A is now resumed. The storage device 1000 in FIG. 1A includes the memory cell 10 described with reference to FIG. 1B, a sense circuit 21a, a digital-analog converter circuit 25, an analog-digital converter circuit 26, an inverter 14, and switches 15.

The digital-analog converter circuit 25 is electrically connected to the memory cells 10a, 10b, and 10c through the bit line BL[n].

First, an input of the sense circuit 21a is described. The sense circuit 21a is electrically connected to the memory cell 10a through a sense line SLa[n]. The sense circuit 21a is electrically connected to the memory cell 10b through a sense line SLb[n]. The sense circuit 21a is electrically connected to the memory cell 10c through a sense line SLc[n].

The sense line SL[n] is electrically connected to the sense line SLa[n], the sense line SLb[n], and the sense line SLc[n] through the switches 15. Whether the switches 15 are turned on or off can be controlled with an inverted signal of a signal supplied to the sense line SL[n]. The inverted signal is generated by the inverter 14. Accordingly, the switches 15 can be turned on to write data to the memory cell 10, and the switches 15 can be turned off when the sense circuit 21a reads data from the memory cell 10.

Furthermore, when the switches 15 are turned off to read data from the memory cell 10, the sense line SLa[n], the sense line SLb[n], and the sense line SLc[n] become a floating node. This can reduce a load on the driving of a voltage converter element 23 due to the read transistor 12 included in the memory cell 10. The timing of driving will be described in detail with reference to a timing chart in FIG. 2.

The sense line SLa[n] is electrically connected to a gate of a transistor 22a included in the sense circuit 21a through a voltage converter element 23a. The sense line SLb[n] is electrically connected to a gate of a transistor 22b through a voltage converter element 23b. The sense line SLc[n] is electrically connected to a gate of a transistor 22c through a voltage converter element 23c.

FIG. 1A illustrates an example in which a capacitor is used as the voltage converter element 23a. With use of the capacitor, a bootstrap circuit can be configured in which a node where one electrode of the capacitor and the gate of the transistor 22a are electrically connected is a floating node FD2. Accordingly, the voltage converter element 23a can efficiently convert a current value into a voltage value when the size of the capacitor is selected as appropriate.

Thus, even when a small amount of current is supplied to the sense line SLa[n] from the read transistor 12a, the voltage of the floating node FD2 can be controlled by charging the capacitor with a capacitance corresponding to the current. Even when the gate capacitance of the transistor 22a is larger than the capacitance of the voltage converter element 23a, the gate voltage of the transistor 22a can be controlled and the drain current of the transistor 22a can be controlled by controlling the floating node FD2.

Note that the voltage converter element 23a is not necessarily provided. The amount of a drain current allowed by the transistor 22a to flow may be controlled by directly charging the gate capacitor of the transistor 22a.

Next, an output of the sense circuit 21a is described. A floating node FD1 included in the sense circuit 21a is electrically connected to the analog-digital converter circuit 26. The floating node FD1 is also electrically connected to one of a source and a drain of the transistor 22a. The floating node FD1 is also electrically connected to one of a source and a drain of the transistor 22b. The floating node FD1 is also electrically connected to one of a source and a drain of the transistor 22c. The other of the source and the drain of each of the transistors 22a to 22c is electrically connected to a power supply line 27.

Furthermore, the floating node FD1 is electrically connected to one of a source and a drain of a transistor 22g and one electrode of a voltage converter element 24. The other of the source and the drain of the transistor 22g and the other electrode of the voltage converter element 24 are electrically connected to a power supply line 28.

FIG. 1A illustrates an example in which the voltage converter element 24 is constituted by a capacitor. With the voltage converter element 24, data written to the memory cell 10 can be obtained as a voltage from drain currents that are supplied from the transistors 22a to 22c. Note that a criterion for determination by the analog-digital converter circuit is preferably adjusted depending on the number of memory cells to be processed in parallel in the memory cell 10.

The transistor 22g allows the value of a voltage at the floating node FD1 to be equal to the value of a voltage applied to the power supply line 28. Accordingly, the transistor 22g has a function of resetting the value of the voltage applied to the floating node FD1.

With the above configuration, even when a soft error occurs in a memory cell of the memory cell 10 under the influence of neutron rays or α rays or the like, data in the memory cell to be read can be compensated for with data in a memory cell where a soft error has not occurred.

The potential of the bit line BL changes from moment to moment; a hold period (described later) for the storage device 1000 illustrated in FIG. 1A is overwhelmingly longer than the other periods. A soft error due to the influence of neutron rays or α rays or the like occurs regardless of the operation of the storage device 1000; therefore, most soft errors can be considered to occur in the hold period. When a soft error occurs, the bit line BL and the floating node FD3 are electrically connected to each other through the transistor 11, so that the voltage at the floating node FD3 becomes equal to the voltage of the bit line BL (or becomes close to the voltage of the bit line BL).

In the storage device 1000, "L" is applied to the bit line BL in the hold period. Assuming that the memory cells 10a to 10c retain "H" (>"L") data and the floating node FD3b of the memory cell 10b is electrically connected to the bit line BL through the transistor 11b under the influence of neutron rays or α rays or the like (i.e., a soft error has occurred), the data in the memory cell 10b changes from "H" to "L" (or to a value between "H" and "L").

In contrast, when the memory cells 10a to 10c retain "L" data and the floating node FD3b of the memory cell 10b is electrically connected to the bit line BL through the transistor 11b under the influence of neutron rays or α rays or the like, the data in the memory cell 10b remains "L".

That is, in most cases, a data change due to a soft error occurs from "H" to "L" (or to a value between "H" and "L"), and a change from "L" to "H" (or to a value between "H" and "L") does not necessarily need to be taken into consideration.

That is, even when the floating node FD3 of one of a plurality of memory cells to which the same data is initially written is electrically connected to the bit line BL through the transistor 11 under the influence of neutron rays or α rays or the like and it is not known in which memory cell the electrical connection is established, a data change occurs only in a memory cell to which "H" is written and only from "H" to "L" (or to a value between "H" and "L"). In contrast, data written to the other memory cells remain the same (i.e., "H" when "H" is written, or "L" when "L" is written). Therefore, it can be determined that data with a maximum value among those in the plurality of memory cells (i.e., "H" when "H" is written, or "L" when "L" is written) is true data.

The same applies to a method in which a multilevel data voltage is written to a memory cell. For example, in the case where the same multilevel data voltage VD is written to a plurality of memory cells, the data in one of the memory cells is changed, and it is not known in which memory cell the data is changed, the data change occurs only from the multilevel data voltage VD to "0" (or to a value between the multilevel data VD and "0") and the multilevel data voltage VD of the other memory cells remains the same. Therefore, it can be determined that data with a maximum value among those in the plurality of memory cells (i.e., the multilevel data voltage VD) is true data.

Although the case where "L" is supplied to the bit line BL in the hold period is described above as an example, the same applies to the case where "H" is supplied to the bit line BL in the hold period. However, in that case, the opposite of the above occurs when a soft error occurs in a memory cell because data in that memory cell changes from original data and becomes close to the voltage of the bit line BL.

That is, in most of these cases, a change occurs from "L" to "H" (or to a value between "H" and "L"), and a change from "H" to "L" (or to a value between "H" and "L") does not necessarily need to be taken into consideration. Therefore, in the case where the bit line BL is kept at "H" in the hold period, it can be determined that data with a minimum value among those in the plurality of memory cells is true data.

In any case, even when data in the memory cell 10b is corrupted by a soft error, correct data can be read owing to data retained in the memory cells 10a and 10c. Therefore, simpler recovery of corrupted data than providing an error correcting code (ECC) circuit can be achieved.

Furthermore, the second memory layer can be provided over the first memory layer; thus, the use of a plurality of memory cells for error correction does not cause an increase in circuit area. Therefore, the storage device 1000 including a high-density and high-capacity memory can be obtained.

FIG. 2 illustrates an example of a timing chart for the block diagram in FIG. 1A. The timing of controlling the memory cell 10(m, n) is described. A period T0-T1 corresponds to an initial state. In addition, m and n are each an integer of 1 or more.

A period T1-T2 corresponds to a period for writing data to the memory cell 10(m, n). To write data to the memory cell 10(m, n), a signal supplied to the word line WL[m] is changed from "L" to "H". In addition, a signal supplied to the bit line BL[n] is changed from "L" to "H". Furthermore, a signal supplied to the sense line SL[n] is changed from "L" to "H".

A high voltage VH is applied to the word line WL[m] and the sense line SL[n]. A data voltage VDH is applied to the bit line BL[n]. FIG. 2 illustrates an example in which a data voltage VD is applied. The data voltage VD is also applied to the floating node FD3. Alternatively, a multilevel data voltage VD may be applied to the bit line BL[n]. When the multilevel data voltage VD is applied, the memory cell 10(m, n) can function as a multilevel memory.

A data voltage VD1 lower than the data voltage VD by the threshold voltage of the read transistor 12 is applied to the sense line SL[n]. The data voltage VD1 applied to the sense line SL[n] is applied to the floating node FD2 through the voltage converter element 23.

When the signal supplied to the sense line SL[n] is "H", the source and the drain of the read transistor 12 can have the same potential. Thus, a synthetic capacitance can be formed at the floating node FD3 by the capacitor 13 and a gate capacitance of the transistor 12. A capacitor for retaining data is preferably large. Data can be written to the floating nodes FD3a to FD3c from the digital-analog converter circuit 25 through the bit line BL[n].

A period T2-T3 corresponds to a hold period in which the memory cell 10(m, n) is not accessed and retains data. The signals supplied to the word line WL[m], the bit line BL[n], and the sense line SL[n] are changed to "L". A case where a soft error occurs in this period at the floating node FD3b of the memory cell 10b(m, n) under the influence of neutron rays or α rays or the like is described below. In the example below, the data voltage VD retained at the floating node FD3b is changed to a data voltage VD2 by occurrence of data corruption due to the soft error.

When the memory cell 10(m, n) is subjected to the influence of neutron rays or α rays or the like, electric charge retained at the floating node FD3 leaks through the transistor 11, whereby the voltage value of the floating node FD3 is decreased and data is corrupted.

A period T3-T4 corresponds to a period in which the sense circuit reads data. The signal supplied to the bit line BL[n] is changed from "L" to "H". The sense line SL retains "L", so that the switches 15 are turned off and the sense lines SLa[n] and SLc[n] can be brought into a floating state.

Accordingly, depending on the value of a voltage of the floating node FD3 which is applied to the gate of the transistor 12, a drain current is supplied to the sense line SL[n] connected to the other of the source and the drain of the transistor 12. The drain current is converted into the data voltage VD1 by the voltage converter element 23. The data voltage VD1 is applied to the floating node FD2.

Depending on the values of voltages applied to the sense lines SLa[n] to SLc[n], drain currents of the transistors 22a to 22c can be supplied to the floating node FD1. For example, the data voltage VD1 is applied to the sense lines SLa[n] and SLc[n]. However, the data voltage to be applied to the sense line SLb[n] is changed from the data voltage VD1 to the data voltage VD2 by occurrence of a soft error. Therefore, a data voltage VD3 lower than the data voltage VD2 by the threshold voltage of the read transistor 12b is applied.

The drain currents supplied from the transistors 22a to 22c are converted into voltage values by the voltage converter element 24, and the voltage values are supplied to the analog-digital converter circuit 26. The analog-digital converter circuit 26 has a function of converting a voltage value supplied to the floating node FD1 into a digital signal with a necessary bit width and outputting the digital signal.

In a period T4-T5, the floating node FD1 can be reset. A reset signal RST can be supplied to the gate of the transistor 22g at a given timing. By supplying an "H" signal to the gate of the transistor 22g, electric charge retained in the voltage converter element 24 can be released. Note that data in the memory cell 10(m, n) is retained even when the floating node FD1 is reset.

A period T5-T6 corresponds to a timing of the second data writing to the memory cell 10(m, n). The data at the floating node FD3b in the memory cell 10b(m, n) where the soft error has occurred can be updated to new data.

Accordingly, even when data is corrupted by a soft error or the like, correct data can be read by parallel processing of a plurality of memory cells in the memory cell 10(m, n) without adding a novel error correcting code circuit. Furthermore, the data can be updated to new data. Moreover, the data in the memory cell where the soft error has occurred can be replaced with correct data.

Figure 3:
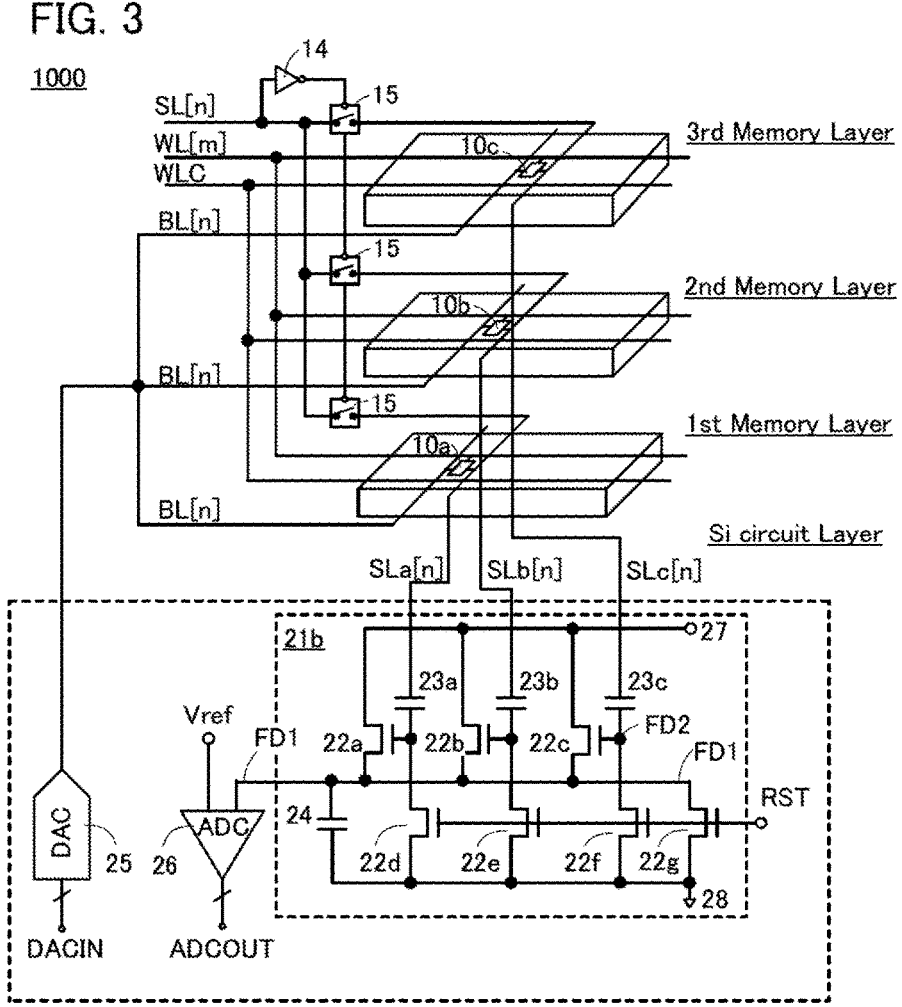
FIG. 3 is a block diagram illustrating a storage device.

FIG. 3 illustrates an example of a sense circuit 21b that is different from the sense circuit 21a in FIG. 1A. A difference from FIG. 1A is that the power supply line 28 is electrically connected to the floating node FD2 illustrated in FIG. 1A through a reset transistor 22d, a reset transistor 22e, and a reset transistor 22f.

Accordingly, unexpected electric charge remaining at the floating node FD2 can be released at the time of resetting. In addition, when the sense lines SLa[n] and SLc[n] and the floating node FD2 are set at the same potential, an output of the read transistor 12 can be accurately supplied to the sense circuit 21b.

Figure 4:
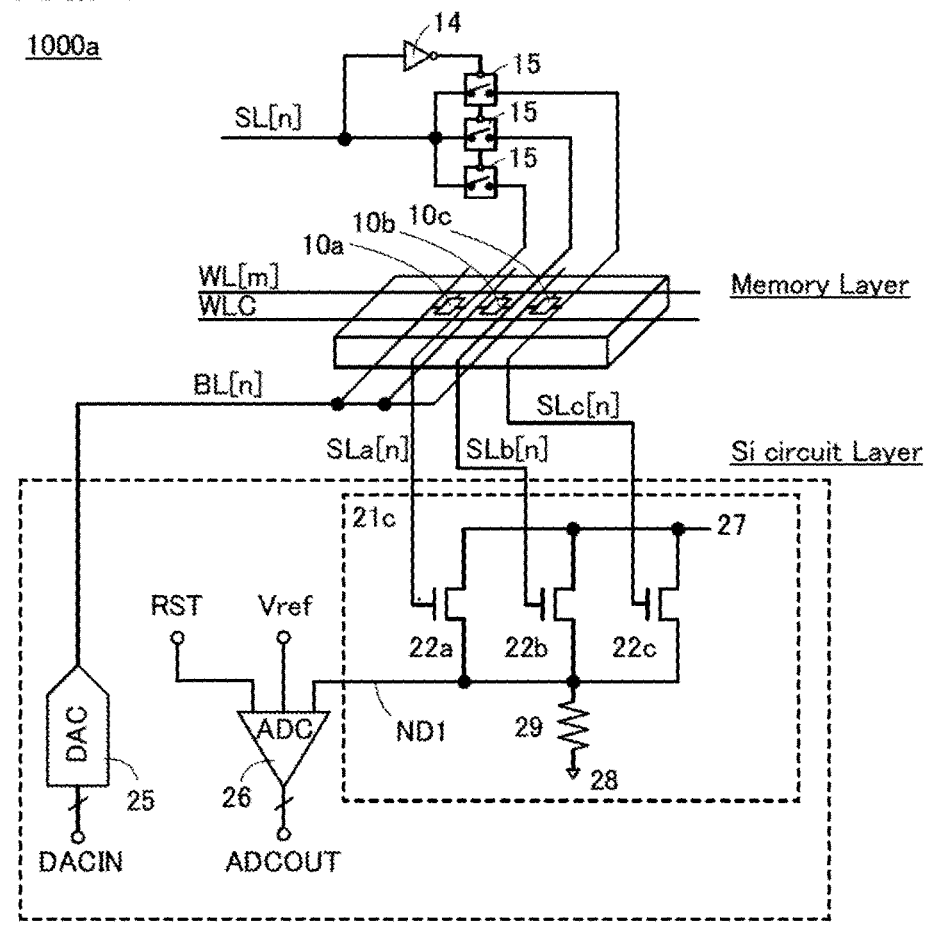
FIG. 4 is a block diagram illustrating a storage device.

FIG. 4 illustrates an example of a memory cell 10 and a sense circuit 21c in a different layout from that in FIG. 1A. A difference from FIG. 1A is that a storage device 1000a in FIG. 4 includes only one memory layer. In the memory cell 10, transistors are provided with semiconductor layers located on the same insulating film.

In the sense circuit 21c in FIG. 4, the sense lines SLa[n] to SLc[n] are electrically connected to gates of the transistors 22a to 22c, respectively. The voltage converter element 23 in FIG. 1A is not provided, which enables a more dense layout than in the sense circuit 21a illustrated in FIG. 1A.

The sense circuit 21c is an example in which a resistor is used as a voltage converter element 29. A voltage value is generated at a node ND1 by making drain currents from the transistors 22a to 22c flow through the resistor. A variable resistor that can be programmed to generate a plurality of voltage values may be used as the voltage converter element 24.

In FIG. 4, a reset signal for the node ND1 is not necessarily provided. If necessary, a reset signal is supplied to the analog-digital converter circuit, whereby an output of the analog-digital converter circuit can be reset at a given timing.

Thus, the sense circuit 21c can have a more dense layout than the sense circuit 21a illustrated in FIG. 1A owing to reduction of transistors, voltage converter elements, the reset signal, or the like.

Figure 5:
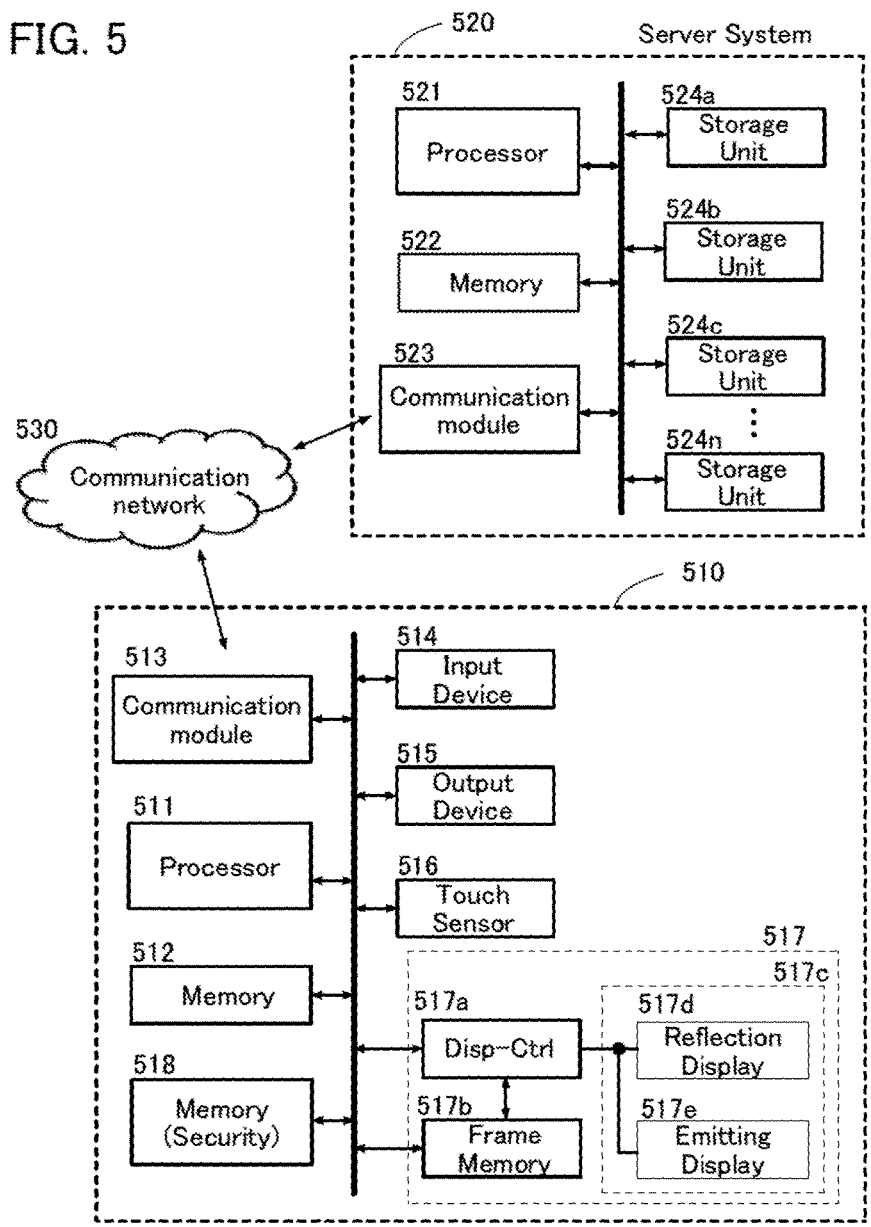
FIG. 5 illustrates an electronic device.

FIG. 5 illustrates an electronic device 510 including a display device as an example of an electronic device including the above-described storage device 1000, and also illustrates a server system 520. The electronic device 510 and the server system 520 are connected to a network 530. The server system 520 can provide information to an application program executed by the electronic device 510.

The electronic device 510 includes a processor 511, a storage device 512, a communication module 513, an input device 514, an output device 515, a touch sensor module 516, a display module 517, and a storage device 518.

The display module 517 includes a display controller 517a, a frame memory 517b, and a display 517c. The display 517c includes a display portion 517d having a reflective display element and a display portion 517e having a light-emitting display element. Although FIG. 5 illustrates an example in which the display 517c includes two display portions, it is acceptable as long as the display 517c includes either one of the display portions. A display portion having a transmissive display element may be included.

Examples of the input device 514 include a sensor (a sensor having a function of measuring or sensing force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a joystick, a keyboard, a hardware button, a pointing device, an imaging device, an audio input device, an eye-gaze input device, an orientation determination device, and the like.

Examples of the output device 515 include an external storage device, an external display device, and the like.

The storage device 512 retains a program and data. The program can use the storage device 512, the communication module 513, the input device 514, the output device 515, the touch sensor module 516, the display module 517, and the storage device 518 through the processor. The storage device 512 and the storage device 518 can retain data even after the electronic device 510 is powered off.

The time it takes to start up the program when the electronic device 510 is powered on again can be shortened. Thus, even when data in a memory cell of the storage device 512 is corrupted by a soft error, the program can be started up using recovered data in the case of using the storage device of this embodiment.

When the program performs computation, peripheral-device control, display updating in the display device, or the like through the processor, malfunction may occur if data in a memory cell of the storage device 512 is corrupted by a soft error. In the case of using the storage device of this embodiment, the program can suppress the occurrence of malfunction by using recovered data.

The storage device of this embodiment may be used as the frame memory 517b of the display module 517. By use as the frame memory 517b, display can be performed using recovered data even when data in a memory cell is corrupted by a soft error.

When data in a memory cell of the storage device 512 or 518 is corrupted by a soft error, the electronic device 510 used in a medical device, a nuclear facility, an aircraft, a space station, or the like malfunctions, and the display device cannot display information correctly. Therefore, the occurrence of a soft error in a memory cell in the electronic device 510 may cause malfunction, leading to a serious accident. In the case of using the storage device of this embodiment, the program can suppress the occurrence of malfunction by using recovered data.

The storage device 518 preferably retains data that requires a high level of security, such as a personal identification number or a password. A storage area used by a program is known to deteriorate by being accessed a number of times. For this reason, the storage device 518 is preferably used in order to retain data that requires a high level of security.

Note that the occurrence of corruption of data that requires a high level of security by a soft error is not likely to be noticed because the data is not accessed frequently. In view of this, in the case of using the storage device of this embodiment, the program can correctly perform authentication processing or the like by using recovered data that requires a high level of security.

Next, the server system 520 is described. The server system 520 includes a processor 521, a storage device 522, a communication module 523, and a storage device unit 524. The storage device 522 retains a server control program. The server control program can control a plurality of storage device units 524 using the processor.

The storage device unit 524 is a unit of a module including a plurality of storage devices 1000. Although not illustrated in FIG. 5, the storage device unit 524 preferably includes a processor. The processor in the storage device unit 524 can control a plurality of storage device modules. Thus, the storage device unit 524 can retain and process a large volume of data. The server system 520 can include a plurality of storage device units 524a to 524n. Note that n is an integer of 2 or more.

A large-scale server system includes a plurality of storage device units 524 and therefore uses a large number of memory cells. This increases the probability of occurrence of soft errors. In the case of using the storage device of this embodiment, the program for the server system can suppress the occurrence of malfunction by using recovered data.

The storage device 512, the storage device 518, and the frame memory 517b of the electronic device 510 and the storage device 522 and the storage device units 524a to 524n of the server system 520, which are illustrated in FIG. 5, each correspond to the storage device described in this embodiment.

The structures and the methods described in this embodiment can be combined as appropriate with any of the structures and the methods described in the other embodiments.

(Embodiment 2)

In this embodiment, a semiconductor device including Si transistors and OS transistors is described. A structure of such a semiconductor device is described here using the storage device 1000 in Embodiment 1 as an example.

<<Stacked-Layer Structure of Memory Cell>>

A structure of the storage device 1000 is described with reference to FIG. 6. FIG. 6 illustrates a cross-sectional structure of the memory cell 10 as a typical example. The storage device 1000 includes a single crystal silicon wafer 5500 and a stacked layer including layers LX1 to LX6. A stacked layer including layers OX1 to OX9 is provided over the layer LX6. Wirings, electrodes, plugs, and the like are provided in the layers LX1 to LX6 and the layers OX1 to OX9.

Si transistors included in the sense circuit or the like, such as the transistor 22, are provided in the layer LX1. Channel formation regions of the Si transistors are provided in the single crystal silicon wafer 5500.

The voltage converter elements 23a to 23c are provided in the layer LX5. The voltage converter elements 23a to 23c can be provided in a layer under the layer LX5. Capacitors are used as the voltage converter elements illustrated in FIG. 1A. The structure of OS transistors provided in the layer OX2 is similar to the structure of an OS transistor 5001 to be described later (see FIG. 7A). A different structure of OS transistors corresponds to that of an OS transistor 5002 to be described later (see FIG. 7B).

OS transistors that are the transistor 11a and the transistor 12a are provided in the layer OX2. Back gate electrodes of the OS transistors are provided in the layer OX1.

The capacitor 13a is provided in the layer OX3.

OS transistors that are the transistor 11b and the transistor 12b are provided in the layer OX5. Back gate electrodes of the OS transistors are provided in the layer OX4.

A capacitor 13b is provided in the layer OX6.

OS transistors that are the transistor 11c and the transistor 12c are provided in the layer OX8. Back gate electrodes of the OS transistors are provided in the layer OX7.

A capacitor 13c is provided in the layer OX9.

Therefore, the transistors in the layers OX2, OX5, and OX8 are formed using different semiconductor layers. The transistors may have different levels of resistance to neutron rays or α rays by varying the composition of a metal oxide used for the semiconductor layers.

Note that FIG. 6 is a cross-sectional view showing an example of the stacked-layer structure of the storage device 1000, and is not a cross-sectional view of the storage device 1000 taken along a specific section line. Next, the structures of the OS transistors will be described with reference to FIGS. 7A and 7B and FIG. 8.

<<OS Transistor Structural Example 1>>

FIG. 7A illustrates a structural example of an OS transistor. The OS transistor 5001 illustrated in FIG. 7A is a metal oxide transistor. A cross-sectional view of the OS transistor 5001 in the channel length direction is illustrated on the left side of FIG. 7A, and a cross-sectional view of the OS transistor 5001 in the channel width direction is illustrated on the right side of FIG. 7A.

The OS transistor 5001 is formed over an insulating surface. Here, the OS transistor 5001 is formed over an insulating layer 5021. The OS transistor 5001 is covered with insulating layers 5028 and 5029. The OS transistor 5001 includes insulating layers 5022 to 5027 and 5030 to 5032, metal oxide layers 5011 to 5013, and conductive layers 5050 to 5054.

Note that the insulating layers, the metal oxide layers, the conductive layers, and the like in the drawing may each have a single-layer structure or a stacked-layer structure. These layers can be formed by any of a variety of deposition methods such as a sputtering method, a molecular beam epitaxy (MBE) method, a pulsed laser ablation (PLA) method, a CVD method, and an atomic layer deposition (ALD) method. Examples of the CVD method include a plasma CVD method, a thermal CVD method, and a metal organic CVD method.

The metal oxide layers 5011 to 5013 are collectively referred to as an oxide layer 5010. As illustrated in FIG. 7A, the oxide layer 5010 includes a portion where the metal oxide layer 5011, the metal oxide layer 5012, and the metal oxide layer 5013 are stacked in that order. When the OS transistor 5001 is on, a channel is mainly formed in the metal oxide layer 5012 of the oxide layer 5010.

A gate electrode of the OS transistor 5001 is constituted by the conductive layer 5050. A pair of electrodes that function as a source electrode and a drain electrode of the OS transistor 5001 is constituted by the conductive layers 5051 and 5052. The conductive layers 5050 to 5052 are covered with the insulating layers 5030 to 5032, respectively, that function as barrier layers. A back gate electrode of the OS transistor 5001 is constituted by a stack of the conductive layers 5053 and 5054. The OS transistor 5001 does not necessarily include the back gate electrode. The same applies to the OS transistor 5002 to be described later.

A gate insulating layer on a gate (front gate) side is constituted by the insulating layer 5027. A gate insulating layer on a back gate side is constituted by a stack of the insulating layers 5024 to 5026. The insulating layer 5028 is an interlayer insulating layer. The insulating layer 5029 is a barrier layer.

The metal oxide layer 5013 covers a stack of the metal oxide layers 5011 and 5012 and the conductive layers 5051 and 5052. The insulating layer 5027 covers the metal oxide layer 5013. The conductive layers 5051 and 5052 each include a region that overlaps with the conductive layer 5050 with the metal oxide layer 5013 and the insulating layer 5027 positioned therebetween.

Examples of a conductive material used for the conductive layers 5050 to 5054 include a semiconductor typified by polycrystalline silicon doped with an impurity element such as phosphorus; silicide such as nickel silicide; a metal such as molybdenum, titanium, tantalum, tungsten, aluminum, copper, chromium, neodymium, or scandium; and a metal nitride containing any of the above metals as its component (tantalum nitride, titanium nitride, molybdenum nitride, or tungsten nitride). A conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can be used.

For example, the conductive layer 5050 is a single layer of tantalum nitride or tungsten. Alternatively, in the case where the conductive layer 5050 has a two-layer structure or a three-layer structure, the following combinations can be used (the conductor written first is used for a layer on the insulating layer 5027 side): aluminum and titanium; titanium nitride and titanium; titanium nitride and tungsten; tantalum nitride and tungsten; tungsten nitride and tungsten; titanium, aluminum, and titanium; titanium nitride, aluminum, and titanium; and titanium nitride, aluminum, and titanium nitride.

The conductive layers 5051 and 5052 have the same layer structure. For example, in the case where the conductive layer 5051 is a single layer, any of metals such as aluminum, titanium, chromium, nickel, copper, yttrium, zirconium, molybdenum, silver, tantalum, and tungsten, or an alloy containing any of these metals as its main component may be used. In the case where the conductive layer 5051 has a two-layer structure or a three-layer structure, the following combinations can be used (the conductor written first is used for a layer on the insulating layer 5027 side): titanium and aluminum; tungsten and aluminum; tungsten and copper; a copper-magnesium-aluminum alloy and copper; titanium and copper; titanium or titanium nitride, aluminum or copper, and titanium or titanium nitride; and molybdenum or molybdenum nitride, aluminum or copper, and molybdenum or molybdenum nitride.

For example, it is preferable that the conductive layer 5053 be a conductive layer that has a hydrogen barrier property (e.g., a tantalum nitride layer) and that the conductive layer 5054 be a conductive layer that has higher conductivity than the conductive layer 5053 (e.g., a tungsten layer). With such a structure, the stack of the conductive layers 5053 and 5054 functions as a wiring and has a function of suppressing diffusion of hydrogen into the oxide layer 5010.

Examples of an insulating material used for the insulating layers 5021 to 5032 include aluminum nitride, aluminum oxide, aluminum nitride oxide, aluminum oxynitride, magnesium oxide, silicon nitride, silicon oxide, silicon nitride oxide, silicon oxynitride, gallium oxide, germanium oxide, yttrium oxide, zirconium oxide, lanthanum oxide, neodymium oxide, hafnium oxide, tantalum oxide, and aluminum silicate. The insulating layers 5021 to 5032 are each formed using a single-layer structure or a stacked-layer structure of these insulating materials. The layers used for the insulating layers 5021 to 5032 may include a plurality of insulating materials.

Note that in this specification and the like, an oxynitride refers to a compound that contains more oxygen than nitrogen, and a nitride oxide refers to a compound that contains more nitrogen than oxygen.

In the OS transistor 5001, the oxide layer 5010 is preferably surrounded by an insulating layer with oxygen and hydrogen barrier properties (hereinafter such an insulating layer is referred to as a barrier layer). With such a structure, it is possible to suppress the release of oxygen from the oxide layer 5010 and entry of hydrogen into the oxide layer 5010; thus, the reliability and electrical characteristics of the OS transistor 5001 can be improved.

For example, the insulating layer 5029 may function as a barrier layer and at least one of the insulating layers 5021, 5022, and 5024 may function as a barrier layer. The barrier layer can be formed using a material such as aluminum oxide, aluminum oxynitride, gallium oxide, gallium oxynitride, yttrium oxide, yttrium oxynitride, hafnium oxide, hafnium oxynitride, or silicon nitride. Another barrier layer may be provided between the oxide layer 5010 and the conductive layer 5050. Alternatively, a metal oxide layer that has oxygen and hydrogen barrier properties may be provided as the metal oxide layer 5013.

The insulating layer 5030 is preferably a barrier layer that prevents the conductive layer 5050 from becoming oxidized. When the insulating layer 5030 has an oxygen barrier property, oxidation of the conductive layer 5050 due to oxygen released from the insulating layer 5028 or the like can be suppressed. For example, the insulating layer 5030 can be formed using a metal oxide such as aluminum oxide.

A structural example of the insulating layers 5021 to 5032 is described. In this example, each of the insulating layers 5021, 5022, 5025, and 5029 to 5032 functions as a barrier layer. The insulating layers 5026 to 5028 are oxide layers containing excess oxygen. The insulating layer 5021 is formed using silicon nitride. The insulating layer 5022 is formed using aluminum oxide. The insulating layer 5023 is formed using silicon oxynitride. The gate insulating layers (5024 to 5026) on the back gate side are formed using a stack of silicon oxide, aluminum oxide, and silicon oxide. The gate insulating layer (5027) on the front gate side is formed using silicon oxynitride. The interlayer insulating layer (5028) is formed using silicon oxide. The insulating layers 5029 to 5032 are formed using aluminum oxide.

FIG. 7A illustrates an example in which the oxide layer 5010 has a three-layer structure; however, one embodiment of the present invention is not limited thereto. For example, the oxide layer 5010 may have a two-layer structure without the metal oxide layer 5011 or 5013, or may be constituted by only one of the metal oxide layers 5011 to 5013. Alternatively, the oxide layer 5010 may be constituted by four or more metal oxide layers.

<<OS Transistor Structural Example 2>>

FIG. 7B illustrates a structural example of an OS transistor. The OS transistor 5002 in FIG. 7B is a modification example of the OS transistor 5001. A cross-sectional view of the OS transistor 5002 in the channel length direction is illustrated on the left side of FIG. 7B, and a cross-sectional view of the OS transistor 5002 in the channel width direction is illustrated on the right side of FIG. 7B.

In the OS transistor 5002, upper and side surfaces of a stack of the metal oxide layers 5011 and 5012 are covered with a stack of the metal oxide layer 5013 and the insulating layer 5027. Therefore, the insulating layers 5031 and 5032 are not necessarily provided in the OS transistor 5002.

<<OS Transistor Structural Example 3>>

FIG. 8 illustrates a structural example of an OS transistor. An OS transistor 5003 illustrated in FIG. 8 is a modification example of the OS transistor 5001 and differs therefrom mainly in the structure of the gate electrode. A cross-sectional view of the OS transistor 5003 in the channel length direction is illustrated on the left side of FIG. 8, and a cross-sectional view of the OS transistor 5003 in the channel width direction is illustrated on the right side of FIG. 8.

The metal oxide layer 5013, the insulating layer 5027, and the conductive layer 5050 are provided in an opening portion formed in the insulating layer 5028. In other words, a gate electrode is formed in a self-aligned manner by using the opening portion in the insulating layer 5028. Thus, in the OS transistor 5002, the gate electrode (5050) does not include a region that overlaps with the source electrode or the drain electrode (5051 or 5052) with the gate insulating layer (5017) positioned therebetween. Accordingly, gate-source parasitic capacitance and gate-drain parasitic capacitance can be reduced and frequency characteristics can be improved. Furthermore, the gate electrode width can be controlled by the opening portion in the insulating layer 5028; thus, it is easy to fabricate an OS transistor with a short channel length.

<<OS Transistor Structural Example 4>>

FIGS. 23A to 23C illustrate a structural example of an OS transistor. The transistor illustrated in FIGS. 23A to 23C will be described in detail in Embodiment 5.

A channel formation region of the OS transistor preferably includes a cloud-aligned composite oxide semiconductor (CAC-OS).

The CAC-OS has a conducting function in a part of the material and has an insulating function in another part of the material; as a whole, the CAC-OS has a function of a semiconductor. In the case where the CAC-OS or a CAC metal oxide is used in an active layer of a transistor, the conducting function is to allow electrons (or holes) serving as carriers to flow, and the insulating function is to not allow electrons serving as carriers to flow. By the complementary action of the conducting function and the insulating function, the CAC-OS can have a switching function (on/off function). In the CAC-OS, separation of the functions can maximize each function.

The CAC-OS includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS, the conductive regions and the insulating regions each have a size of more than or equal to 0.5 nm and less than or equal to 10 nm, preferably more than or equal to 0.5 nm and less than or equal to 3 nm and are dispersed in the material, in some cases.

The CAC-OS includes components having different bandgaps. For example, the CAC-OS includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS is used in a channel formation region of a transistor, high current drive capability and high field-effect mobility of the OS transistor can be obtained.

A metal oxide semiconductor is classified into a single crystal metal oxide semiconductor and a non-single-crystal metal oxide semiconductor according to crystallinity. Examples of a non-single-crystal metal oxide semiconductor include a c-axis aligned crystalline oxide semiconductor (CAAC-OS), a polycrystalline metal oxide semiconductor, a nanocrystalline oxide semiconductor (nc-OS), an amorphous-like oxide semiconductor (a-like OS), and the like.

The channel formation region of the OS transistor preferably includes a metal oxide including a crystal part, such as a CAAC-OS or an nc-OS.

The CAAC-OS has c-axis alignment, its nanocrystals are connected in the a-b plane direction, and its crystal structure has distortion. Note that distortion refers to a portion where the direction of a lattice arrangement changes between a region with a uniform lattice arrangement and another region with a uniform lattice arrangement in a region where the nanocrystals are connected.

The shape of the nanocrystal is basically a hexagon but is not always a regular hexagon and is a non-regular hexagon in some cases. A pentagonal lattice arrangement, a heptagonal lattice arrangement, or the like is included in the distortion in some cases. Note that a clear crystal grain boundary cannot be observed even in the vicinity of distortion in the CAAC-OS. That is, a lattice arrangement is distorted so that formation of a crystal grain boundary is inhibited. This is probably because the CAAC-OS can tolerate distortion owing to a low density of arrangement of oxygen atoms in an a-b plane direction, a change in interatomic bond distance by substitution of a metal element, and the like.

The CAAC-OS tends to have a layered crystal structure (also referred to as a layered structure) in which a layer containing indium and oxygen (hereinafter, In layer) and a layer containing the element M, zinc, and oxygen (hereinafter, (M,Zn) layer) are stacked. Note that indium and the element M can be replaced with each other, and when the element M of the (M,Zn) layer is replaced with indium, the layer can also be referred to as an (In,M,Zn) layer. When indium of the In layer is replaced with the element M, the layer can also be referred to as an (In,M) layer.

In the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different nanocrystals in the nc-OS. Thus, the orientation of the whole film is not observed. Accordingly, in some cases, the nc-OS cannot be distinguished from an a-like OS or an amorphous oxide semiconductor, depending on an analysis method.

The a-like OS is a metal oxide semiconductor having a structure intermediate between those of the nc-OS and the amorphous metal oxide semiconductor. The a-like OS has a void or a low-density region. The a-like OS has low crystallinity as compared with the nc-OS and the CAAC-OS.

In this specification and the like, a CAC refers to the function or material of a metal oxide semiconductor, and a CAAC refers to the crystal structure of a metal oxide semiconductor.

The structures and the methods described in this embodiment can be combined as appropriate with any of the structures and the methods described in the other embodiments.

(Embodiment 3)

The display module used in the electronic device 510 illustrated in FIG. 5 will be described. An example in which a hybrid display device including a combination of a self-luminous display element and a reflective display element is used as the display 517c of the display module will be described.

The display device of this embodiment has a structure where a first display panel and a second display panel are bonded to each other with an adhesive layer therebetween. In the first display panel, first pixels that include reflective display elements are provided. In the second display panel, second pixels that include light-emitting elements are provided. Although a liquid crystal element is used as the reflective display element in this embodiment, an electrophoretic display element or the like may be used as the reflective display element. The reflective display elements can produce gray levels by controlling the amount of reflected light. The light-emitting elements can produce gray levels by controlling the amount of light emission.

The display device can perform display by using only reflected light, display by using only light emitted from the light-emitting elements, and display by using both reflected light and light emitted from the light-emitting elements, for example.

The first display panel is provided on the viewing side. The second display panel is provided on the side opposite to the viewing side. The first display panel includes a first resin layer in a position closest to the adhesive layer. The second display panel includes a second resin layer in a position closest to the adhesive layer.

It is preferable that a third resin layer be provided on the display surface side of the first display panel and a fourth resin layer be provided on the rear surface side (the side opposite to the display surface side) of the second display panel. Thus, the display device can be extremely lightweight and less likely to be broken.

The first to fourth resin layers (hereinafter, also collectively referred to as a resin layer) have a feature of being extremely thin. Specifically, it is preferable that each of the resin layers have a thickness of 0.1 µm or more and 3 µm or less. Thus, even a structure where the two display panels are stacked can have a small thickness. Furthermore, light absorption due to the resin layer positioned in the path of light emitted from the light-emitting element in the second pixel can be reduced, so that light can be extracted with higher efficiency and the power consumption can be reduced.

The resin layer can be formed in the following manner, for example. A thermosetting resin material with a low viscosity is applied to a support substrate and cured by heat treatment to form the resin layer. Then, a structure is formed over the resin layer. Then, the resin layer and the support substrate are separated from each other, whereby one surface of the resin layer is exposed.

As an example of a method for reducing adhesion between the support substrate and the resin layer to separate the support substrate and the resin layer from each other, laser light irradiation can be given. For example, the irradiation by scanning using linear laser light may be performed. By the method, the process time for a large support substrate can be shortened. As the laser light, excimer laser light with a wavelength of 308 nm can be suitably used. The method for reducing adhesion is not limited to laser light irradiation and may be another method such as heat treatment.

A thermosetting polyimide is a typical example of a material that can be used for the resin layer. It is particularly preferable to use a photosensitive polyimide. A photosensitive polyimide is a material that is suitable for a planarization film or the like of the display panel, and therefore, the same formation apparatus and the same material can be used. Thus, there is no need to prepare another apparatus and another material to obtain the structure of one embodiment of the present invention.

Furthermore, the resin layer that is formed using a photosensitive resin material can be processed by light exposure and development treatment. For example, an opening can be formed and an unnecessary portion can be removed. Moreover, by optimizing a light exposure method or light exposure conditions, an uneven shape can be formed on a surface of the resin layer. For example, a light exposure technique using a half-tone mask or a gray-tone mask or a multiple light exposure technique may be used.

Note that a non-photosensitive resin material may be used. In that case, a method for forming an opening or an uneven shape using a resist mask or a hard mask that is formed over the resin layer can be used.

In that case, part of the resin layer that is positioned in the path of light emitted from the light-emitting element is preferably removed. That is, an opening overlapping with the light-emitting element is provided in the first resin layer and the second resin layer. Thus, a reduction in color reproducibility and a reduction in light extraction efficiency that are caused by absorption of part of light emitted from the light-emitting element by the resin layer can be inhibited.

Alternatively, the resin layer may be provided with a depressed portion so that a portion of the resin layer that is positioned in the path of light emitted from the light-emitting element is thinner than the other portion. That is, the resin layer may include two portions with different thicknesses and have a structure where the portion with a smaller thickness overlaps with the light-emitting element. Even with such a structure, absorption of light emitted from the light-emitting element by the resin layer can be reduced.

In the case where the first display panel includes the third resin layer, an opening overlapping with the light-emitting element is preferably provided in a manner similar to that described above. Thus, color reproducibility and light extraction efficiency can be further increased.

In the case where the first display panel includes the third resin layer, part of the third resin layer that is positioned in the path of light of the reflective liquid crystal element is preferably removed. That is, an opening overlapping with the reflective liquid crystal element is provided in the third resin layer. This can increase the reflectivity of the reflective liquid crystal element.

In the case where the opening is formed in the resin layer, a light-absorbing layer is formed over the support substrate, the resin layer having the opening is formed over the light-absorbing layer, and a light-transmitting layer covering the opening is formed. The light-absorbing layer is a layer that emits a gas such as hydrogen or oxygen by absorbing light and being heated. By performing light irradiation from the support substrate side to make the light-absorbing layer emit a gas, adhesion at the interface between the light-absorbing layer and the support substrate or between the light-absorbing layer and the light-transmitting layer can be reduced to cause separation, or the light-absorbing layer itself can be broken to cause separation.

As another example, the following method can be used. That is, a thin part is formed in a portion where the opening of the resin layer is to be formed, and the support substrate and the resin layer are separated from each other by the above-described method. Then, plasma treatment or the like is performed on a separated surface of the resin layer to reduce the thickness of the resin layer, whereby the opening can be formed in the thin part of the resin layer.

Each of the first pixel and the second pixel preferably includes a transistor. Furthermore, an oxide semiconductor is preferably used as a semiconductor where a channel of the transistor is formed. An oxide semiconductor can achieve high on-state current and high reliability even when the highest temperature in the manufacturing process of the transistor is reduced (e.g., 400° C. or lower, preferably 350° C. or lower). Furthermore, in the case of using an oxide semiconductor, high heat resistance is not required for a material of the resin layer positioned on the surface side on which the transistor is formed (i.e., on the formation surface side of the transistor); thus, the material of the resin layer can be selected from a wider range of alternatives. For example, the material can be the same as a resin material of the planarization film.

In the case of using low-temperature polysilicon (LTPS), for example, processes such as a laser crystallization process, a baking process before crystallization, and a baking process for activating impurities are required, and the highest temperature in the manufacturing process of the transistor is higher than that in the above-described case of using an oxide semiconductor (e.g., higher than or equal to 500° C., higher than or equal to 550° C., or higher than or equal to 600° C.), though high field-effect mobility can be obtained. Therefore, high heat resistance is required for the resin layer positioned on the surface side on which the transistor is formed. In addition, the thickness of the resin layer needs to be comparatively large (e.g., larger than or equal to 10 µm, or larger than or equal to 20 µm) because the resin layer is also irradiated with laser light in the laser crystallization process.

In contrast, in the case of using an oxide semiconductor, no special material having high heat resistance is required for the resin layer, and the resin layer does not need to be formed thick. Thus, the proportion of the cost of the resin layer in the cost of the whole display panel can be reduced.

An oxide semiconductor has a wide band gap (e.g., 2.5 eV or more, or 3.0 eV or more) and transmits light. Thus, even when an oxide semiconductor is irradiated with laser light in a step of separating the support substrate and the resin layer, the laser light is hardly absorbed, so that the electrical characteristics can be less affected. Therefore, the resin layer can be thin as described above.

In one embodiment of the present invention, a display device excellent in producibility can be obtained by using both a resin layer that is formed thin using a photosensitive resin material with a low viscosity typified by a photosensitive polyimide and an oxide semiconductor with which a transistor having excellent electrical characteristics can be obtained even at a low temperature.

Next, a pixel structure will be described. The first pixels and the second pixels are arranged in a matrix to form the display portion. In addition, the display device preferably includes a first driver portion for driving the first pixels and a second driver portion for driving the second pixels. It is preferable that the first driver portion be provided in the first display panel and the second driver portion be provided in the second display panel.

The first pixels and the second pixels are preferably arranged in a display region with the same pitch. Furthermore, the first pixels and the second pixels are preferably mixed in the display region of the display device. Accordingly, as described later, an image displayed by a plurality of first pixels, an image displayed by a plurality of second pixels, and an image displayed by both the plurality of first pixels and the plurality of second pixels can be displayed in the same display region.

Next, transistors that can be used in the first display panel and the second display panel will be described. A transistor provided in the first pixel of the first display panel and a transistor provided in the second pixel of the second display panel may have either the same structure or different structures.

As an example of a structure of the transistor, a bottom-gate structure can be given. A transistor having a bottom-gate structure includes a gate electrode below a semiconductor layer (on the formation surface side). A source electrode and a drain electrode are provided in contact with an upper surface and the side end portions of the semiconductor layer, for example.

As an example of another structure of the transistor, a top-gate structure can be given. A transistor having a top-gate structure includes a gate electrode above a semiconductor layer (on the side opposite to the formation surface side). A first source electrode and a first drain electrode are provided over an insulating layer covering part of an upper surface and a side end portion of the semiconductor layer and are electrically connected to the semiconductor layer through openings provided in the insulating layer, for example.

The transistor preferably includes a first gate electrode and a second gate electrode that face each other with the semiconductor layer provided therebetween.

A more specific example of the display device of one embodiment of the present invention will be described below with reference to drawings.

[Structural Example 1]

Figure 9:
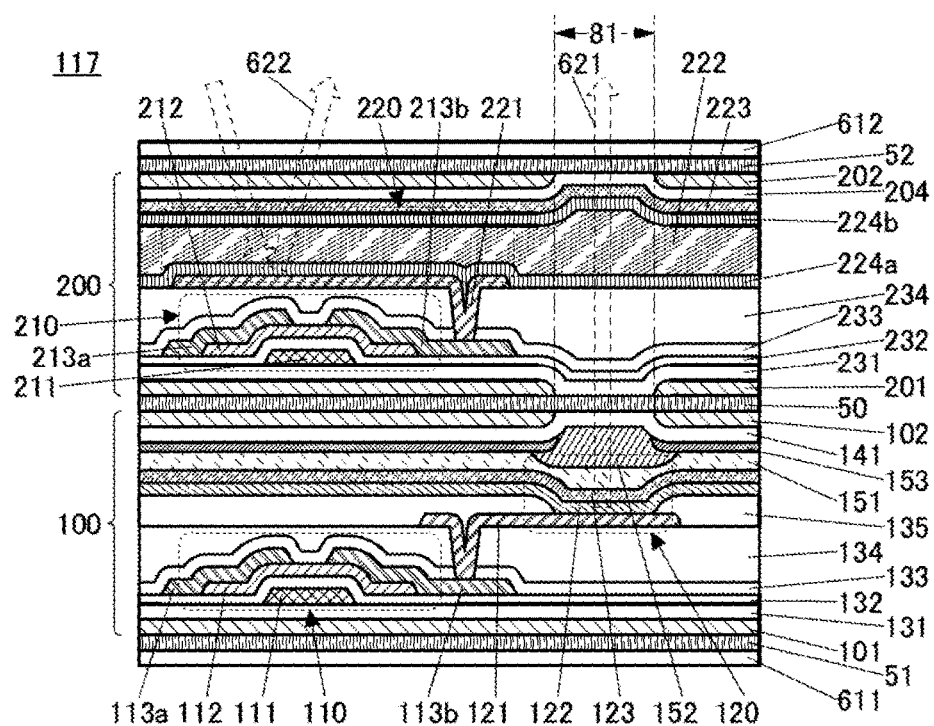
FIG. 9 is a cross-sectional view illustrating a structural example of a display device.

FIG. 9 is a schematic cross-sectional view of a display 117. In the display 117, a display panel 100 and a display panel 200 are bonded to each other using an adhesive layer 50. The display 117 includes a substrate 611 on the rear side (the side opposite to the viewing side) and a substrate 612 on the front side (the viewing side).

The display panel 100 includes a transistor 110 and a light-emitting element 120 between a resin layer 101 and a resin layer 102. The display panel 200 includes a transistor 210 and a liquid crystal element 220 between a resin layer 201 and a resin layer 202. The resin layer 101 is bonded to the substrate 611 with an adhesive layer 51 positioned therebetween. The resin layer 202 is bonded to the substrate 612 with an adhesive layer 52 positioned therebetween.

The resin layer 102, the resin layer 201, and the resin layer 202 are each provided with an opening. A region 81 illustrated in FIG. 9 is a region overlapping with the light-emitting element 120 and overlapping with the opening in the resin layer 102, the opening in the resin layer 201, and the opening in the resin layer 202.

[Display Panel 100]

The resin layer 101 is provided with the transistor 110, the light-emitting element 120, an insulating layer 131, an insulating layer 132, an insulating layer 133, an insulating layer 134, an insulating layer 135, and the like. The resin layer 102 is provided with a light-blocking layer 153, a coloring layer 152, and the like. The resin layer 101 and the resin layer 102 are bonded to each other using an adhesive layer 151.

The transistor 110 is provided over the insulating layer 131 and includes a conductive layer 111 serving as a gate electrode, part of the insulating layer 132 serving as a gate insulating layer, a semiconductor layer 112, a conductive layer 113a serving as one of a source electrode and a drain electrode, and a conductive layer 113b serving as the other of the source electrode and the drain electrode.

The semiconductor layer 112 preferably includes an oxide semiconductor.

The insulating layer 133 and the insulating layer 134 cover the transistor 110. The insulating layer 134 serves as a planarization layer.

The light-emitting element 120 includes a conductive layer 121, an EL layer 122, and a conductive layer 123 that are stacked. The conductive layer 121 has a function of reflecting visible light, and the conductive layer 123 has a function of transmitting visible light. Therefore, the light-emitting element 120 is a light-emitting element having a top-emission structure which emits light to the side opposite to the formation surface side.

The conductive layer 121 is electrically connected to the conductive layer 113b through an opening provided in the insulating layer 134 and the insulating layer 133. The insulating layer 135 covers an end portion of the conductive layer 121 and is provided with an opening to expose an upper surface of the conductive layer 121. The EL layer 122 and the conductive layer 123 are provided in this order to cover the insulating layer 135 and the exposed portion of the conductive layer 121.

An insulating layer 141 is provided on the resin layer 101 side of the resin layer 102. The light-blocking layer 153 and the coloring layer 152 are provided on the resin layer 101 side of the insulating layer 141. The coloring layer 152 is provided in a region overlapping with the light-emitting element 120. The light-blocking layer 153 includes an opening in a portion overlapping with the light-emitting element 120.

The insulating layer 141 covers the opening in the resin layer 102. A portion of the insulating layer 141 that overlaps with the opening in the resin layer 102 is in contact with the adhesive layer 50.

[Display Panel 200]

The resin layer 201 is provided with the transistor 210, a conductive layer 221, an alignment film 224a, an insulating layer 231, an insulating layer 232, an insulating layer 233, an insulating layer 234, and the like. The resin layer 202 is provided with an insulating layer 204, a conductive layer 223, an alignment film 224b, and the like. Liquid crystal 222 is positioned between the alignment film 224a and the alignment film 224b. The resin layer 201 and the resin layer 202 are bonded to each other using an adhesive layer in a region not illustrated.

The transistor 210 is provided over the insulating layer 231 and includes a conductive layer 211 serving as a gate electrode, part of the insulating layer 232 serving as a gate insulating layer, a semiconductor layer 212, a conductive layer 213a serving as one of a source electrode and a drain electrode, and a conductive layer 213b serving as the other of the source electrode and the drain electrode.

The semiconductor layer 212 preferably includes an oxide semiconductor.

The insulating layer 233 and the insulating layer 234 cover the transistor 210. The insulating layer 234 serves as a planarization layer.

The liquid crystal element 220 includes the conductive layer 221, the conductive layer 223, and the liquid crystal 222 positioned therebetween. The conductive layer 221 has a function of reflecting visible light, and the conductive layer 223 has a function of transmitting visible light. Therefore, the liquid crystal element 220 is a reflective liquid crystal element.

The conductive layer 221 is electrically connected to the conductive layer 213b through an opening provided in the insulating layer 234 and the insulating layer 233. The alignment film 224a covers surfaces of the conductive layer 221 and the insulating layer 234.

The conductive layer 223 and the alignment film 224b are stacked on the resin layer 201 side of the resin layer 202. Note that the insulating layer 204 is provided between the resin layer 202 and the conductive layer 223. In addition, a coloring layer for coloring light reflected by the liquid crystal element 220 may be provided.

The insulating layer 231 covers the opening in the resin layer 201. A portion of the insulating layer 231 that overlaps with the opening in the resin layer 202 is in contact with the adhesive layer 50. The insulating layer 204 covers the opening in the resin layer 202. A portion of the insulating layer 204 that overlaps with the opening in the resin layer 202 is in contact with the adhesive layer 52.

[Display 117]

The display 117 includes a portion where the light-emitting element 120 does not overlap with the reflective liquid crystal element 220 when seen from above. Thus, light 621 that is emitted from the light-emitting element 120 and colored by the coloring layer 152 exits toward the viewing side as illustrated in FIG. 9. Furthermore, reflected light 622 that is external light reflected by the conductive layer 221 exits from the liquid crystal element 220 through the liquid crystal 222.

The light 621 emitted from the light-emitting element 120 exits toward the viewing side through the opening in the resin layer 102, the opening in the resin layer 201, and the opening in the resin layer 202. Since the resin layer 102, the resin layer 201, and the resin layer 202 are not provided in the path of the light 621, even in the case where the resin layer 102, the resin layer 201, and the resin layer 202 absorb part of visible light, high light extraction efficiency and high color reproducibility can be obtained.

Note that the substrate 612 serves as a polarizing plate or a circular polarizing plate. A polarizing plate or a circular polarizing plate may be located outward from the substrate 612.

In the above-described structure of the display panel 200, a coloring layer is not included and color display is not performed, but a coloring layer may be provided on the resin layer 202 side to perform color display.

The above is the description of the structural example.

[Example of Manufacturing Method]

An example of a manufacturing method of the display 117 illustrated in FIG. 9 will be described below with reference to drawings.

Note that thin films included in the display device (e.g., insulating films, semiconductor films, and conductive films) can be formed by any of a sputtering method, a chemical vapor deposition (CVD) method, a vacuum evaporation method, a pulsed laser deposition (PLD) method, an atomic layer deposition (ALD) method, and the like. As the CVD method, a plasma-enhanced chemical vapor deposition (PECVD) method or a thermal CVD method may be used. As the thermal CVD method, for example, a metal organic chemical vapor deposition (MOCVD) method may be used.

Alternatively, thin films included in the display device (e.g., insulating films, semiconductor films, and conductive films) can be formed by a method such as spin coating, dipping, spray coating, ink-jetting, dispensing, screen printing, or offset printing or with a doctor knife, a slit coater, a roll coater, a curtain coater, or a knife coater.

When thin films included in the display device are processed, a photolithography method or the like can be used for the processing. Alternatively, island-shaped thin films may be formed by a film formation method using a shielding mask. Alternatively, a nanoimprinting method, a sandblasting method, a lift-off method, or the like may be used for the processing of thin films. Examples of the photolithography method include a method in which a photosensitive resist material is applied to a thin film to be processed, the material is exposed to light using a photomask and developed to form a resist mask, the thin film is processed by etching or the like, and the resist mask is removed, and a method in which a photosensitive thin film is formed and processed into a desired shape by light exposure and development.

As light used for light exposure in the photolithography method, for example, light with an i-line (wavelength: 365 nm), light with a g-line (wavelength: 436 nm), light with an h-line (wavelength: 405 nm), or light in which the i-line, the g-line, and the h-line are mixed can be used. Alternatively, ultraviolet light, KrF laser light, ArF laser light, or the like can be used. Light exposure may be performed by liquid immersion exposure technique. As the light for the light exposure, extreme ultra-violet (EUV) light or X-rays may be used. Instead of the light for the light exposure, an electron beam can be used. It is preferable to use EUV light, X-rays, or an electron beam because extremely minute processing can be performed. Note that in the case of performing light exposure by scanning with light or a beam such as an electron beam, a photomask is not needed.

For etching of thin films, a dry etching method, a wet etching method, a sandblast method, or the like can be used.

[Formation of Resin Layer]

First, a support substrate 61 is prepared. For the support substrate 61, a material having stiffness high enough for easy transfer and having resistance to heat applied in the manufacturing process can be used. For example, a material such as glass, quartz, ceramics, sapphire, an organic resin, a semiconductor, a metal, or an alloy can be used. As the glass, for example, alkali-free glass, barium borosilicate glass, or aluminoborosilicate glass can be used.

Figure 10A:
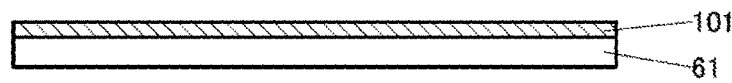
FIGS. 10A to 10E are cross-sectional views illustrating an example of a method for manufacturing a display device.

Next, the resin layer 101 is formed over the support substrate 61 (FIG. 10A).

First, a material to be the resin layer 101 is applied to the support substrate 61. For the application, a spin coating method is preferred because the resin layer 101 can be thinly and uniformly formed over a large substrate.

Alternatively, the resin layer 101 can be formed by dipping, spray coating, ink jetting, dispensing, screen printing, or offset printing or with a doctor knife, a slit coater, a roll coater, a curtain coater, or a knife coater, for example.

The material contains a polymerizable monomer exhibiting a thermosetting property by which polymerization proceeds with heat (also referred to as a thermopolymerization property). Furthermore, the material is preferably photosensitive. In addition, the material preferably contains a solvent for adjusting the viscosity.

The material preferably contains a polymerizable monomer that becomes a polyimide resin, an acrylic resin, an epoxy resin, a polyamide resin, a polyimide amide resin, a siloxane resin, a benzocyclobutene-based resin, or a phenol resin after polymerization. That is, the formed resin layer 101 contains any of these resin materials. In particular, it is preferable that the material include a polymerizable monomer containing an imide bond and a resin typified by a polyimide resin be used for the resin layer 101 because heat resistance and weatherability can be improved.

The viscosity of the material used for the application is greater than or equal to 5 cP and less than 500 cP, preferably greater than or equal to 5 cP and less than 100 cP, more preferably greater than or equal to 10 cP and less than or equal to 50 cP. The lower the viscosity of the material is, the easier the application is. Furthermore, the lower the viscosity of the material is, the more the entry of bubbles can be suppressed, leading to a film with good quality. Lower viscosity of the material enables thin and uniform application, whereby the resin layer 101 can be thinner.

Then, the support substrate 61 is heated to polymerize the applied material, whereby the resin layer 101 is formed. At this time, the solvent in the material is removed by the heating. The temperature at this heating is preferably higher than the highest temperature in the manufacturing process of the transistor 110 to be performed later. The temperature is, for example, higher than or equal to 300° C. and lower than or equal to 600° C., preferably higher than or equal to 350° C. and lower than or equal to 550° C., further preferably higher than or equal to 400° C. and lower than or equal to 500° C., and is typically 450° C. For the formation of the resin layer 101, heating at such a temperature is performed in a state where the surface of the resin layer 101 is exposed, so that a gas that can be released from the resin layer 101 can be removed. Thus, release of the gas in the manufacturing process of the transistor 110 can be suppressed.

The thickness of the resin layer 101 is preferably greater than or equal to 0.01 μm and less than 10 μm, further preferably greater than or equal to 0.1 μm and less than or equal to 3 μm, and still further preferably greater than or equal to 0.5 μm and less than or equal to 1 μm. The use of a low viscosity solvent facilitates thin and uniform formation of the resin layer 101.

The thermal expansion coefficient of the resin layer 101 is preferably greater than or equal to 0.1 ppm/° C. and less than or equal to 20 ppm/° C., and further preferably greater than or equal to 0.1 ppm/° C. and less than or equal to 10 ppm/° C. The lower the thermal expansion coefficient of the resin layer 101 is, the more the breakage of the transistor or the like by stress caused by expansion or contraction due to heating can be suppressed.

In the case where an oxide semiconductor film is used as the semiconductor layer 112 in the transistor 110, the semiconductor layer 112 can be formed at a low temperature, so that the resin layer 101 does not need high heat resistance. The heat resistance of the resin layer 101 or the like can be evaluated by, for example, weight loss percentage due to heating, specifically 5% weight loss temperature. The 5% weight loss temperature of the resin layer 101 or the like is lower than or equal to 450° C., preferably lower than or equal to 400° C., further preferably lower than 400° C., still further preferably lower than 350° C. In addition, the highest temperature in the process for forming the transistor 110 or the like is preferably lower than or equal to 350° C.

In the case where a photosensitive material is used for the resin layer 101, part of the resin layer 101 can be removed by a photolithography method. Specifically, after the material is applied, heat treatment (also referred to as pre-baking) for removing the solvent is performed, and then light exposure is performed. Next, development is performed, whereby an unnecessary portion can be removed. After that, heat treatment (also referred to as post-baking) is preferably performed. The second heat treatment may be performed at the above-described temperature.

An opening is formed in the resin layer 101 in the above manner, so that a structure described below can be achieved. For example, by disposing a conductive layer to cover the opening, an electrode which is partly exposed on the rear surface side (also referred to as a rear electrode or a through electrode) can be formed after a separation process to be described later. The electrode can be used as an external connection terminal. Furthermore, for example, a structure in which the resin layer 101 is not provided in a marker portion for bonding of two display panels can improve the alignment accuracy.

[Formation of Insulating Layer 131]

Figure 10B:
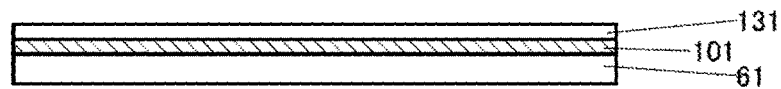

The insulating layer 131 is formed over the resin layer 101 (FIG. 10B).

The insulating layer 131 can be used as a barrier layer that prevents impurities contained in the resin layer 101 from diffusing into a transistor or a light-emitting element to be formed later. Therefore, it is preferable to use a material having a high barrier property.

For the insulating layer 131, an inorganic insulating material such as a silicon nitride film, a silicon oxynitride film, a silicon oxide film, a silicon nitride oxide film, an aluminum oxide film, or an aluminum nitride film can be used. Two or more of these insulating films may be stacked. In particular, it is preferable to use a structure in which a silicon nitride film and a silicon oxide film are stacked in this order over the resin layer 101.

In the case where the resin layer 101 has an uneven surface, the insulating layer 131 preferably covers the unevenness. The insulating layer 131 may function as a planarization layer that fills the unevenness. It is preferable to use a stack including an organic insulating material and an inorganic insulating material for the insulating layer 131, for example. The organic insulating material can be an organic resin such as an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin.

The insulating layer 131 is preferably formed at a temperature higher than or equal to room temperature and lower than or equal to 400° C., further preferably higher than or equal to 100° C. and lower than or equal to 350° C., still further preferably higher than or equal to 150° C. and lower than or equal to 300° C.

[Formation of Transistor]

Figure 10C:
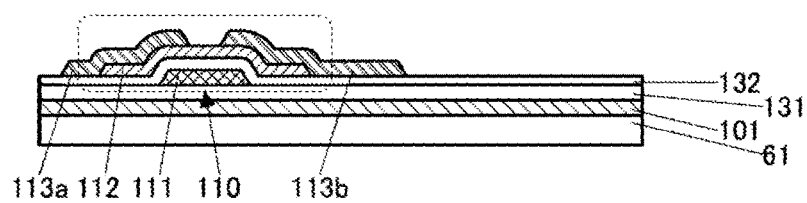

Next, as illustrated in FIG. 10C, the transistor 110 is formed over the insulating layer 131. Here, an example in which a bottom-gate transistor is formed as an example of the transistor 110 will be described.

The conductive layer 111 is formed over the insulating layer 131. The conductive layer 111 can be formed in the following manner: a conductive film is formed, a resist mask is formed, the conductive film is etched, and the resist mask is removed.

Next, the insulating layer 132 is formed. For the insulating layer 132, the description of the inorganic insulating film that can be used as the insulating layer 131 can be referred to.

Then, the semiconductor layer 112 is formed. The semiconductor layer 112 can be formed in the following manner: a semiconductor film is formed, a resist mask is formed, the semiconductor film is etched, and the resist mask is removed.

The semiconductor film is formed at a substrate temperature higher than or equal to room temperature and lower than or equal to 300° C., preferably higher than or equal to room temperature and lower than or equal to 220° C., further preferably higher than or equal to room temperature and lower than or equal to 200° C., still further preferably higher than or equal to room temperature and lower than or equal to 170° C. Here, "the substrate temperature for the film formation is room temperature" means that the substrate is not heated, and includes the case where the substrate temperature is higher than the room temperature because the substrate receives energy in the film formation. The room temperature has a range of, for example, higher than or equal to 10° C. and lower than or equal to 30° C., and is typically 25° C.

It is preferable to use an oxide semiconductor for the semiconductor film. In particular, an oxide semiconductor having a wider band gap than silicon is preferably used. A semiconductor material having a wider band gap and a lower carrier density than silicon is preferably used because off-state current of the transistor can be reduced.

It is preferable to use a material having a band gap of greater than or equal to 2.5 eV, preferably greater than or equal to 2.8 eV, further preferably greater than or equal to 3.0 eV as the oxide semiconductor. With use of such an oxide semiconductor, in light (e.g., laser light) irradiation in the separation process to be described later, the light passes through the semiconductor film and thus electrical characteristics of the transistor are less likely to be adversely affected.

In particular, the semiconductor film used for one embodiment of the present invention is preferably formed under an atmosphere that contains one or both of an inert gas (e.g., Ar) and an oxygen gas by a sputtering method in a state where the substrate is heated.

The substrate temperature for the film formation is preferably higher than or equal to room temperature and lower than or equal to 200° C., further preferably higher than or equal to room temperature and lower than or equal to 170° C. A high substrate temperature results in a larger number of crystal parts with orientation, which electrically stabilize the semiconductor film. A transistor including such a semiconductor film can have high electrical stability. Alternatively, film formation at a low substrate temperature or film formation without substrate heating can make a semiconductor film have a low proportion of crystal parts with orientation and high carrier mobility. A transistor including such a semiconductor film can have high field-effect mobility.

The oxygen flow rate ratio (partial pressure of oxygen) during the film formation is preferably higher than or equal to 0% and lower than 100%, further preferably higher than or equal to 0% and lower than or equal to 50%, still further preferably higher than or equal to 0% and lower than or equal to 33%, and yet still further preferably higher than or equal to 0% and lower than or equal to 15%. A low oxygen flow rate can result in a semiconductor film with high carrier mobility, leading to a transistor with high field-effect mobility.

Setting the substrate temperature and the oxygen flow rate during the film formation within the above ranges can result in a semiconductor film containing both crystal parts with orientation and crystal parts with no orientation. Furthermore, the proportions of crystal parts with orientation and crystal parts with no orientation can be adjusted by optimization of the substrate temperature and the oxygen flow rate within the above ranges.

An oxide target that can be used for forming the semiconductor film is not limited to an In—Ga—Zn-based oxide; for example, an In-M-Zn-based oxide (M is Al, Y, or Sn) can be used.

When a semiconductor film containing crystal parts is formed using a sputtering target containing a polycrystalline oxide having a plurality of crystal grains, a semiconductor film with crystallinity can be obtained more easily than in the case of using a sputtering target not containing a polycrystalline oxide.

In particular, a transistor including a semiconductor film that contains both crystal parts with orientation in a thickness direction (also referred to as a film surface direction, or a direction perpendicular to a formation surface or a surface of a film) and crystal parts with no such orientation and with random orientation can have more stable electrical characteristics and a smaller channel length, for example. On the other hand, a transistor including a semiconductor film that contains only crystal parts with no orientation can have high field-effect mobility. Note that as described below, a reduction in oxygen vacancies in an oxide semiconductor can achieve a transistor with high field-effect mobility and highly stable electrical characteristics.

In the case of using the oxide semiconductor film as described above, high-temperature heat treatment and a laser crystallization process which are needed for LTPS are unnecessary; thus, the semiconductor layer 112 can be formed at a significantly low temperature. Therefore, the resin layer 101 can be formed thin.

Then, the conductive layer 113a and the conductive layer 113b are formed. The conductive layers 113a and 113b can be formed in the following manner: a conductive film is formed, a resist mask is formed, the conductive film is etched, and the resist mask is removed.

Note that during the processing of the conductive layers 113a and 113b, the semiconductor layer 112 might be partly etched to be thin in a region not covered with the resist mask. An oxide semiconductor film containing crystal parts with orientation is preferable for the semiconductor layer 112 because the unintended etching can be prevented.

In the above manner, the transistor 110 can be fabricated. The transistor 110 contains an oxide semiconductor in the semiconductor layer 112 where a channel is formed. In the transistor 110, part of the conductive layer 111 functions as a gate, part of the insulating layer 132 functions as a gate insulating layer, and the conductive layer 113a and the conductive layer 113b function as a source and a drain.

[Formation of Insulating Layer 133]

Next, the insulating layer 133 that covers the transistor 110 is formed. The insulating layer 133 can be formed in a manner similar to that of the insulating layer 132.

The insulating layer 133 is preferably formed at a temperature higher than or equal to room temperature and lower than or equal to 400° C., further preferably higher than or equal to 100° C. and lower than or equal to 350° C., still further preferably higher than or equal to 150° C. and lower than or equal to 300° C. Higher temperatures can provide the insulating film with higher density and a higher barrier property.

It is preferable to use an oxide insulating film, such as a silicon oxide film or a silicon oxynitride film, formed at a low temperature in the above range in an atmosphere containing oxygen for the insulating layer 133. An insulating film with low oxygen diffusibility and low oxygen permeability, such as a silicon nitride film, is preferably stacked over the silicon oxide film or the silicon oxynitride film. The oxide insulating film formed at low temperatures in an atmosphere containing oxygen can easily release a large amount of oxygen by heating. When a stack including such an oxide insulating film that releases oxygen and an insulating film with low oxygen diffusibility and low oxygen permeability is heated, oxygen can be supplied to the semiconductor layer 112. As a result, oxygen vacancies in the semiconductor layer 112 can be filled and defects at the interface between the semiconductor layer 112 and the insulating layer 133 can be repaired, leading to a reduction in defect states. Accordingly, an extremely highly reliable semiconductor device can be fabricated.

the above steps, the transistor 110 and the insulating layer 133 covering the transistor 110 can be formed over the flexible resin layer 101. If the resin layer 101 and the support substrate 61 are separated from each other at this stage by a method described later, a flexible device including no display element can be fabricated. Forming the transistor 110 or forming a capacitor, a resistor, a wiring, and the like in addition to the transistor 110 can provide a flexible device including a semiconductor circuit, for example.

[Formation of Insulating Layer 134]

Then, the insulating layer 134 is formed over the insulating layer 133. The display element is formed on the insulating layer 134 in a later step; thus, the insulating layer 134 preferably functions as a planarization layer. For the insulating layer 134, the description of the organic insulating film or the inorganic insulating film that can be used for the insulating layer 131 can be referred to.

For the insulating layer 134, as well as for the resin layer 101, a photosensitive and thermosetting resin material is preferably used. In particular, the same material is preferably used for the insulating layer 134 and the resin layer 101. In that case, the same material and apparatus can be used for forming the insulating layer 134 and the resin layer 101.

The thickness of the insulating layer 134, as well as the thickness of the resin layer 101, is preferably greater than or equal to 0.01 μm and less than 10 μm, further preferably greater than or equal to 0.1 μm and less than or equal to 3 μm, and still further preferably greater than or equal to 0.5 μm and less than or equal to 1 μm. The use of a low viscosity solvent facilitates thin and uniform formation of the insulating layer 134.

[Formation of Light-Emitting Element 120]

Next, openings that reach the conductive layer 113b and the like are formed in the insulating layer 134 and the insulating layer 133.

After that, a conductive layer 121 is formed. Part of the conductive layer 121 functions as a pixel electrode. The conductive layer 121 can be formed in the following manner: a conductive film is formed, a resist mask is formed, the conductive film is etched, and the resist mask is removed.

Figure 10D:
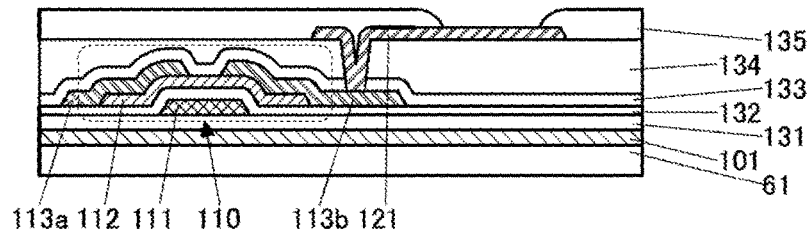

Subsequently, the insulating layer 135 that covers an end portion of the conductive layer 121 is formed as illustrated in FIG. 10D. For the insulating layer 135, the description of the organic insulating film or the inorganic insulating film that can be used for the insulating layer 131 can be referred to.

For the insulating layer 135, as well as for the resin layer 101, a photosensitive and thermosetting resin material is preferably used. In particular, the same material is preferably used for the insulating layer 135 and the resin layer 101. In that case, the same material and apparatus can be used for forming the insulating layer 135 and the resin layer 101.

The thickness of the insulating layer 135, as well as the thickness of the resin layer 101, is preferably greater than or equal to 0.01 μm and less than 10 μm, further preferably greater than or equal to 0.1 μm and less than or equal to 3 μm, and still further preferably greater than or equal to 0.5 μm and less than or equal to 1 μm. The use of a low viscosity solvent facilitates thin and uniform formation of the insulating layer 135.

Figure 10E:
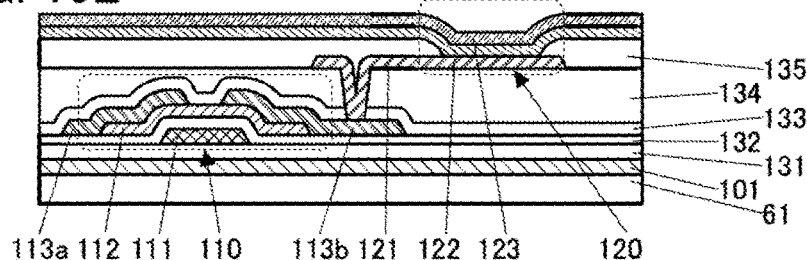

Next, the EL layer 122 and the conductive layer 123 are formed as illustrated in FIG. 10E.

The EL layer 122 can be formed by an evaporation method, a coating method, a printing method, a discharge method, or the like. In the case where the EL layer 122 is formed for each individual pixel, an evaporation method using a shadow mask such as a metal mask, an ink-jet method, or the like can be used. In the case of sharing the EL layer 122 by some pixels, an evaporation method not using a metal mask can be used. Here, an example in which the EL layer 122 is formed by an evaporation method without using a metal mask is described.

The conductive layer 123 can be formed by an evaporation method, a sputtering method, or the like.

In the above manner, the light-emitting element 120 can be completed. In the light-emitting element 120, the conductive layer 121 which partly functions as a pixel electrode, the EL layer 122, and the conductive layer 123 which partly functions as a common electrode are stacked.

[Formation of Light-Absorbing Layer 103a]

A support substrate 62 is prepared. For the support substrate 62, the description of the support substrate 61 can be referred to.

Figure 11A:
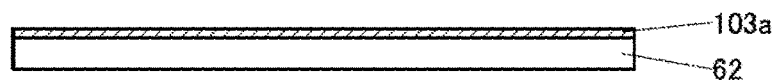
FIGS. 11A to 11E are cross-sectional views illustrating an example of a method for manufacturing a display device.

A light-absorbing layer 103a is formed over the support substrate 62 (FIG. 11A). The light-absorbing layer 103a releases hydrogen, oxygen, or the like by absorbing light 70 and generating heat in a later step of irradiation with the light 70.

As the light-absorbing layer 103a, for example, a hydrogenated amorphous silicon (a-Si:H) film from which hydrogen is released by heating can be used. The hydrogenated amorphous silicon film can be formed by, for example, a plasma CVD method using a deposition gas containing $SiH_4$. Furthermore, after the deposition, heat treatment may be performed in an atmosphere containing hydrogen in order that the light-absorbing layer 103a contains a larger amount of hydrogen.

Alternatively, as the light-absorbing layer 103a, an oxide film from which oxygen is released by heating can be used. In particular, an oxide semiconductor film or an oxide semiconductor film having an impurity state (also referred to as an oxide conductor film) is preferred because they have a narrower band gap and are more likely to absorb light than an insulating film such as a silicon oxide film. In the case where an oxide semiconductor is used for the light-absorbing layer 103a, the above-described method for forming the semiconductor layer 112 and a material to be described later which can be used for the semiconductor layer can be employed. The oxide film can be formed by a plasma CVD method, a sputtering method, or the like in an atmosphere containing oxygen, for example. In particular, in the case where an oxide semiconductor film is used, a sputtering method in an atmosphere containing oxygen is preferred. Furthermore, after the deposition, heat treatment may be performed in an atmosphere containing oxygen in order that the light-absorbing layer 103a contains a larger amount of oxygen.

Alternatively, the oxide film that can be used as the light-absorbing layer 103a may be an oxide insulating film. For example, a silicon oxide film, a silicon oxynitride film, an aluminum oxide film, or an aluminum oxynitride film can be used. For example, such an oxide insulating film is formed in an atmosphere containing oxygen at a low temperature (e.g., lower than or equal to 250° C., preferably lower than or equal to 220° C.), whereby an oxide insulating film containing excess oxygen can be formed. This oxide insulating film can be formed by, for example, a sputtering method or a plasma CVD method.

[Formation of Resin Layer 102]

Figure 11B:
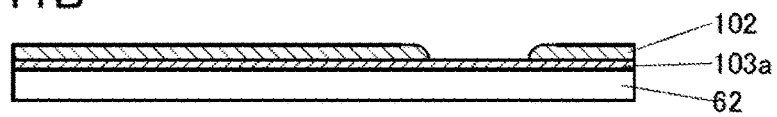

Next, the resin layer 102 having an opening is formed over the light-absorbing layer 103a (FIG. 11B). The description of the method and the material for forming the resin layer 101 can be referred to for those for forming the resin layer 102 except for the opening in the resin layer 102.

In order to form the resin layer 102, first, a photosensitive material is applied to the light-absorbing layer 103a to form a thin film, and pre-baking is performed. Next, the material is exposed to light with use of a photomask, and then developed, whereby the resin layer 102 having an opening can be formed. After that, post-baking is performed to sufficiently polymerize the material and remove a gas in the film.

[Formation of Insulating Layer 141]

Figure 11C:
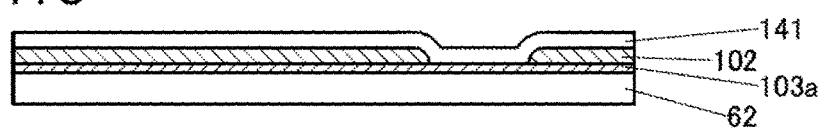

Next, the insulating layer 141 is formed to cover the resin layer 102 and the opening in the resin layer 102 (FIG. 11C). Part of the insulating layer 141 is in contact with the light-absorbing layer 103a. The insulating layer 141 can be used as a barrier layer that prevents impurities contained in the resin layer 102 from diffusing into a transistor or a light-emitting element to be formed later. Therefore, it is preferable to use a material having a high barrier property.

The description of the method and the material for forming the insulating layer 131 can be referred to for those for forming the insulating layer 141.

[Formation of Light-Blocking Layer and Coloring Layer]

Figure 11D:
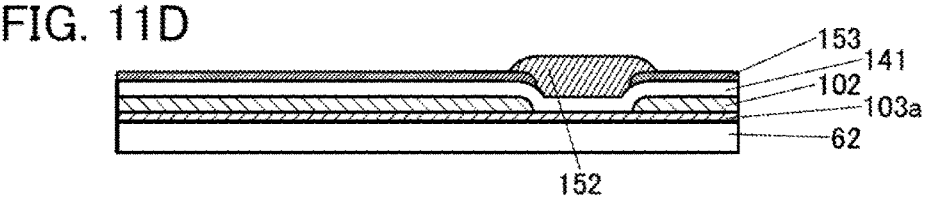

Next, the light-blocking layer 153 and the coloring layer 152 are formed over the insulating layer 141 (FIG. 11D).

For the light-blocking layer 153, a metal material or a resin material can be used. In the case where a metal material is employed, the light-blocking layer 153 can be formed in such a manner that a conductive film is formed and an unnecessary portion is removed by a photolithography method or the like. In the case where a metal material or a photosensitive resin material containing pigment or dye is used, the light-blocking layer 153 can be formed by a photolithography method or the like.

For the coloring layer 152, a photosensitive material can be used. The coloring layer 152 formed with a photosensitive material can be processed into an island-like shape by a photolithography method or the like.

Through the above steps, the insulating layer 141, the light-blocking layer 153, and the coloring layer 152 can be formed over the resin layer 102. Note that a manufacturing process for the resin layer 101 side and a manufacturing process for the resin layer 102 side can be independently performed, and the order is not particularly limited. Alternatively, these two processes may be performed in parallel.

[Bonding]

Figure 11E:
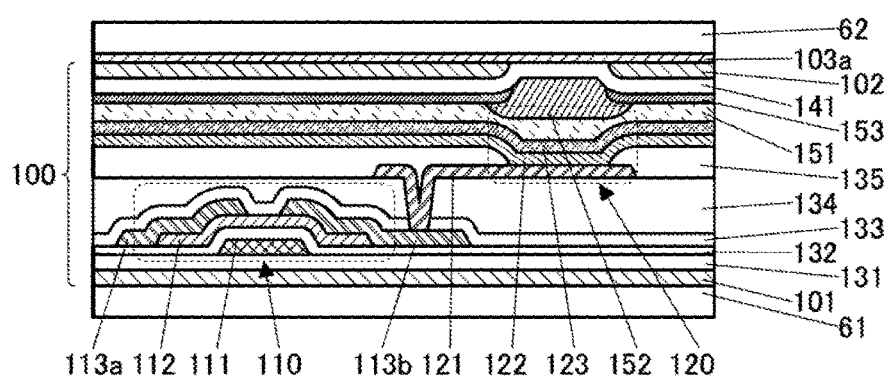

Next, as illustrated in FIG. 11E, the support substrate 61 and the support substrate 62 are bonded to each other with use of the adhesive layer 151. The bonding is performed such that the opening in the resin layer 102 overlaps with the light-emitting element 120. Then, the adhesive layer 151 is cured. Thus, the light-emitting element 120 can be sealed with the adhesive layer 151.

A curable material is preferably used for the adhesive layer 151. For example, a photocurable resin, a reactive curable resin, or a thermosetting resin can be used. In particular, a resin material without a solvent is preferably used.

Through the above steps, the display panel 100 can be fabricated. At the point of FIG. 11E, the display panel 100 is provided between the support substrate 61 and the support substrate 62.

[Formation of Light-Absorbing Layer 103b]

A support substrate 63 is prepared and a light-absorbing layer 103b is formed over the support substrate 63. The description of the support substrate 61 can be referred to for the support substrate 63.

The light-absorbing layer 103b can be formed using a material and a method similar to those of the light-absorbing layer 103a.

[Formation of Resin Layer 201]

Next, the resin layer 201 having an opening is formed over the light-absorbing layer 103b. The description of the method and the material for forming the resin layer 102 can be referred to for those for forming the resin layer 201.

[Formation of Insulating Layer 231]

Figure 12A:
FIGS. 12A to 12F are cross-sectional views illustrating an example of a method for manufacturing a display device.

Next, the insulating layer 231 is formed to cover the resin layer 201 and the opening in the resin layer 201 (FIG. 12A). The description of the method and the material for forming the insulating layer 131 can be referred to for those for forming the insulating layer 231.

[Formation of Transistor 210]

Figure 12B:
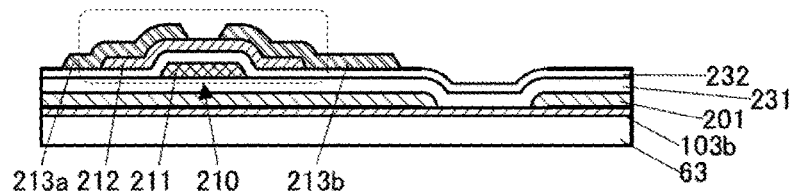

Next, as illustrated in FIG. 12B, the transistor 210 is formed over the insulating layer 231.

The transistor 210 is formed by forming the conductive layer 211, the insulating layer 232, the semiconductor layer 212, and the conductive layers 213a and 213b in this order. The formation method of the transistor 110 can be referred to for the formation method of each layer.

The transistor 210 contains an oxide semiconductor in the semiconductor layer 212 where a channel is formed. In the transistor 210, part of the conductive layer 211 functions as a gate, part of the insulating layer 232 functions as a gate insulating layer, and the conductive layers 213a and 213b function as a source and a drain.

[Formation of Conductive Layer 221 and Alignment Film 224a]

Next, an opening that reaches the conductive layer 213b is formed in the insulating layer 234 and the insulating layer 233.

After that, the conductive layer 221 is formed. Part of the conductive layer 221 functions as a pixel electrode. The conductive layer 221 can be formed in the following manner: a conductive film is formed, a resist mask is formed, the conductive film is etched, and the resist mask is removed.

Figure 12C:
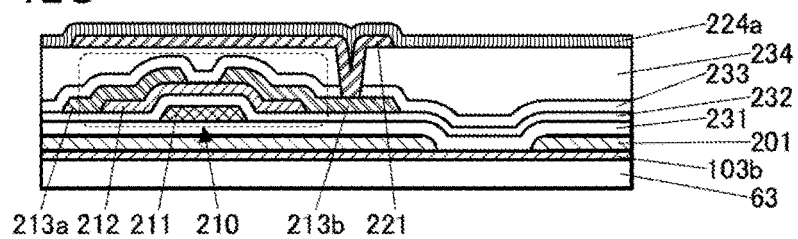

Next, as illustrated in FIG. 12C, the alignment film 224a is formed over the conductive layer 221 and the insulating layer 234. The alignment film 224a can be formed by performing rubbing treatment after a thin film of a resin or the like is formed.

Through the above steps, the transistor 210, the conductive layer 221, the alignment film 224a, and the like can be formed over the resin layer 201.

[Formation of Light-Absorbing Layer 103c]

A support substrate 64 is prepared and a light-absorbing layer 103c is formed over the support substrate 64. The description of the support substrate 61 can be referred to for the support substrate 64.

The light-absorbing layer 103c can be formed using a material and a method similar to those of the light-absorbing layer 103a.

[Formation of Resin Layer 202]

Next, the resin layer 202 having an opening is formed over the light-absorbing layer 103c. The description of the method and the material for forming the resin layer 101 can be referred to for those for forming the resin layer 202.

[Formation of Insulating Layer 204]

Figure 12D:

Next, the insulating layer 204 is formed to cover the resin layer 202 and the opening in the resin layer 202 (FIG. 12D). The description of the method and the material for forming the insulating layer 131 can be referred to for those for forming the insulating layer 204.

[Formation of Conductive Layer 223 and Alignment Film 224b]

Next, the conductive layer 223 is formed over the insulating layer 204. The conductive layer 223 can be formed by forming a conductive film. Note that the conductive layer 223 may be formed by, for example, a sputtering method using a shadow mask such as a metal mask such that the conductive layer 223 is not provided in the peripheral portion of the resin layer 202. Alternatively, the conductive layer 223 may be formed by forming a conductive film, performing patterning by a photolithography method, and removing an unnecessary portion of the conductive film by etching.

Figure 12E:
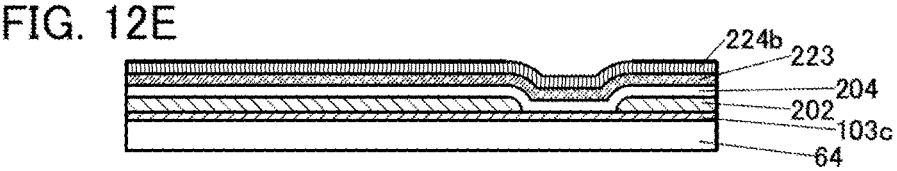

Next, the alignment film 224b is formed over the conductive layer 223 (see FIG. 12E). The alignment film 224b can be formed by a method similar to that of the alignment film 224a.

Through the above steps, the insulating layer 204, the conductive layer 223, and the alignment film 224b can be formed over the resin layer 202. Note that a manufacturing process for the resin layer 201 side and a manufacturing process for the resin layer 202 side can be independently performed, and the order is not particularly limited. Alternatively, these two processes may be performed in parallel.

[Bonding]

Figure 12F:
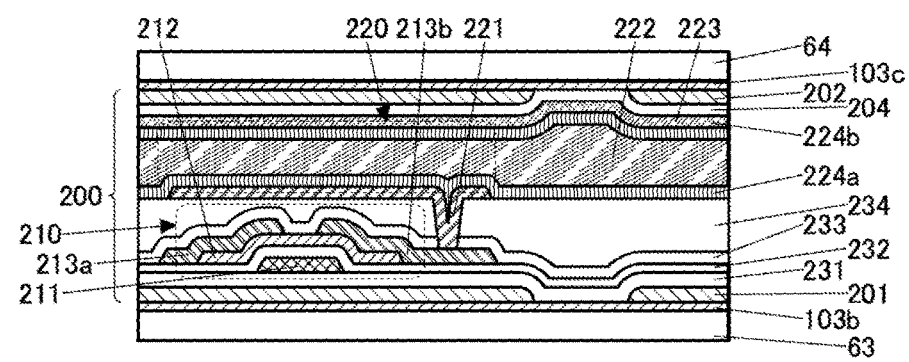

Next, as illustrated in FIG. 12F, the support substrate 63 and the support substrate 64 are bonded to each other with the liquid crystal 222 provided therebetween. At this time, the support substrates are bonded to each other such that the opening in the resin layer 201 and the opening in the resin layer 202 overlap with each other. In addition, the resin layer 201 and the resin layer 202 are bonded to each other with an adhesive layer (not illustrated) in the peripheral portion.

For example, an adhesive layer (not illustrated) for bonding the resin layer 201 and the resin layer 202 is formed on one or both of the resin layers 201 and 202. The adhesive layer is formed to surround a region where a pixel is provided. The adhesive layer can be formed by a screen printing method, a dispensing method, or the like. For the adhesive layer, a thermosetting resin, an ultraviolet curable resin, or the like can be used. Alternatively, a resin which is cured when heated after pre-cured by ultraviolet light or the like may be used. Alternatively, a thermosetting and ultraviolet curable resin or the like may be used for the adhesive layer.

Next, the liquid crystal 222 is dropped in a region surrounded by the adhesive layer by a dispensing method or the like. Then, the support substrate 63 and the support substrate 64 are bonded to each other such that the liquid crystal 222 is positioned therebetween, and the adhesive layer is cured. The bonding is preferably performed in a reduced-pressure atmosphere because air bubbles and the like can be prevented from entering between the support substrate 63 and the support substrate 64.

After the liquid crystal 222 is dropped, particulate gap spacers may be dispersed in a region where the pixel is provided or outside the region, or the liquid crystal 222 containing the gap spacers may be dropped. The liquid crystal 222 may be injected in a reduced-pressure atmosphere through a space provided in the adhesive layer after the support substrate 63 and the support substrate 64 are bonded to each other.

Through the above steps, the display panel 200 can be fabricated. At the point of FIG. 12F, the display panel 200 is provided between the support substrate 63 and the support substrate 64.

[Separation of Support Substrate 62]

Next, as illustrated in FIG. 13A, the light-absorbing layer 103a is irradiated with the light 70 through the support substrate 62 from the support substrate 62 side of the display panel 100.

Laser light is suitable for the light 70. In particular, linear laser light is preferable.

Note that a flash lamp or the like may be used as long as the light-absorbing layer 103a can be irradiated with light whose energy is as high as that of laser light.

As the light 70, light having a wavelength at which at least part of the light 70 is transmitted through the support substrate 62 and absorbed by the light-absorbing layer 103a is selected. Light having a wavelength which is absorbed by the resin layer 102 is preferably used as the light 70. In particular, it is preferable to use light with a wavelength range from visible light to ultraviolet light as the light 70. For example, it is preferable to use light having a wavelength of greater than or equal to 200 nm and less than or equal to 400 nm, further preferably greater than or equal to 250 nm and less than or equal to 350 nm. In particular, an excimer laser having a wavelength of 308 nm is preferably used because the productivity is increased. The excimer laser is preferable because the excimer laser is used also for laser crystallization of LTPS, so that an existing LTPS production line apparatus can be used and new capital investment is not necessary. Alternatively, a solid-state UV laser (also referred to as a semiconductor UV laser), such as a UV laser having a wavelength of 355 nm which is the third harmonic of an Nd:YAG laser, may be used. Further alternatively, a pulsed laser such as a picosecond laser may be used.

In the case where linear laser light is used as the light 70, the support substrate 61 and a light source are relatively moved to perform scanning with the light 70 and entirely irradiate a region to be separated with the light 70. At this stage, when irradiation is performed on the entire surface where the resin layer 102 is provided, the resin layer 102 can be separated entirely and it is not necessary to cut the periphery portion of the support substrate 62 by scribing or the like in a subsequent separation step. Alternatively, it is preferable that the peripheral portion of the region where the resin layer 102 is provided have a region not irradiated with the light 70 because separation of the resin layer 102 and the support substrate 62 can be suppressed at the irradiation with the light 70.

By the irradiation with the light 70, the light-absorbing layer 103a is heated and hydrogen, oxygen, or the like is released from the light-absorbing layer 103a. At this time, hydrogen, oxygen, or the like is released in a gaseous state. The released gas remains near the interface between the light-absorbing layer 103a and the resin layer 102 or near the interface between the light-absorbing layer 103a and the support substrate 62; thus, the force of separating them occurs. Consequently, adhesion between the light-absorbing layer 103a and the resin layer 102 or adhesion between the light-absorbing layer 103a and the support substrate 62 is reduced and a state where separation is easily performed can be formed.

Part of the gas released from the light-absorbing layer 103a remains in the light-absorbing layer 103a in some cases. Therefore, in some cases, the light-absorbing layer 103a is embrittled and separation is likely to occur inside the light-absorbing layer 103a.

Moreover, in the case where a film that releases oxygen is used as the light-absorbing layer 103a, part of the resin layer 102 is oxidized and embrittled in some cases by oxygen released from the light-absorbing layer 103a. Accordingly, a state where separation is easily performed can be formed at the interface between the resin layer 102 and the light-absorbing layer 103a.

Also in a region overlapping with the opening in the resin layer 102, adhesion at the interface between the light-absorbing layer 103a and the insulating layer 141 or adhesion at the interface between the light-absorbing layer 103a and the support substrate 62 is reduced and a state where separation is easily performed is formed for the same reason as above. In some cases, the light-absorbing layer 103a is embrittled and a state where separation is likely to occur.

In contrast, the region not irradiated with the light 70 still has high adhesion.

Here, in the case where an oxide semiconductor film is used for each of the light-absorbing layer 103a and the semiconductor layer 112, light having a wavelength which can be absorbed by the oxide semiconductor film is used as the light 70. However, the light-absorbing layer 103a and the resin layer 102 are stacked above the transistor 110. Furthermore, the resin layer 102 on which heat treatment is performed sufficiently tends to absorb more light than the oxide semiconductor film and can absorb light sufficiently even with a small thickness. Therefore, even when part of the light 70 is not absorbed by the light-absorbing layer 103a and transmitted, the part of the light 70 is absorbed by the resin layer 102 and reaching of the light to the semiconductor layer 112 is suppressed. Consequently, the electrical characteristics of the transistor 110 are hardly changed.

Next, the support substrate 62 and the resin layer 102 are separated (FIG. 13B1).

Separation can be performed by applying pulling force in the perpendicular direction to the support substrate 62 while the support substrate 61 is fixed to a stage. For example, the support substrate 62 can be separated by adsorbing part of the upper surface of the support substrate 62 and pulling it upward. The stage may have any structure as long as the support substrate 61 can be fixed. For example, the stage may have an adsorption mechanism capable of vacuum adsorption, electrostatic adsorption, or the like or a mechanism for physically fastening the support substrate 61.

Alternatively, separation may be performed by pressing a drum-shaped member with an adhesive surface against the upper surface of the support substrate 62 and rotating the member. At this time, the stage may be moved in the separating direction.

In the case where the region not irradiated with the light 70 is provided in the peripheral portion of the resin layer 102, a notch may be formed in part of the resin layer 102 irradiated with the light 70 to serve as a trigger for separation. The notch can be formed with a sharp edged tool or a needle-like member or can be formed by cutting the support substrate 62 and the resin layer 102 at the same time by scribing or the like.

FIG. 13B1 illustrates an example in which separation occurs at the interface between the light-absorbing layer 103a and the resin layer 102 and the interface between the light-absorbing layer 103a and the insulating layer 141.

FIG. 13B2 illustrates an example in which a light-absorbing layer 103aa which is part of the light-absorbing layer 103a remains on the surfaces of the resin layer 102 and the insulating layer 141. For example, this example corresponds to the case where separation (fracture) occurs inside the light-absorbing layer 103a. In the case where separation occurs at the interface between the light-absorbing layer 103a and the support substrate 62, the light-absorbing layer 103a entirely remains on the resin layer 102 and the insulating layer 141 in some cases.

The light-absorbing layer 103aa (or the light-absorbing layer 103a) is preferably removed when it remains in this manner. Although the light-absorbing layer 103aa can be removed by a dry etching method, a wet etching method, a sandblast method, or the like, it is particularly preferable to employ a dry etching method. Note that in removing the light-absorbing layer 103aa, part of the resin layer 102 and part of the insulating layer 141 are thinned by etching in some cases.

In the case where a light-transmitting insulating material is used for the light-absorbing layer 103a, the remaining light-absorbing layer 103aa may be left.

[Separation of Support Substrate 63]

Figure 14A:
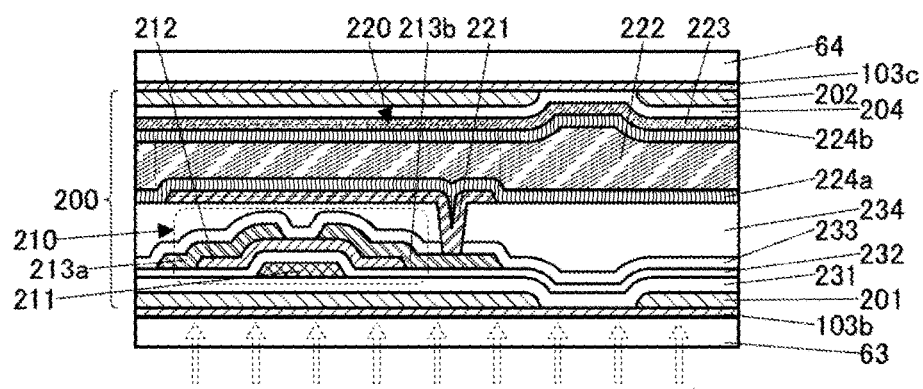
FIGS. 14A and 14B are cross-sectional views illustrating an example of a method for manufacturing a display device.

Next, as illustrated in FIG. 14A, the light-absorbing layer 103b is irradiated with the light 70 through the support substrate 63 from the support substrate 63 side of the display panel 200.

The above description can be referred to for a method for irradiation with the light 70.

Figure 14B:
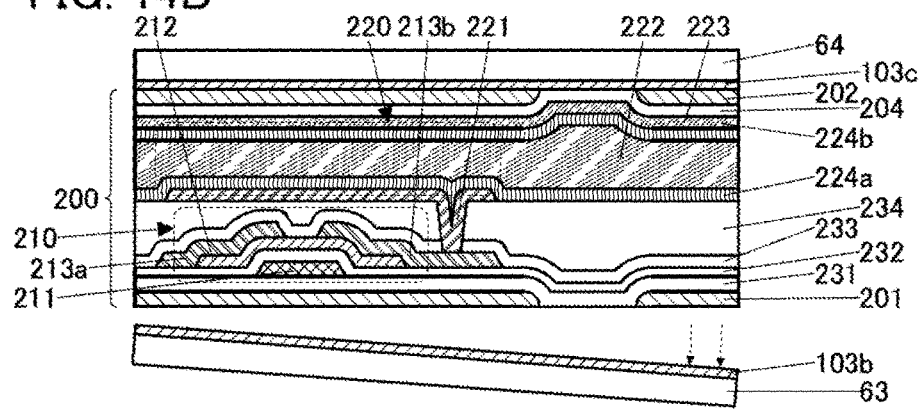

Next, the support substrate 63 and the resin layer 201 are separated (FIG. 14B). The above description can be referred to for the separation. FIG. 14B illustrates an example in which separation occurs at the interface between the light-absorbing layer 103b and the resin layer 201 and the interface between the light-absorbing layer 103b and the insulating layer 231.

[Bonding of Display Panel 100 and Display Panel 200]

Figure 15A:
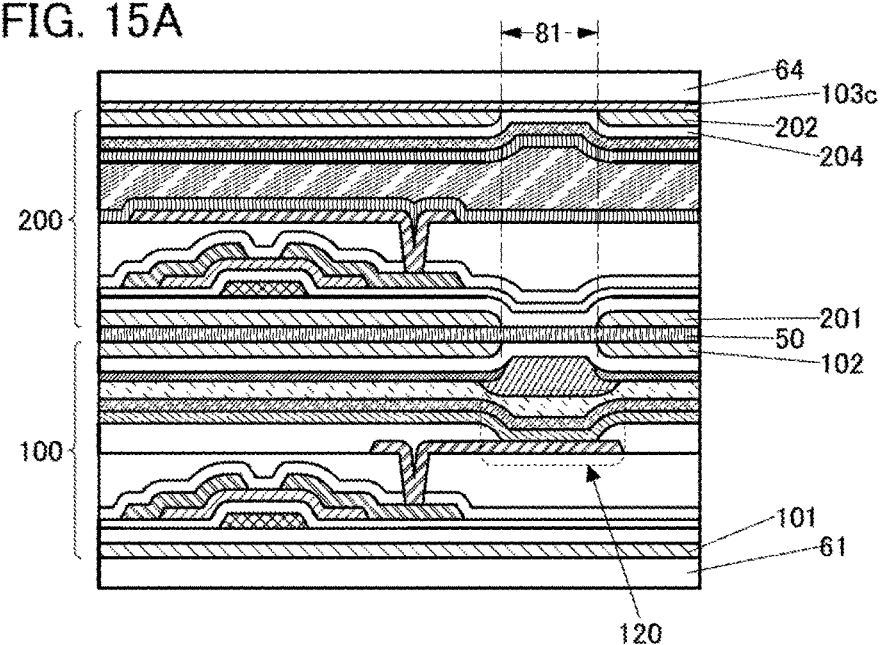
FIGS. 15A and 15B are cross-sectional views illustrating an example of a method for manufacturing a display device.

Next, as illustrated in FIG. 15A, the resin layer 102 of the display panel 100 and the resin layer 201 of the display panel 200 are bonded to each other with the adhesive layer 50. The description of the adhesive layer 151 can be referred to for the adhesive layer 50.

It is important to bond the display panel 100 and the display panel 200 such that the opening in the resin layer 102, the opening in the resin layer 201, the opening in the resin layer 202, and the light-emitting element 120 overlap with one another.

At this time, when displacement of the display panel 100 and the display panel 200 occurs, light from the light-emitting element 120 is blocked by a light-blocking member of the display panel 200 in some cases. Moreover, the resin layer 201 or the resin layer 202 is in some cases located over a path of the light from the light-emitting element 120. Therefore, it is preferable to provide an alignment marker for each of the display panel 100 and the display panel 200. According to this example of a manufacturing method, since the support substrate 61 and the support substrate 64 are provided in the bonding step, the alignment accuracy can be improved as compared with the case where flexible display panels are bonded to each other; thus, a display device having high resolution can be achieved. For example, a display device having resolution exceeding 500 ppi can be achieved.

[Separation of Support Substrate 61]

Next, the resin layer 101 is irradiated with light through the support substrate 61 from the support substrate 61 side. The method for irradiation with the light 70 can be referred to for a method for irradiation with the light. By the irradiation with the light, the vicinity of the surface of the resin layer 101 on the support substrate 61 side or part of the inside of the resin layer 101 is modified and the adhesion between the support substrate 61 and the resin layer 101 is reduced.

Figure 15B:
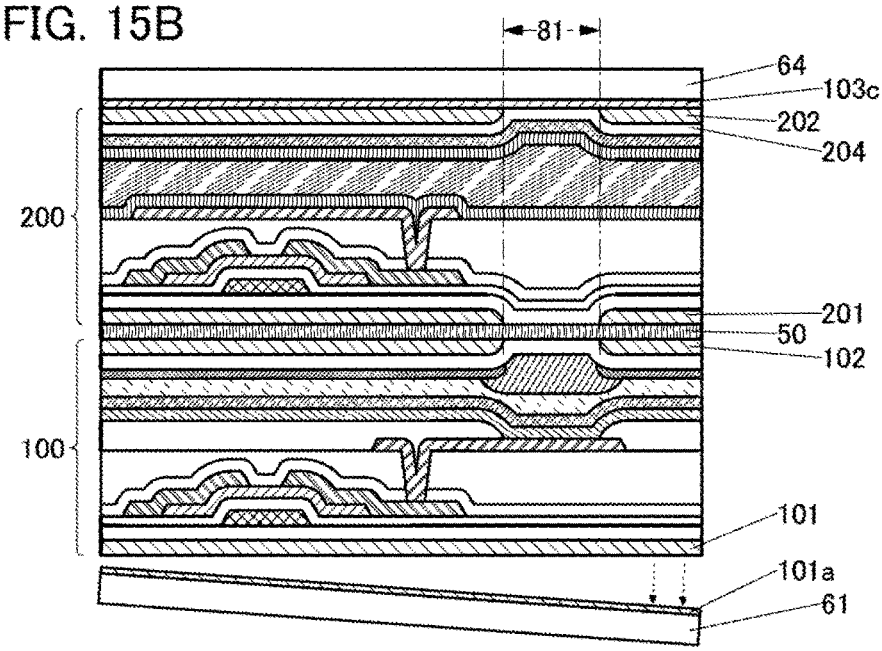

After that, as illustrated in FIG. 15B, the support substrate 61 and the resin layer 101 are separated.

FIG. 15B illustrates an example in which a resin layer 101a which is part of the resin layer 101 remains on the support substrate 61 side. Depending on the condition of the irradiation with the light, separation (fracture) occurs inside the resin layer 101 and the resin layer 101a remains in this manner in some cases. Also in the case where part of the surface of the resin layer 101 is melted, part of the resin layer 101a sometimes remains on the support substrate 61 side in a similar manner. In the case where separation occurs at the interface between the support substrate 61 and the resin layer 101, the resin layer 101a sometimes does not remain on the support substrate 61 side.

The thickness of the resin layer 101a remaining on the support substrate 61 side can be less than or equal to 100 nm, specifically approximately greater than or equal to 40 nm and less than or equal to 70 nm. The support substrate 61 from which the remaining resin layer 101a is removed can be reused. For example, in the case where glass is used for the support substrate 61 and a polyimide resin is used for the resin layer 101, the resin layer 101a can be removed with fuming nitric acid or the like.

The separation can be performed in a state where the support substrate 64 is fixed to a stage or the like. The above description can be referred to for a separation method.

[Bonding of Substrate 611]

Figure 16A:
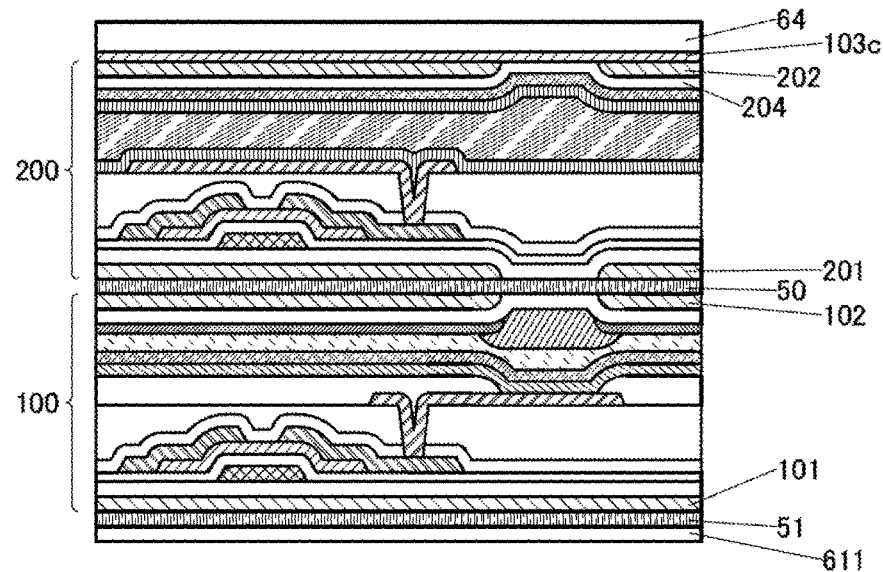
FIGS. 16A and 16B are cross-sectional views illustrating an example of a method for manufacturing a display device.

Next, as illustrated in FIG. 16A, the resin layer 101 and the substrate 611 are bonded to each other with the adhesive layer 51.

The description of the adhesive layer 151 can be referred to for the adhesive layer 51.

When a resin material is used for the substrate 611 and the substrate 612 which is to be described later, the display device can be reduced in weight as compared with the case where glass or the like is used for the substrate 611 and the substrate 612 with the same thicknesses. A material which is thin enough to have flexibility is preferably used because the display device can be further reduced in weight. Furthermore, when a resin material is used, the display device can have higher impact resistance; thus, a non-breakable display device can be achieved.

Since the substrate 611 is located on the side opposite to the viewing side, the substrate 611 does not necessarily need to transmit visible light. Therefore, a metal material can also be used. A metal material, which has high thermal conductivity, can suppress a local temperature rise in the display device because it can easily conduct heat to the whole substrate.

[Separation of Support Substrate 64]

Figure 16B:
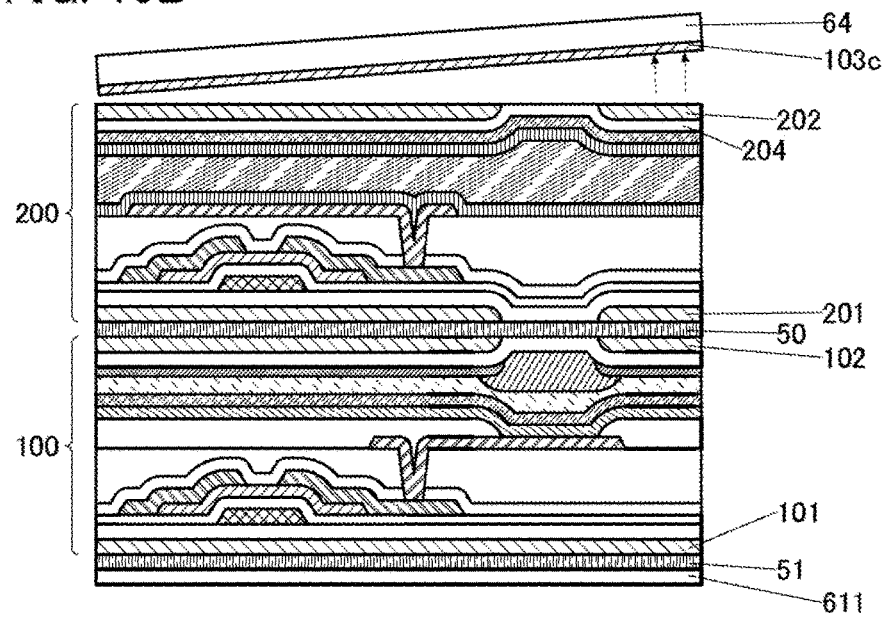

Next, the light-absorbing layer 103c is irradiated with light through the support substrate 64 from the support substrate 64 side. After that, as illustrated in FIG. 16B, the support substrate 64 and the resin layer 202 are separated. FIG. 16B illustrates an example in which separation occurs at the interface between the light-absorbing layer 103c and the resin layer 202 and the interface between the light-absorbing layer 103c and the insulating layer 204.

The method for irradiation with the light 70 can be referred to for a method for irradiation with the light.

The separation can be performed in a state where the substrate 611 is fixed to a stage or the like. The above description can be referred to for a separation method.

[Bonding of Substrate 612]

Next, the resin layer 202 and the substrate 612 are bonded to each other with the adhesive layer 52.

The description of the adhesive layer 151 can be referred to for the adhesive layer 52.

Since the substrate 612 is located on the viewing side, a material that transmits visible light can be used.

Through the above steps, the display 117 can be manufactured.

[Modification Examples of Manufacturing Method]

Methods for forming a resin layer having an opening without using a light-absorbing layer will be described below.

Note that although description is made here giving the resin layer 102 of the display panel 100 as an example, a similar method can be used also for the resin layer 201 and the resin layer 202 of the display panel 200.

[Modification Example 1]

Figure 17A:
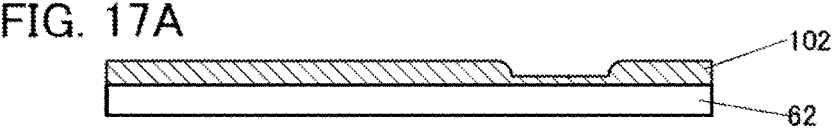
FIGS. 17A to 17E are cross-sectional views illustrating an example of a method for manufacturing a display device.

First, as illustrated in FIG. 17A, the resin layer 102 having a depressed portion is formed.

First, a material to be the resin layer 102 is applied to the support substrate 62, and pre-baking is performed. Subsequently, light exposure is performed using a photomask. At this time, the depressed portion can be formed in the resin layer 102 by setting the amount of light exposure smaller than the amount of light exposure for forming an opening in the resin layer 102. For example, the amount of light exposure can be reduced by performing light exposure for a short period of time, reducing the intensity of exposure light, shifting the focus, or forming the resin layer 102 thick, as compared with the light exposure conditions for forming an opening in the resin layer 102.

In order to form both the opening and the depressed portion in the resin layer 102, an exposure technique using a half-tone mask or a gray-tone mask or a multiple exposure technique using two or more photomasks can be used.

After being subjected to the light exposure in this manner, the resin layer 102 having the depressed portion can be formed by being subjected to development treatment. After that, post-baking is performed.

Figure 17B:

Next, as illustrated in FIG. 17B, the insulating layer 141 is formed to cover the upper surface and the depressed portion of the resin layer 102.

Figure 17C:
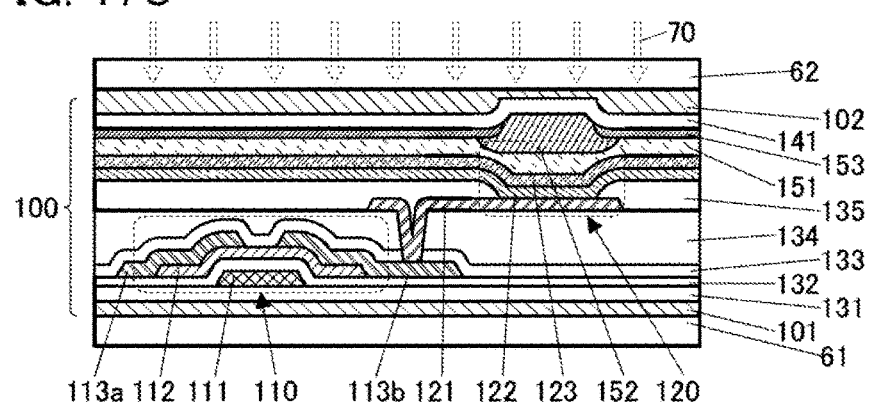

FIG. 17C is a cross-sectional view illustrating a step of performing irradiation with the light 70 after the support substrate 61 and the support substrate 62 are bonded to each other. Adhesion between the resin layer 102 and the support substrate 62 is reduced by the irradiation with the light 70.

Figure 17D:
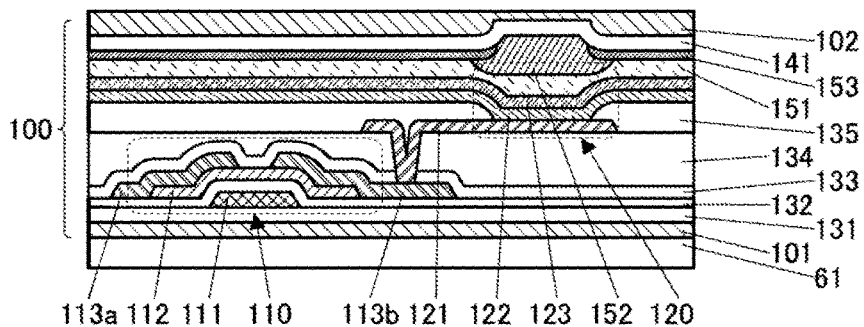

FIG. 17D is a schematic cross-sectional view in the state after separation of the support substrate 62.

Figure 17E:
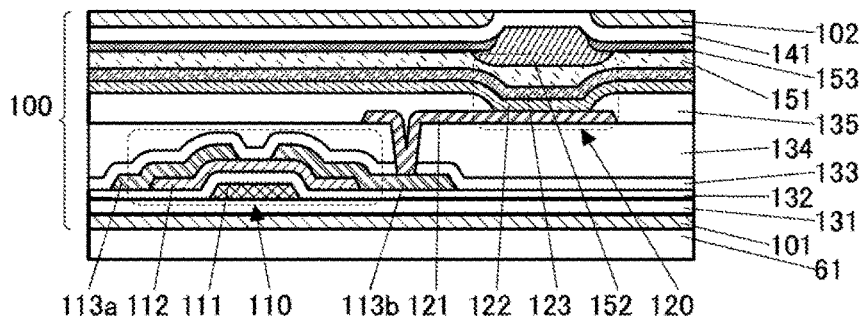

After that, as illustrated in FIG. 17E, the resin layer 102 having an opening can be formed in such a manner that part of the display side of the resin layer 102 is etched to expose the surface of the insulating layer 141. For example, plasma treatment in an atmosphere containing oxygen (this treatment is also referred to as ashing treatment) is preferably used for the etching, in which case controllability can be improved and etching can be performed uniformly.

Note that the resin layer 102 may be left as illustrated in FIG. 17D without being etched. Even with this structure, light absorption can be suppressed and light extraction efficiency can be increased because a portion of the resin layer 102 that is located in the path of light from the light-emitting element 120 is thinner than the other portion of the resin layer 102.

[Modification Example 2]

Figure 18A:
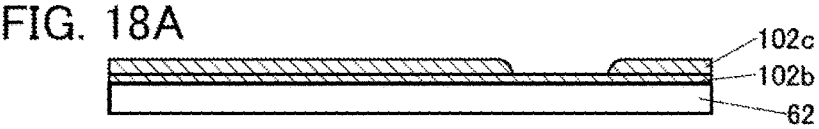
FIGS. 18A to 18D are cross-sectional views illustrating an example of a method for manufacturing a display device.

First, as illustrated in FIG. 18A, a resin layer 102b and a resin layer 102c having an opening are stacked over the support substrate 62.

The resin layer 102b can be formed in a manner similar to that of the resin layer 101. The resin layer 102c can be formed in a manner similar to that of the resin layer 102, the resin layer 201, or the like.

Here, it is preferable to sufficiently perform heat treatment on the resin layer 102b formed first to perform polymerization. Accordingly, even in the case where the same material is used for the resin layer 102b and the resin layer 102c, dissolution of the resin layer 102b in a solvent contained in a material to be the resin layer 102c formed later can be suppressed when the material is applied.

Figure 18B:
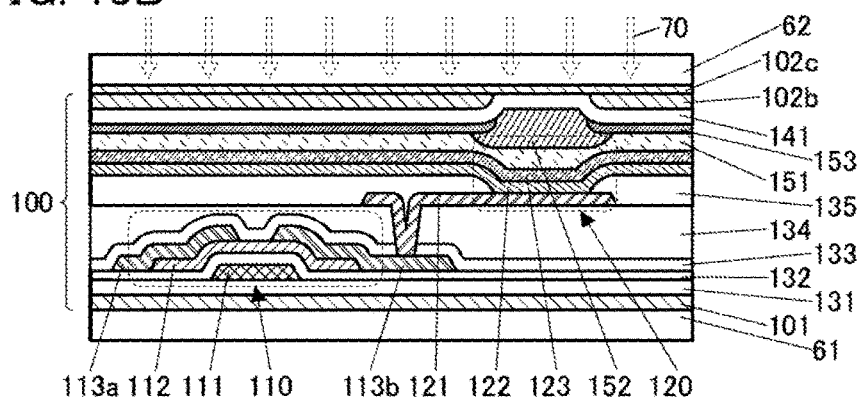

FIG. 18B is a cross-sectional view illustrating a step of performing irradiation with the light 70 after the support substrate 61 and the support substrate 62 are bonded to each other. Adhesion between the resin layer 102c and the support substrate 62 is reduced by the irradiation with the light 70.

Figure 18C:
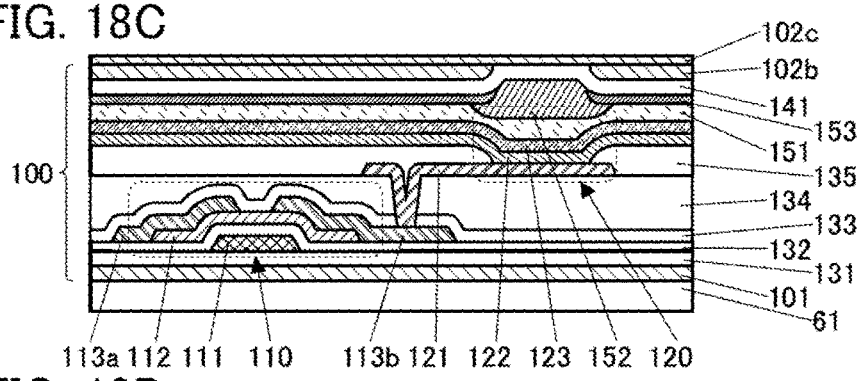

FIG. 18C is a schematic cross-sectional view in the state after separation of the support substrate 62.

Figure 18D:
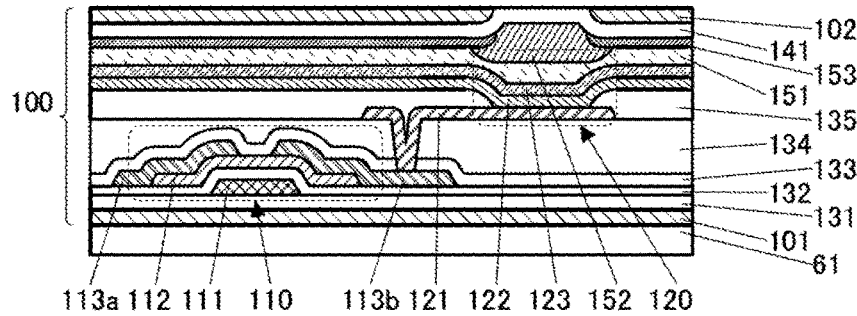

After that, as illustrated in FIG. 18D, the resin layer 102 having an opening can be formed in such a manner that the resin layer 102c is etched to expose the surface of the insulating layer 141. For example, plasma treatment in an atmosphere containing oxygen (this treatment is also referred to as ashing treatment) is preferably used for the etching, in which case controllability can be improved and etching can be performed uniformly.

Note that when the same material is used for the resin layer 102b and the resin layer 102c, productivity can be improved because the same material and the same manufacturing apparatus can be used. When different materials are used for these resin layers, flexibility of processing conditions can be increased because the etching selectivity ratio can be made high.

Note that the resin layer 102b may be left as illustrated in FIG. 18C without being etched. Even with this structure, light absorption can be suppressed and light extraction efficiency can be increased because a portion of the resin layer 102 that is located in the path of light from the light-emitting element 120 is thinner than the other portion.

The above is the description of the modification examples of the manufacturing method example.

[Modification Example of Structural Example]

A structural example that is partly different from the structural example illustrated in FIG. 9 will be described below.

In FIG. 9, the opening is provided in a portion of the resin layer that is located in the path of light from the light-emitting element 120; however, an opening may be provided also in a portion of the resin layer that is located in the path of light from the reflective liquid crystal element 220.

Figure 19:
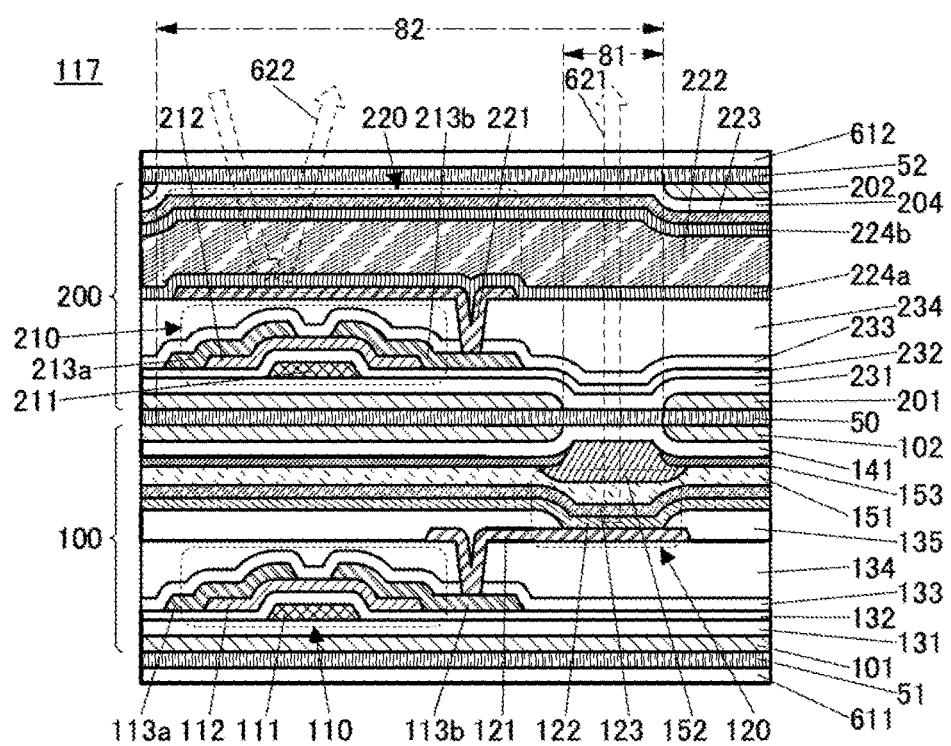
FIG. 19 is a cross-sectional view illustrating a structural example of a display device.

FIG. 19 illustrates an example in which a region 82 is provided in addition to the region 81. The region 82 overlaps with the opening in the resin layer 202 and the liquid crystal element 220.

In the example illustrated in FIG. 19, the resin layer 202 is provided with one opening overlapping with both the light-emitting element 120 and the liquid crystal element 220. Alternatively, an opening overlapping with the light-emitting element 120 and an opening overlapping with the liquid crystal element 220 may be separately provided.

[Transistors]

The display 117 exemplified in FIG. 9 shows an example of using bottom-gate transistors as the transistor 110 and the transistor 210.

In the transistor 110, the conductive layer 111 functioning as a gate electrode is located closer to the formation surface side (the resin layer 101 side) than the semiconductor layer 112 is. The insulating layer 132 covers the conductive layer 111. The semiconductor layer 112 covers the conductive layer 111. A region of the semiconductor layer 112 that overlaps with the conductive layer 111 corresponds to a channel formation region. The conductive layers 113a and 113b are provided in contact with the upper surface and side end portions of the semiconductor layer 112.

Note that in the transistor 110 shown as an example, the width of the semiconductor layer 112 is larger than that of the conductive layer 111. In such a structure, the semiconductor layer 112 is located between the conductive layer 111 and each of the conductive layers 113a and 113b. Thus, the parasitic capacitance between the conductive layer 111 and each of the conductive layers 113a and 113b can be reduced.

The transistor 110 is a channel-etched transistor and can be suitably used for a high-resolution display device because the area occupied by the transistor can be reduced comparatively easily.

The transistor 210 and the transistor 110 have common characteristics.

A structural example of a transistor that can be used for the transistor 110 and the transistor 210 will be described.

Figure 20A:
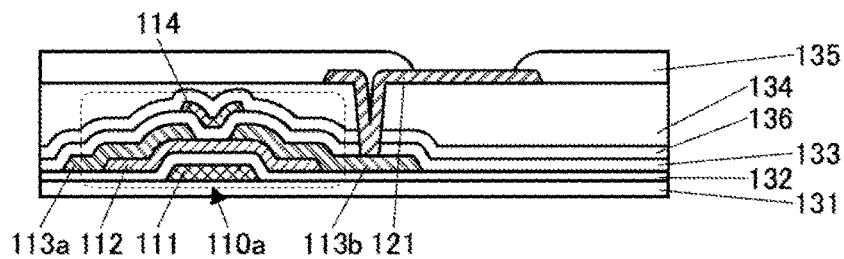
FIGS. 20A to 20C are cross-sectional views each illustrating a structural example of a display device.

A transistor 110a illustrated in FIG. 20A is different from the transistor 110 in that the transistor 110a includes a conductive layer 114 and an insulating layer 136. The conductive layer 114 is provided over the insulating layer 133 and includes a region overlapping with the semiconductor layer 112. The insulating layer 136 covers the conductive layer 114 and the insulating layer 133.

The conductive layer 114 is located to face the conductive layer 111 with the semiconductor layer 112 positioned therebetween. In the case where the conductive layer 111 is used as a first gate electrode, the conductive layer 114 can function as a second gate electrode. By applying the same potential to the conductive layer 111 and the conductive layer 114, the on-state current of the transistor 110a can be increased. By applying a potential for controlling the threshold voltage to one of the conductive layers 111 and 114 and a potential for driving to the other, the threshold voltage of the transistor 110a can be controlled.

A conductive material containing an oxide is preferably used for the conductive layer 114. In that case, a conductive film to be the conductive layer 114 is formed in an atmosphere containing oxygen, whereby oxygen can be supplied to the insulating layer 133. The proportion of an oxygen gas in a deposition gas is preferably higher than or equal to 90% and lower than or equal to 100%. Oxygen supplied to the insulating layer 133 is supplied to the semiconductor layer 112 by heat treatment to be performed later, so that oxygen vacancies in the semiconductor layer 112 can be reduced.

It is particularly preferable to use, for the conductive layer 114, an oxide semiconductor whose resistance is reduced. In that case, the insulating layer 136 is preferably formed using an insulating film that releases hydrogen, for example, a silicon nitride film. Hydrogen is supplied to the conductive layer 114 during the formation of the insulating layer 136 or by heat treatment to be performed after that, whereby the electrical resistance of the conductive layer 114 can be reduced effectively.

Figure 20B:
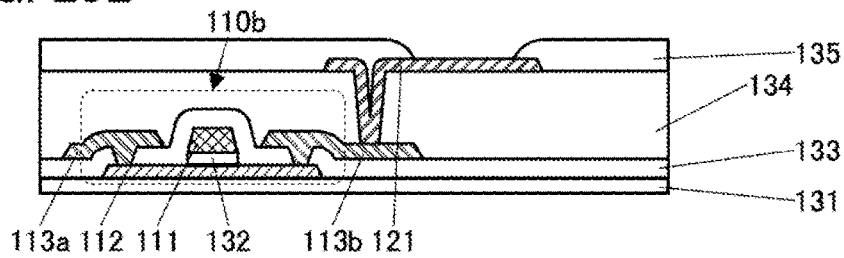

A transistor 110b illustrated in FIG. 20B is a top-gate transistor.

In the transistor 110b, the conductive layer 111 functioning as a gate electrode is provided over the semiconductor layer 112 (on the side opposite to the formation surface). The semiconductor layer 112 is formed over the insulating layer 131. The insulating layer 132 and the conductive layer 111 are stacked over the semiconductor layer 112. The insulating layer 133 covers the upper surface and the side end portions of the semiconductor layer 112, side surfaces of the insulating layer 132, and the conductive layer 111. The conductive layers 113a and 113b are provided over the insulating layer 133. The conductive layers 113a and 113b are electrically connected to the upper surface of the semiconductor layer 112 through openings provided in the insulating layer 133.

Note that although the insulating layer 132 is not present in a portion that does not overlap with the conductive layer 111 in this example, the insulating layer 132 may be provided to cover the upper surface and the side end portions of the semiconductor layer 112.

In the transistor 110b, the physical distance between the conductive layer 111 and each of the conductive layers 113a and 113b can be easily increased, so that the parasitic capacitance therebetween can be reduced.

Figure 20C:
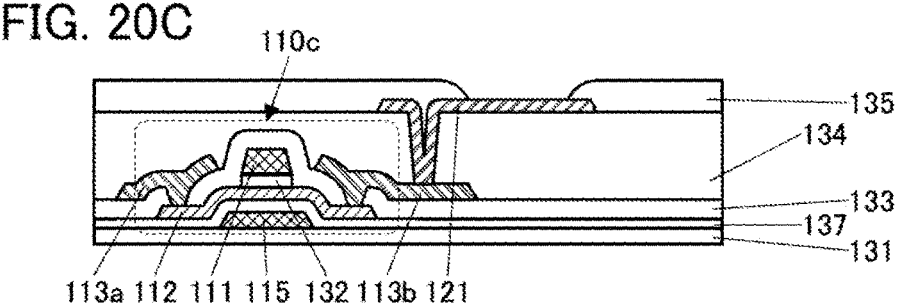

A transistor 110c illustrated in FIG. 20C is different from the transistor 110b in that the transistor 110c includes a conductive layer 115 and an insulating layer 137. The conductive layer 115 is provided over the insulating layer 131 and includes a region overlapping with the semiconductor layer 112. The insulating layer 137 covers the conductive layer 115 and the insulating layer 131.

The conductive layer 115 functions as a second gate electrode like the conductive layer 114. Thus, the on-state current can be increased and the threshold voltage can be controlled, for example.

In the display 117, the transistor included in the display panel 100 and the transistor included in the display panel 200 may be different from each other. For example, the transistor 110a or the transistor 110c can be used as the transistor that is electrically connected to the light-emitting element 120 because a comparatively large amount of current needs to be fed to the transistor, and the transistor 110 can be used as the other transistor to reduce the area occupied by the transistor.

Figure 21:
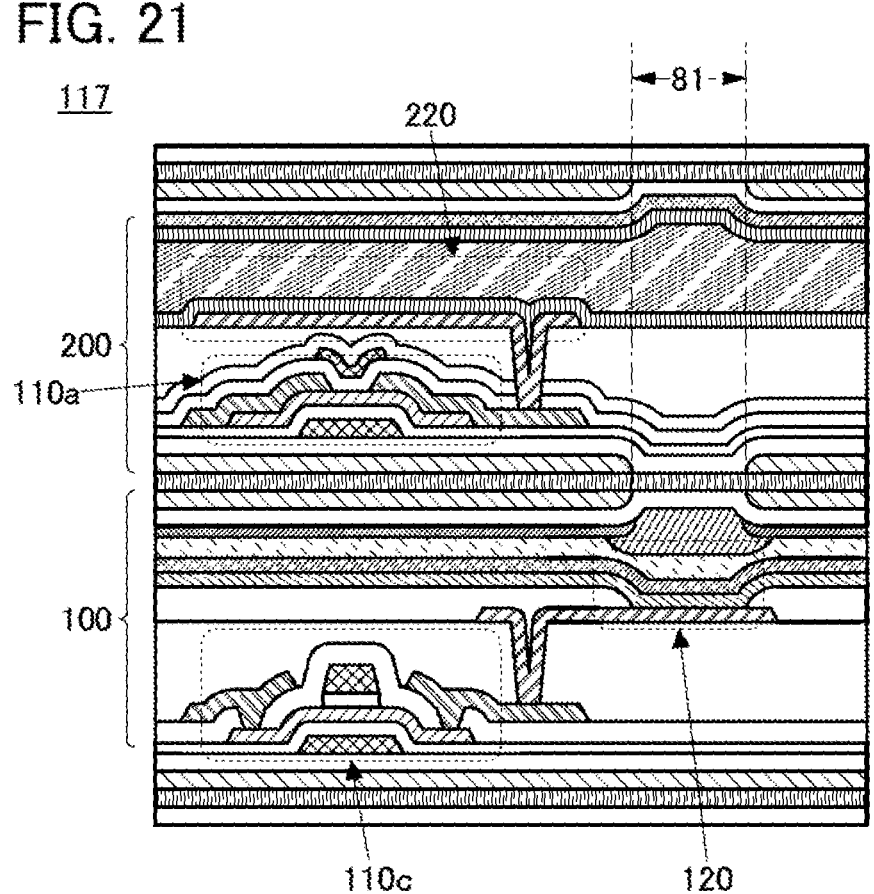
FIG. 21 is a cross-sectional view illustrating a structural example of a display device.

FIG. 21 illustrates an example in which the transistor 110a is used instead of the transistor 210 in FIG. 9 and the transistor 110c is used instead of the transistor 110.

The above is the description of the transistors.

At least part of this embodiment can be implemented in combination with any of the other embodiments described in this specification as appropriate.

(Embodiment 4)

In this embodiment, portable electronic devices to which the semiconductor device of one embodiment of the present invention can be applied will be described.

Figure 22A:
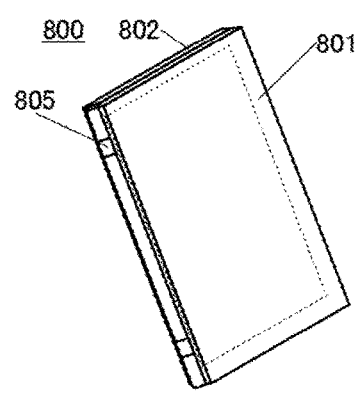
FIGS. 22A to 22D illustrate structural examples of electronic devices.
Figure 22B:
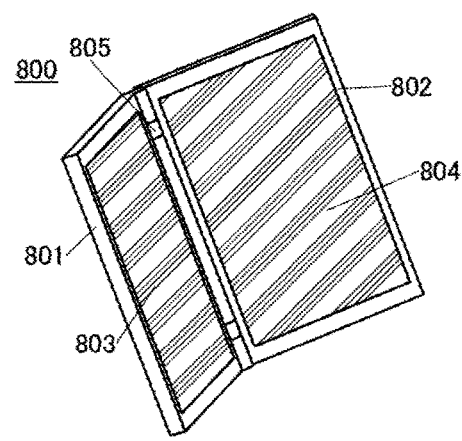

FIGS. 22A and 22B illustrate an example of a portable information terminal 800. The portable information terminal 800 includes a housing 801, a housing 802, a display portion 803, a display portion 804, a hinge 805, and the like.

The housing 801 and the housing 802 are joined together with the hinge 805. The portable information terminal 800 folded as in FIG. 22A can be changed into the state illustrated in FIG. 22B, in which the housing 801 and the housing 802 are opened.

For example, text information can be displayed on the display portion 803 and the display portion 804; thus, the portable information terminal 800 can be used as an e-book reader. Furthermore, still images and moving images can be displayed on the display portion 803 and the display portion 804.

The portable information terminal 800 can be folded when being carried, and thus has general versatility.

Note that the housing 801 and the housing 802 may have a power button, an operation button, an external connection port, a speaker, a microphone, and the like.

Figure 22C:
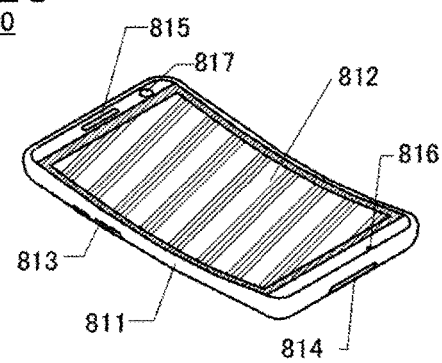

FIG. 22C illustrates an example of a portable information terminal. A portable information terminal 810 illustrated in FIG. 22C includes a housing 811, a display portion 812, an operation button 813, an external connection port 814, a speaker 815, a microphone 816, a camera 817, and the like.

The portable information terminal 810 includes a touch sensor in the display portion 812. Operations such as making a call and inputting a letter can be performed by touch on the display portion 812 with a finger, a stylus, or the like.

The power can be turned on or off with the operation button 813. In addition, types of images displayed on the display portion 812 can be switched; for example, switching images from a mail creation screen to a main menu screen is performed with the operation button 813.

When a detection device such as a gyroscope sensor or an acceleration sensor is provided inside the portable information terminal 810, display on the screen of the display portion 812 can be automatically changed by determining the orientation of the portable information terminal 810 (whether the portable information terminal 810 is placed horizontally or vertically for a landscape mode or a portrait mode). Furthermore, the orientation of display on the screen can be changed by touch on the display portion 812, operation with the operation button 813, sound input using the microphone 816, or the like.

The portable information terminal 810 functions as, for example, one or more of a telephone set, a notebook, and an information browsing system. Specifically, the portable information terminal 810 can be used as a smartphone. The portable information terminal 810 is capable of executing a variety of applications such as mobile phone calls, e-mailing, text reading and editing, music replay, video replay, Internet communication, and a game, for example.

Figure 22D:
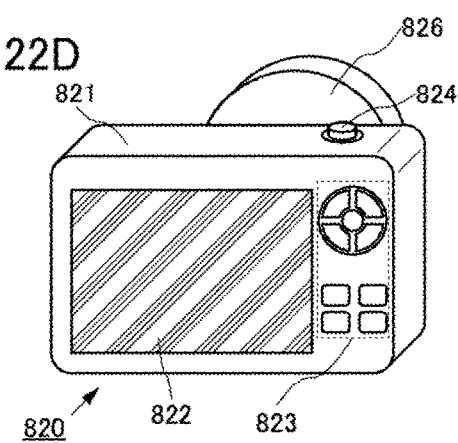

FIG. 22D illustrates an example of a camera. A camera 820 includes a housing 821, a display portion 822, operation buttons 823, a shutter button 824, and the like. The camera 820 is provided with an attachable lens 826.

Although the lens 826 of the camera 820 here is detachable from the housing 821 for replacement, the lens 826 may be integrated with the housing 821.

Still images or moving images can be taken with the camera 820 by pushing the shutter button 824. In addition, the display portion 822 functions as a touch panel, and images can be taken when the display portion 822 is touched.

Note that a stroboscope, a viewfinder, or the like can be additionally provided in the camera 820. Alternatively, these can be incorporated in the housing 821.

In the case of using the semiconductor device of the present invention for the portable electronic device of this embodiment, the use of the present invention easily makes the portable electronic device adaptive to a change in an environment even when the probability of occurrence of soft errors due to radiation becomes high owing to the usage environment. Note that at least part of this embodiment can be implemented in combination with any of the other embodiments described in this specification as appropriate.

(Embodiment 5)

An example of a semiconductor device including a transistor 350 of one embodiment of the present invention is described below.

FIG. 23A is a top view of the semiconductor device including the transistor 350. FIG. 23B is a cross-sectional view of a portion indicated by a dashed-dotted line A1-A2 in FIG. 23A, illustrating a cross section of the transistor 350 in a channel length direction. FIG. 23C is a cross-sectional view of a portion indicated by a dashed-dotted line A3-A4 in FIG. 23A, illustrating a cross section of the transistor 350 in a channel width direction. In the top view of FIG. 23A, some components are not illustrated for simplification of the drawing.

As illustrated in FIGS. 23A to 23C, the transistor 350 includes an insulating layer 402 over a substrate (not illustrated), an oxide semiconductor film 406*a* over the insulating layer 402, an oxide semiconductor film 406*b* in contact with at least part of an upper surface of the oxide semiconductor film 406*a*, an insulating layer 412 over the oxide semiconductor film 406*b*, a conductive layer 404*a* over the insulating layer 412, a conductive layer 404*b* over the conductive layer 404*a*, an insulating layer 419 over the conductive layer 404*b*, an insulating layer 418 in contact with side surfaces of the insulating layer 412, the conductive layer 404*a*, the conductive layer 404*b*, and the insulating layer 419, and an insulating layer 409 in contact with an upper surface of the oxide semiconductor film 406*b* and a side surface of the insulating layer 418. Here, as illustrated in FIG. 23B, an upper surface of the insulating layer 418 is preferably substantially aligned with an upper surface of the insulating layer 419. Furthermore, the insulating layer 409 is preferably provided to cover the insulating layer 419, a conductive layer 404, the insulating layer 418, and an oxide semiconductor film 406.

In the following description, the oxide semiconductor film 406*a* and the oxide semiconductor film 406*b* are collectively referred to as the oxide semiconductor film 406 in some cases. Although the oxide semiconductor film 406*a* and the oxide semiconductor film 406*b* are stacked in the transistor 350, the structure of the present invention is not limited to this structure. For example, only the oxide semiconductor film 406*b* may be provided. Furthermore, the conductive layer 404*a* and the conductive layer 404*b* are collectively referred to as the conductive layer 404 in some cases. Although the conductive layer 404*a* and the conductive layer 404*b* are stacked in the transistor 350, the structure of the present invention is not limited to this structure. For example, only the conductive layer 404*b* may be provided.

For the transistor 350, an insulating layer 432 may be provided over the substrate. Furthermore, the transistor 350 may include an insulating layer 430 provided over the insulating layer 401 and a conductive layer 440 embedded in the insulating layer 430. The insulating layer 401 may be provided over the insulating layer 430, and an insulating layer 301 may be provided over the insulating layer 401. Moreover, the transistor 350 may include a conductive layer 310 embedded in the insulating layer 401 and the insulating layer 301. Here, it is preferable that the conductive layer 310 be provided over and in contact with the conductive layer 440 so as to overlap with the oxide semiconductor film 406 and the conductive layer 404. The transistor 350 may include an insulating layer 302 over the insulating layer 301 and the conductive layer 310 and an insulating layer 303 over the insulating layer 302, and the insulating layer 402 may be provided over the insulating layer 303.

The conductive layer 440 includes a conductive layer 440*a* that is in contact with an inner wall of an opening in the insulating layer 430 and a conductive layer 440*b* positioned inside the conductive layer 440*a*. Here, the height of the upper surfaces of the conductive layers 440*a* and 440*b* can be substantially the same as that of the upper surface of the insulating layer 430. Although the conductive layer 440*a* and the conductive layer 440*b* are stacked in the transistor 350, the structure of the present invention is not limited to this structure. For example, only the conductive layer 440*b* may be provided.

The conductive layer 310 includes a conductive layer 310*a* that is in contact with an inner wall of an opening in the insulating layer 401 and the insulating layer 301 and a conductive layer 310*b* positioned inside the conductive layer 310*a*. Thus, a structure in which the conductive layer 310*a* is in contact with the conductive layer 440*b* is preferable. Here, the height of the upper surfaces of the conductive layers 310*a* and 310*b* can be substantially the same as that of the upper surface of the insulating layer 301. Although the conductive layer 310*a* and the conductive layer 310*b* are stacked in the transistor 350, the structure of the present invention is not limited to this structure. For example, only the conductive layer 310*b* may be provided.

The conductive layer 404 can function as a top gate, and the conductive layer 310 can function as a back gate. The potential of the back gate can be the same as the potential of the top gate, the ground potential, or an arbitrary potential. By changing the potential of the back gate independently of the potential of the top gate, the threshold voltage of the transistor can be changed.

The conductive layer 440 extends in the channel width direction in a manner similar to that of the conductive layer 404, and functions as a wiring through which a potential is applied to the conductive layer 310, i.e., the back gate. When the conductive layer 310 is stacked over the conductive layer 440 functioning as the wiring for the back gate so as to be embedded in the insulating layers 401 and 301, the insulating layers 401 and 301 and the like are positioned between the conductive layer 440 and the conductive layer 404, reducing the parasitic capacitance between the conductive layer 440 and the conductive layer 404 and thereby increasing the withstand voltage. The reduction in the parasitic capacitance between the conductive layer 440 and the conductive layer 404 can improve the switching speed of the transistor, so that the transistor can have high frequency characteristics. The increase in the withstand voltage between the conductive layer 440 and the conductive layer 404 can improve the reliability of the transistor 350. Therefore, the thicknesses of the insulating layer 401 and the insulating layer 301 are preferably large. Note that the extending direction of the conductive layer 440 is not limited to this example; for example, the conductive layer 440 may extend in the channel length direction of the transistor 350.

Here, it is preferable to use a conductive material that has a function of inhibiting the passage of impurities such as water or hydrogen or hardly transmits such impurities for the conductive layer 310a and the conductive layer 440a. For example, tantalum, tantalum nitride, ruthenium, ruthenium oxide, or the like is preferably used, and a single layer or stacked layers may be used. Owing to this, diffusion of impurities such as water or hydrogen from a layer under the insulating layer 432 into an upper layer through the conductive layers 440 and 310 can be inhibited. Note that it is preferable that the conductive layers 310a and 440a have a function of inhibiting the passage of at least one of impurities such as a hydrogen atom, a hydrogen molecule, a water molecule, an oxygen atom, an oxygen molecule, a nitrogen atom, a nitrogen molecule, a nitrogen oxide molecule (e.g., $N_2O$, NO, and $NO_2$), and a copper atom and oxygen (e.g., an oxygen atom or an oxygen molecule). Furthermore, in the following description, the same applies to a conductive material having a function of inhibiting the passage of impurities. When the conductive layers 310a and 440a have a function of inhibiting the passage of oxygen, the conductivity of the conductive layers 310b and 440b can be prevented from being lowered because of oxidation.

Moreover, the conductive layer 310b is preferably formed using a conductive material including tungsten, copper, or aluminum as its main component. Although not shown, the conductive layer 310b may have a stacked-layer structure, and for example, stacked layers of titanium, titanium nitride, and the above-described conductive material may be formed.

The conductive layer 440b, which serves as a wiring, is preferably formed using a conductive layer having a higher conductivity than the conductive layer 310b; a conductive material including copper or aluminum as its main component can be used, for example. Although not illustrated, the conductive layer 440b may have a stacked-layer structure and be, for example, stacked layers of titanium, titanium nitride, and the above-described conductive material.

The insulating layer 432 and the insulating layer 401 can each function as a barrier insulating film for preventing impurities such as water or hydrogen from entering the transistor from a lower layer. The insulating layer 432 and the insulating layer 401 are preferably formed using an insulating material having a function of inhibiting the passage of impurities such as water or hydrogen. For example, aluminum oxide or the like is preferably used for the insulating layer 432, and silicon nitride or the like is preferably used for the insulating layer 401. This can suppress diffusion of impurities such as hydrogen and water to a layer positioned over the insulating layer 432 and the insulating layer 401. Note that it is preferable that the insulating layer 432 and the insulating layer 401 have a function of inhibiting the passage of at least one of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Furthermore, in the following description, the same applies to an insulating material having a function of inhibiting the passage of impurities.

Furthermore, for the insulating layer 432 and the insulating layer 401, an insulating material having a function of inhibiting the passage of oxygen (e.g., an oxygen atom or an oxygen molecule) is preferably used. With this material, oxygen contained in the insulating layer 402 or the like can be inhibited from diffusing into lower layers.

Furthermore, with the structure in which the conductive layer 310 is stacked over the conductive layer 440, the insulating layer 401 can be provided between the conductive layer 440 and the conductive layer 310. Here, even when a metal that is easily diffused, such as coper, is used as the conductive layer 440b, silicon nitride or the like provided as the insulating layer 401 can prevent diffusion of the metal to a layer positioned over the insulating layer 401.

The insulating layer 303 is preferably formed using an insulating material having a function of inhibiting the passage of impurities such as water or hydrogen and oxygen, and for example, is preferably formed using aluminum oxide or hafnium oxide. Accordingly, diffusion of impurities such as water or hydrogen from a layer under the insulating layer 303 to a layer over the insulating layer 303 can be inhibited. Furthermore, oxygen contained in the insulating layer 402 or the like can be inhibited from diffusing into lower layers.

Furthermore, the concentration of impurities such as water, hydrogen, or nitrogen oxide in the insulating layer 402 is preferably lowered. The amount of hydrogen released from the insulating layer 402 that is converted into hydrogen molecules per unit area of the insulating layer 402 is less than or equal to $2\times10^{15}$ molecules/cm$^2$, preferably less than or equal to $1\times10^{15}$ molecules/cm$^2$, further preferably less than or equal to $5\times10^{14}$ molecules/cm$^2$ in thermal desorption spectroscopy (TDS) analysis in the range from 50° C. to 500° C., for example. Moreover, the insulating layer 402 is preferably formed using an insulating layer from which oxygen is released by heating.

The insulating layer 412 can function as a first gate insulating film, and the insulating layer 302, the insulating layer 303, and the insulating layer 402 can function as a second gate insulating film. Although the insulating layer 302, the insulating layer 303, and the insulating layer 402 are stacked in the transistor 350, the present invention is not limited to this structure. For example, any two of the insulating layers 302, 303, and 402 may be stacked, or any one of the insulating layers may be used.

The oxide semiconductor film 406 is preferably formed using a metal oxide functioning as an oxide semiconductor (hereinafter, such a metal oxide is also referred to as an oxide semiconductor). The metal oxide preferably has an energy gap of 2 eV or more, preferably 2.5 eV or more. With the use of a metal oxide having such a wide energy gap, the off-state current of the transistor can be reduced.

A transistor formed using an oxide semiconductor has an extremely low leakage current in an off state; thus, a semiconductor device with low power consumption can be provided. An oxide semiconductor can be formed by a sputtering method or the like and thus can be used in a transistor included in a highly integrated semiconductor device.

Here, the atomic ratio of the element M to the constituent elements of the metal oxide used for the oxide semiconductor film 406a is preferably greater than that of the metal oxide used for the oxide semiconductor film 406b. Moreover, the atomic ratio of the element M to In in the metal oxide used for the oxide semiconductor film 406a is preferably greater than that in the metal oxide used for the oxide semiconductor film 406b. Furthermore, the atomic ratio of In to the element M in the metal oxide used for the oxide semiconductor film 406b is preferably greater than that in the metal oxide used for the oxide semiconductor film 406a.

By using the above metal oxide for the oxide semiconductor film 406a, it is preferable that the energy of the conduction band minimum of the oxide semiconductor film 406a be higher than the energy of the conduction band minimum of a region of the oxide semiconductor film 406b where the energy of the conduction band minimum is low. In other words, the electron affinity of the oxide semiconductor film 406a is preferably smaller than the electron affinity of the region of the oxide semiconductor film 406b where the energy of the conduction band minimum is low.

Here, the energy level of the conduction band minimum gradually changes in the oxide semiconductor films 406a and 406b. In other words, the energy level of the conduction band minimum continuously changes or is continuously connected. To obtain such an energy level, the density of defect states in a mixed layer formed at an interface between the oxide semiconductor films 406a and 406b is preferably made low.

Specifically, when the oxide semiconductor films 406a and 406b contain the same element (as a main component) in addition to oxygen, a mixed layer with a low density of defect states can be formed. For example, in the case where the oxide semiconductor film 406b is an In—Ga—Zn oxide, it is preferable to use an In—Ga—Zn oxide, a Ga—Zn oxide, gallium oxide, or the like as the oxide semiconductor film 406a.

At this time, a narrow-gap portion formed in the oxide semiconductor film 406b serves as a main carrier path. Since the density of defect states at the interface between the oxide semiconductor films 406a and 406b can be made low, the influence of interface scattering on carrier conduction is small, and high on-state current can be obtained.

Furthermore, the oxide semiconductor film 406 includes a region 426a, a region 426b, and a region 426c. The region 426a is sandwiched between the region 426b and the region 426c as illustrated in FIG. 23B. The region 426b and the region 426c are regions having reduced resistance owing to the formation of the insulating layer 409 and thereby have higher conductivity than the region 426a. An impurity element such as hydrogen or nitrogen included in the atmosphere for forming the insulating layer 409 is added to the region 426b and the region 426c. Thus, owing to the added impurity element, oxygen vacancies are generated mainly in the regions of the oxide semiconductor film 406b that overlap with the insulating layer 409, and furthermore the impurity element enters the oxygen vacancies, which increases the carrier density and decreases the resistance.

Therefore, the region 426b and the region 426c preferably have a higher concentration of at least one of hydrogen and nitrogen than the region 426a. The concentration of hydrogen or nitrogen can be measured by secondary ion mass spectrometry (SIMS) or the like. Here, the concentration of hydrogen or nitrogen in the middle of the region of the oxide semiconductor film 406b that overlaps with the insulating layer 412 (e.g., a portion in the oxide semiconductor film 406b which is located equidistant from both side surfaces in the channel length direction of the insulating layer 412) is measured as the concentration of hydrogen or nitrogen in the region 426a.

Note that the resistance of the region 426b and the region 426c is reduced by addition of an element that generates oxygen vacancies or an element that is bonded to oxygen vacancies. Typical examples of the element are hydrogen, boron, carbon, nitrogen, fluorine, phosphorus, sulfur, chlorine, titanium, and a rare gas element. Typical examples of the rare gas element are helium, neon, argon, krypton, and xenon. Thus, the region 426b and the region 426c include one or more of the above-described elements.

Furthermore, it is preferable in the oxide semiconductor film 406a that the atomic ratio of In to the element M in the regions 426b and 426c be substantially the same as that in the oxide semiconductor film 406b. In other words, in the oxide semiconductor film 406a, the atomic ratio of In to the element M in the region 426b and the region 426c is preferably larger than that in the region 426a. Here, when the indium content in the oxide semiconductor film 406 is increased, the carrier density is increased and the resistance can be decreased. With this structure, even when the thickness of the oxide semiconductor film 406b is small and electric resistance of the oxide semiconductor film 406b is high in the manufacturing process of the transistor 350, the region 426b and the region 426c in the oxide semiconductor film 406 can function as a source region and a drain region owing to the sufficiently reduced resistance of the oxide semiconductor film 406a in the region 426b and the region 426c.

The region 426b and the region 426c illustrated in FIG. 23B are formed in at least the regions overlapping with the insulating layer 409 in the oxide semiconductor film 406. Here, one of the region 426b and the region 426c in the oxide semiconductor film 406b can function as a source region, and the other can function as a drain region. Moreover, the region 426a in the oxide semiconductor film 406b can function as a channel formation region.

Although the regions 426a, 426b, and 426c are formed in the oxide semiconductor films 406b and 406a in FIG. 23B, it is acceptable as long as these regions are formed in the oxide semiconductor film 406b. Furthermore, although a boundary between the region 426a and the region 426b and a boundary between the region 426a and the region 426c are illustrated as being substantially perpendicular to the upper surface of the oxide semiconductor film 406 in FIG. 23B and the like, this embodiment is not limited to this structure. For example, in some cases, the region 426b and the region 426c project to the conductive layer 404 side in the vicinity of the surface of the oxide semiconductor film 406b and are recessed to the insulating layer 409 side in the vicinity of a lower surface of the oxide semiconductor film 406a.

In the transistor 350, the region 426b and the region 426c are formed in the regions where the oxide semiconductor film 406 is in contact with the insulating layer 409 and the regions overlapping with the vicinity of the both end portions of the insulating layers 418 and 412. At this time, portions of the regions 426b and 426c which overlap with the conductive layer 404 function as so-called "overlap regions (Lov regions)." Because a high-resistance region is not formed between the channel formation region and the source or drain region of the oxide semiconductor film 406 in the structure including the Lov region, the on-state current and the mobility of the transistor can be increased.

Note that the semiconductor device of this embodiment is not limited to this example. The region 426b and the region 426c may be formed in regions where the oxide semiconductor film 406 overlaps with the insulating layer 409 and the insulating layer 418. In other words, the width of the conductive layer 404 in the channel length direction is substantially the same as the width of the region 426a. Because a high-resistance region is not formed between the channel formation region and the source or drain region in the above-described structure, the on-state current of the transistor can be increased. Since the gate does not overlap with the source and drain regions in the channel length direction in the above-described structure, formation of unnecessary capacitance can be suppressed.

Thus, by appropriately selecting the areas of the region 426b and the region 426c, a transistor having electrical characteristics necessary for the circuit design can be easily provided.

The insulating layer 412 is preferably provided in contact with an upper surface of the oxide semiconductor film 406b. The insulating layer 412 is preferably formed using an insulating layer from which oxygen is released by heating. When the insulating layer 412 formed using such an insulating layer is formed in contact with the upper surface of the oxide semiconductor film 406b, oxygen can be supplied to the oxide semiconductor film 406b effectively. Furthermore, like the insulating layer 402, the concentration of impurities such as water or hydrogen in the insulating layer 412 is preferably lowered. The thickness of the insulating layer 412 is preferably more than or equal to 1 nm and less than or equal to 20 nm, and may be approximately 1 nm, for example.

The insulating layer 412 preferably includes oxygen. For example, the amount of released oxygen molecules per unit area of the insulating layer 412 is more than or equal to $1 \times 10^{14}$ molecules/cm$^2$, preferably more than or equal to $2 \times 10^{14}$ molecules/cm$^2$, further preferably more than or equal to $4 \times 10^{14}$ molecules/cm$^2$ in thermal desorption spectroscopy (TDS) analysis in the range of a surface temperature from 100° C. to 700° C. or from 100° C. to 500° C.

The insulating layer 412, the conductive layer 404, and the insulating layer 419 each include a region overlapping with the oxide semiconductor film 406b. In addition, side surfaces of the insulating layer 412, the conductive layer 404a, the conductive layer 404b, and the insulating layer 419 are preferably aligned with each other.

For the conductive layer 404a, a conductive oxide is preferably used. For example, the metal oxide that can be used for the oxide semiconductor film 406a or the oxide semiconductor film 406b can be used. In particular, an In—Ga—Zn-based oxide with a metal atomic ratio of In:Ga:Zn=4:2:3 to In:Ga:Zn=4:2:4.1 or in the neighborhood thereof, which has high conductivity, is preferably used. When the conductive layer 404a is formed using such a material, oxygen can be prevented from entering the conductive layer 404b, and an increase in electric resistance value of the conductive layer 404b due to oxidation can be prevented.

When such a conductive oxide is deposited by a sputtering method, oxygen can be added to the insulating layer 412, so that oxygen can be supplied to the oxide semiconductor film 406b. Thus, oxygen vacancies in the region 426a of the oxide semiconductor film 406 can be reduced.

The conductive layer 404b can be formed using a metal such as tungsten, for example. As the conductive layer 404b, a conductive layer that can add impurities such as nitrogen to the conductive layer 404a to improve the conductivity of the conductive layer 404a may be used. For example, titanium nitride or the like is preferably used for the conductive layer 404b. Furthermore, the conductive layer 404b may have a structure in which a metal such as tungsten is stacked over a metal nitride such as titanium nitride.

Here, the conductive layer 404 functioning as a gate electrode is provided to cover the upper surface of the region 426a and its periphery and the side surface, which is in the channel width direction, of the oxide semiconductor film 406b with the insulating layer 412 positioned therebetween. Thus, the electric field of the conductive layer 404 functioning as a gate electrode can electrically surround the upper surface of the region 426a and its periphery and the side surface, which is in the channel width direction, of the oxide semiconductor film 406b. The structure of the transistor in which the channel formation region is electrically surrounded by the electric field of the conductive layer 404 is referred to as a surrounded channel (s-channel) structure. Thus, a channel can be formed in the upper surface of the region 426a and its periphery and the side surface, which is in the channel width direction, of the oxide semiconductor film 406b; therefore, a large amount of current can flow between the source and the drain, and a current in an on state (on-state current) can be large. Moreover, since the upper surface of the region 426a and its periphery and the side surface, which is in the channel width direction, of the oxide semiconductor film 406b are surrounded by the electric field of the conductive layer 404, a leakage current in an off state (off-state current) can be small.

The insulating layer 419 is preferably provided over the conductive layer 404b. In addition, side surfaces of the insulating layer 419, the conductive layer 404a, the conductive layer 404b, and the insulating layer 412 are preferably aligned with each other. The insulating layer 419 is preferably formed by an atomic layer deposition (ALD) method, in which case the thickness of the insulating layer 419 can be approximately more than or equal to 1 nm and less than or equal to 20 nm, preferably more than or equal to 5 nm and less than or equal to 510 nm. Here, like the insulating layer 418, the insulating layer 419 is preferably formed using an insulating material having a function of inhibiting the passage of impurities such as water or hydrogen and oxygen; aluminum oxide, hafnium oxide, or the like is preferably used, for example.

When the insulating layer 419 is formed using such a material, the insulating layer 419 and the insulating layer 418 which have a function of inhibiting the passage of impurities such as water or hydrogen and oxygen can cover upper and side surfaces of the conductive layer 404. This can prevent entry of impurities such as water or hydrogen into the oxide semiconductor film 406 through the conductive layer 404. Thus, the insulating layer 418 and the insulating layer 419 have a function of a gate cap that protects the gate.

The insulating layer 418 is provided in contact with the side surfaces of the insulating layer 412, the conductive layer 404, and the insulating layer 419. Furthermore, the upper surface of the insulating layer 418 is preferably aligned with the upper surface of the insulating layer 419.

The insulating layer 418 is preferably formed by an ALD method, in which case the thickness of the insulating layer 418 can be approximately more than or equal to 1 nm and less than or equal to 20 nm, preferably more than or equal to 1 nm and less than or equal to 3 nm, and for example 1 nm. Note that a precursor used in the ALD method sometimes contains impurities such as carbon. Thus, the insulating layer 418 may contain impurities such as carbon. In the case where the insulating layer 401 is formed by a sputtering method and the insulating layer 418 is formed by an ALD method, for example, the insulating layer 418 may contain more impurities such as carbon than the insulating layer 401 even when the insulating layers 418 and 401 are both formed using aluminum oxide. Note that impurities can be quantified by X-ray photoelectron spectroscopy (XPS).

As described above, the region 426b and the region 426c of the oxide semiconductor film 406 are formed by the impurity element added in the formation of the insulating layer 409. In the case where the transistor is miniaturized to have a channel length of approximately 10 nm to 30 nm, the impurity element contained in the source region or the drain region might be diffused to establish electrical connection between the source region and the drain region. In this embodiment, however, the insulating layer 418 can increase the distance between regions of the oxide semiconductor film 406 that are in contact with the insulating layer 409; accordingly, electrical connection between the source region and the drain region can be prevented. Furthermore, by using an ALD method, the insulating layer 418 can be formed to have a thickness that is as small as or smaller than the length of the miniaturized channel. Accordingly, an excessive increase of the distance between the source region and the drain region is not caused and thereby an increase in the resistance can be prevented.

Here, the insulating layer 418 is preferably formed using an insulating material having a function of inhibiting the passage of impurities such as water or hydrogen and oxygen, and for example, is preferably formed using aluminum oxide or hafnium oxide. Accordingly, diffusion of oxygen from the insulating layer 412 to the outside can be inhibited. Furthermore, entry of impurities such as hydrogen or water to the oxide semiconductor film 406 from an end portion or the like of the insulating layer 412 can be prevented.

The insulating layer 418 is preferably formed in the following manner: an insulating film is deposited by an ALD method and then subjected to anisotropic etching so as to remain in a portion in contact with the side surfaces of the insulating layer 412, the conductive layer 404, and the insulating layer 419. Thus, an insulating layer having a small thickness as described above can be easily formed. At this time, even when the insulating layer 419 provided over the conductive layer 404 is partly removed by the anisotropic etching, portions of the insulating layer 418 in contact with the insulating layer 412 and the conductive layer 404 can be left sufficiently.

In the above-described method for manufacturing a semiconductor device, the insulating layer 409 in contact with the oxide semiconductor film 406 is formed to form the regions 426b and 426c; however, the method for manufacturing a semiconductor device of this embodiment is not limited thereto. For example, a dopant may be added to form the regions 426b and 426c.

The step of adding a dopant is performed after the formation of the insulating layer 418 illustrated in FIGS. 23A to 23C. As illustrated in FIGS. 23A to 23C, a dopant is added to the oxide semiconductor film 406 using the insulating layer 412, the conductive layer 404, and the insulating layer 418 as masks.

Examples of methods for adding the dopant include an ion implantation method by which an ionized source gas is subjected to mass separation and then added, an ion doping method by which an ionized source gas is added without mass separation, and a plasma immersion ion implantation method. In the case of performing mass separation, an ion species to be added and its concentration can be controlled properly. On the other hand, in the case of not performing mass separation, ions at a high concentration can be added in a short time. Alternatively, an ion doping method in which atomic or molecular clusters are generated and ionized may be employed. Instead of the term "dopant," the term "ion," "donor," "acceptor," "impurity," "element," or the like may be used.

As the dopant, the element that generates oxygen vacancies or the element that is bonded to oxygen vacancies may be used. Typical examples of the element are hydrogen, boron, carbon, nitrogen, fluorine, phosphorus, sulfur, chlorine, titanium, and a rare gas element. Typical examples of the rare gas element are helium, neon, argon, krypton, and xenon.

Here, when the indium content in the oxide semiconductor film 406 is increased, the carrier density can be increased and the resistance can be decreased. Thus, a metal element such as indium, which increases the carrier density of the oxide semiconductor film 406, can be used as the dopant. Here, it is preferable that the dopant be added such that the peak of the indium concentration is in the oxide semiconductor film 406a.

It is preferable that indium be added in this manner such that the atomic ratio of indium to the element M in the regions 426b and 426c of the oxide semiconductor film 406a is substantially the same as that of the oxide semiconductor film 406b. In other words, in the oxide semiconductor film 406a, the atomic ratio of indium to the element M in the region 426b and the region 426c is preferably higher than that in the region 426a.

By such indium addition, even when the thickness of the oxide semiconductor film 406b is small and electric resistance of the oxide semiconductor film 406b is high in the manufacturing process of the transistor 350, the region 426b and the region 426c in the oxide semiconductor film 406 can function as a source region and a drain region owing to the sufficiently reduced resistance of the oxide semiconductor film 406a in the region 426b and the region 426c.

An insulating material having a function of inhibiting the penetration of oxygen and impurities such as water or hydrogen, as with the insulating layer 409 or the like, is preferably used after the regions 426b and 426c are formed in the oxide semiconductor film 406 in the above-described manner. When such an insulating layer is provided over the regions 426b and 426c, oxygen and impurities such as water or hydrogen can be prevented from entering the regions 426b and 426c, leading to the prevention of a change in carrier density.

The insulating layer 409 is provided to cover the insulating layer 419, the insulating layer 418, the oxide semiconductor film 406, and the insulating layer 402. Here, the insulating layer 409 is provided in contact with the upper surfaces of the insulating layers 419 and 418 and the side surface of the insulating layer 418. As described above, impurities such as hydrogen or nitrogen are added from the insulating layer 409 to the oxide semiconductor film 406, so that the region 426b and the region 426c are formed. Thus, the insulating layer 409 preferably contains at least one of hydrogen and nitrogen.

Furthermore, the insulating layer 409 is preferably provided in contact with side surfaces of the oxide semiconductor films 406b and 406a as well as the upper surface of the oxide semiconductor film 406b. This enables a resistance reduction in the region 426b and the region 426c to the side surfaces of the oxide semiconductor films 406b and 406a.

Moreover, the insulating layer 409 is preferably formed using an insulating material having a function of inhibiting the passage of impurities such as water or hydrogen and oxygen. For example, for the insulating layer 409, silicon nitride, silicon nitride oxide, silicon oxynitride, aluminum nitride, aluminum nitride oxide, or the like is preferably used. The insulating layer 409 formed using such a material can prevent oxygen from passing through the insulating layer 409 and being supplied to oxygen vacancies in the region 426b and the region 426c, so that a reduction in carrier density can be prevented. Furthermore, impurities such as water or hydrogen can be prevented from passing through the insulating layer 409 and excessively enlarging the region 426b and the region 426c to the region 426a side.

An insulating layer 415 is preferably provided over the insulating layer 409. The concentration of impurities such as water or hydrogen in the insulating layer 415 is preferably lowered as in the insulating layer 402 or the like. Note that an insulating layer similar to the insulating layer 432 may be provided over the insulating layer 415.

In openings formed in the insulating layer 415 and the insulating layer 409, a combination of a conductive layer 450a and a conductive layer 451a and a combination of a conductive layer 450b and a conductive layer 451b are provided. The combination of the conductive layer 450a and the conductive layer 451a and the combination of the conductive layer 450b and the conductive layer 451b are preferably provided with the conductive layer 404 sandwiched therebetween.

Here, the conductive layer 450a is formed in contact with an inner wall of the opening provided in the insulating layer 415 and the insulating layer 409, and the conductive layer 451a is further provided inside the conductive layer 450a. The region 426b of the oxide semiconductor film 406 is positioned in at least part of a bottom portion of the opening, and the conductive layer 450a is in contact with the region 426b. Similarly, the conductive layer 450b is formed in contact with an inner wall of the opening provided in the insulating layer 415 and the insulating layer 409, and the conductive layer 451b is further provided inside the conductive layer 450b. The region 426c of the oxide semiconductor film 406 is positioned in at least part of a bottom portion of the opening, and the conductive layer 450b is in contact with the region 426c.

As illustrated in FIG. 23B, the conductive layer 450b is in contact with at least the upper surface of the oxide semiconductor film 406 and is preferably in contact with the side surface of the oxide semiconductor film 406. As illustrated in FIG. 23B, the conductive layer 450b may be in contact with the side surface on the A2 side in the channel length direction of the oxide semiconductor film 406. Thus, when the structure in which the conductive layer 450b is in contact with the side surface of the oxide semiconductor film 406 in addition to the upper surface of the oxide semiconductor film 406 is employed, the contact area between the conductive layer 450b and the oxide semiconductor film 406 can be increased without an increase in the area of the upper surface of the contact portion, so that the contact resistance between the conductive layer 450b and the oxide semiconductor film 406 can be reduced. Accordingly, miniaturization of the source electrode and the drain electrode of the transistor can be achieved and, in addition, the on-state current can be increased. Note that the same applies to the conductive layer 450a and the conductive layer 451a.

Here, the conductive layer 450a is in contact with the region 426b functioning as one of the source region and the drain region of the transistor 350, and the conductive layer 450b is in contact with the region 426c functioning as the other of the source region and the drain region of the transistor 350. Therefore, the conductive layer 450a and the conductive layer 451a can function as one of a source electrode and a drain electrode, and the conductive layer 450b and the conductive layer 451b can function as the other of the source electrode and the drain electrode. Because the region 426b and the region 426c are reduced in resistance, the contact resistance between the conductive layer 450a and the region 426b and the contact resistance between the conductive layer 450b and the region 426c are reduced, leading to a large on-state current of the transistor 350.

Here, the conductive layer 450a and the conductive layer 450b are preferably formed using a conductive material having a function of inhibiting the passage of impurities such as water or hydrogen, like the conductive layer 310a or the like. Forexample, tantalum, tantalum nitride, titanium, titanium nitride, ruthenium, ruthenium oxide, or the like is preferably used, and a single layer or stacked layers may be used. This can prevent entry of impurities such as hydrogen or water from a layer positioned over the insulating layer 415 to the oxide semiconductor film 406 through the conductive layer 451a and the conductive layer 451b.

Furthermore, the conductive layer 451a and the conductive layer 451b are preferably formed using a conductive material including tungsten, copper, or aluminum as its main component. Although not shown, the conductive layer 451a and the conductive layer 451b may have a stacked-layer structure, and for example, stacked layers of titanium, titanium nitride, and the above-described conductive material may be formed.

Note that although the conductive layer 450a and the conductive layer 450b are in contact with both the oxide semiconductor film 406a and the oxide semiconductor film 406b in FIG. 23C, the structure is not limited to this example. For example, a structure in which the conductive layer 450a and the conductive layer 450b are in contact with only the oxide semiconductor film 406b may be employed. Furthermore, the heights of the upper surfaces of the conductive layer 450a, the conductive layer 451a, the conductive layer 450b, and the conductive layer 451b can be substantially the same as each other. Furthermore, although the transistor 350 in which the conductive layer 450a and the conductive layer 451a are stacked and the conductive layer 450b and the conductive layer 451b are stacked is described, the present invention is not limited to this example. For example, a structure in which only the conductive layer 451a and the conductive layer 451b are provided may be employed.

It is preferable that a conductive layer 452a be provided in contact with the upper surface of the conductive layer 451a and a conductive layer 452b be provided in contact with the upper surface of the conductive layer 451b. The conductive layer 452a and the conductive layer 452b are preferably formed using a conductive material including tungsten, copper, or aluminum as its main component. Although not shown, the conductive layer 452a and the conductive layer 452b may have a stacked-layer structure, and for example, stacked layers of titanium, titanium nitride, and the above-described conductive material may be formed. Note that the conductive layer 452a and the conductive layer 452b may be embedded in openings provided in an insulating layer, in a similar manner to the conductive layer 440 or the like.

In order to provide the conductive layer 452a and the conductive layer 452b over the conductive layer 451a and the conductive layer 451b, the upper surfaces of the conductive layer 451a and the conductive layer 451b may be planarized by planarization treatment using a chemical mechanical polishing (CMP) method or the like to increase the level of planarity.

As described above, according to one embodiment of the present invention, a semiconductor device which can be miniaturized or highly integrated can be provided. According to one embodiment of the present invention, a semiconductor device having favorable electrical characteristics can be provided. According to one embodiment of the present invention, a semiconductor device with low off-state current can be provided. According to one embodiment of the present invention, a transistor with high on-state current can be provided. According to one embodiment of the present invention, a highly reliable semiconductor device can be provided. According to one embodiment of the present invention, a semiconductor device with low power consumption can be provided. According to one embodiment of the present invention, a semiconductor device with high producibility can be provided.

The structures, the methods, and the like described in this embodiment can be combined as appropriate with any of the structures, the methods, and the like described in the other embodiments.

This application is based on Japanese Patent Application Serial No. 2016-215894 filed with Japan Patent Office on Nov. 4, 2016, the entire contents of which are hereby incorporated by reference.

What is claimed is:

1. A storage device comprising:
  a first memory cell and a second memory cell;
  a digital-analog converter circuit electrically connected to the first memory cell and the second memory cell through a bit line;
  a sense circuit electrically connected to the first memory cell through a first sense line and to the second memory cell through a second sense line; and
  an analog-digital converter circuit,
  wherein the digital-analog converter circuit is configured to apply voltages as first signals to the first memory cell and the second memory cell,
  wherein the sense circuit is configured to select as a second signal a higher one of the voltages applied to the first memory cell and the second memory cell, and
  wherein the analog-digital converter circuit is configured to convert the second signal into a digital signal.

2. The storage device according to claim 1, wherein each of the first memory cell and the second memory cell is configured to retain a multilevel data voltage.

3. The storage device according to claim 1,
  wherein each of the first memory cell and the second memory cell comprises a transistor comprising a semiconductor layer, and
  wherein the semiconductor layers of the transistors of the first memory cell and the second memory cell comprise a metal oxide.

4. The storage device according to claim 1, wherein each of the first memory cell and the second memory cell comprises a transistor comprising a back gate.

5. The storage device according to claim 1,
  wherein each of the first memory cell and the second memory cell comprises a transistor comprising a semiconductor layer, and
  wherein the semiconductor layers of the transistors of the first memory cell and the second memory cell are provided over a same insulating layer.

6. The storage device according to claim 1,
  wherein each of the first memory cell and the second memory cell comprises:
    a first transistor, a gate of the first transistor electrically connected to a word line, and one of a source and a drain of the first transistor electrically connected to the bit line;
    a second transistor, one of a source and a drain of the second transistor electrically connected to the bit line; and
    a capacitor, one electrode of the capacitor electrically connected to the other of the source and the drain of the first transistor and a gate of the second transistor,
  wherein the other of the source and the drain of the second transistor of the first memory cell is electrically connected to the first sense line, and
  wherein the other of the source and the drain of the second transistor of the second memory cell is electrically connected to the second sense line.

7. The storage device according to claim 1,
  wherein the sense circuit comprises a third transistor, a fourth transistor, a fifth transistor, a first capacitor, a second capacitor, and a third capacitor,
  wherein a gate of the third transistor is electrically connected to the first sense line through the first capacitor,
  wherein a gate of the fourth transistor is electrically connected to the second sense line through the second capacitor,
  wherein one of a source and a drain of the third transistor and one of a source and a drain of the fourth transistor are electrically connected to a first power supply line,
  wherein the other of the source and the drain of the third transistor, the other of the source and the drain of the fourth transistor, one of a source and a drain of the fifth transistor, and one electrode of the third capacitor are electrically connected to an input terminal of the analog-digital converter circuit and a floating node, and
  wherein the other of the source and the drain of the fifth transistor and the other electrode of the third capacitor are electrically connected to a second power supply line.

8. A semiconductor device comprising:
  the storage device according to claim 1; and
  a processor.

9. An electronic device comprising:
  the semiconductor device according to claim 8; and
  a display device and a communication module.

10. A server system comprising:
  the semiconductor device according to claim 8; and
  a communication module.

11. A storage device comprising:
  a first memory cell and a second memory cell;
  a digital-analog converter circuit electrically connected to the first memory cell and the second memory cell through a bit line;

a sense circuit electrically connected to the first memory cell through a first sense line and to the second memory cell through a second sense line; and an analog-digital converter circuit, wherein the digital-analog converter circuit is configured to apply voltages as first signals to the first memory cell and the second memory cell, wherein the sense circuit is configured to select as a second signal a higher one of the voltages applied to the first memory cell and the second memory cell, wherein the analog-digital converter circuit is configured to convert the second signal into a digital signal, wherein each of the first memory cell and the second memory cell comprises a transistor comprising a semiconductor layer, and wherein the transistor of the second memory cell is provided over the transistor of the first memory cell with an insulating layer therebetween.

12. The storage device according to claim 11, wherein each of the first memory cell and the second memory cell is configured to retain a multilevel data voltage.

13. The storage device according to claim 11, wherein the semiconductor layers of the transistors of the first memory cell and the second memory cell comprise a metal oxide.

14. The storage device according to claim 11, wherein the semiconductor layers of the transistors of the first memory cell and the second memory cell overlap with each other.

15. A storage device comprising:

a first memory cell and a second memory cell;

a digital-analog converter circuit electrically connected to the first memory cell and the second memory cell through a bit line;

a sense circuit electrically connected to the first memory cell through a first sense line and to the second memory cell through a second sense line; and an analog-digital converter circuit, wherein the digital-analog converter circuit is configured to apply voltages as first signals to the first memory cell and the second memory cell, wherein the sense circuit is configured to select as a second signal a higher one of the voltages applied to the first memory cell and the second memory cell, wherein the analog-digital converter circuit is configured to convert the second signal into a digital signal, wherein each of the first memory cell, the second memory cell, and the sense circuit comprises a transistor, wherein the transistor of the first memory cell is provided over the transistor of the sense circuit with a first insulating layer therebetween, and wherein the transistor of the second memory cell is provided over the transistor of the first memory cell with a second insulating layer therebetween.

16. The storage device according to claim 15, wherein each of the first memory cell and the second memory cell is configured to retain a multilevel data voltage.

17. The storage device according to claim 15, wherein each of the transistors of the first memory cell and the second memory cell comprises a semiconductor layer comprising a metal oxide.

18. The storage device according to claim 15, wherein each of the transistors of the first memory cell and the second memory cell comprises a semiconductor layer, and wherein the semiconductor layers of the transistors of the first memory cell and the second memory cell overlap with each other.

19. The storage device according to claim 15, wherein a channel formation region of the transistor of the sense circuit is provided in a silicon wafer.

* * * * *